United States Patent [19]
King et al.

[11] Patent Number: 5,495,503
[45] Date of Patent: Feb. 27, 1996

[54] STORAGE BATTERY MEMORY AND COMMUNICATION DEVICE

[75] Inventors: Stephen R. King, Dayton; Thomas M. Bolka, Xenia, both of Ohio

[73] Assignee: Hobart Brothers Company, Troy, Ohio

[21] Appl. No.: 431,630

[22] Filed: May 1, 1995

Related U.S. Application Data

[63] Continuation of Ser. No. 869,647, Apr. 16, 1992, abandoned.

[51] Int. Cl.[6] .............................. H04B 3/00; H04L 25/00
[52] U.S. Cl. .............................................................. 375/257
[58] Field of Search ...................................... 375/257, 256, 375/259, 377, 295; 340/825.63, 825.64, 870.2, 870.24, 870.19, 855.4, 855.8; 364/481, 483, 486

[56] References Cited

U.S. PATENT DOCUMENTS

| | | | |
|---|---|---|---|
| 4,605,925 | 8/1986 | Mark | 340/870.29 |
| 4,825,450 | 4/1989 | Herzog | 375/36 |
| 4,961,205 | 10/1990 | Kuwaoka | 375/36 |
| 4,995,058 | 2/1991 | Byers et al. | 375/37 |

OTHER PUBLICATIONS

Battery Data Recorder, Structured Interface Inc. and K.H. Smith Co.—6 pages.
C&D 5–400 Charter Power Systems.—2 pages.
LaMarche CCR, LaMarch Manufacturing Company—17 pages.
CCR Installation and Operation Manual, LaMarch Mfg. Co.—26 pages.

*Primary Examiner*—Stephen Chin
*Assistant Examiner*—Hai H. Phan
*Attorney, Agent, or Firm*—Biebel & French

[57] ABSTRACT

A memory device connected to a storage battery stores a battery identification code and other data such as present and maximum temperature and voltage, and information concerning the vehicle on which the battery is used. Information transfer between the battery memory device and a charger is done through the battery cables, eliminating the need for special connections. A high power, low energy pulse imposed on the battery leads may be detected at each end of the cables, in spite of the low impedance nature of large lead acid batteries. A method and apparatus for transmitting data on a pair of battery cables includes transmitting each data pulse as a plurality of short duration pulses whereby each short duration pulse is created by momentarily imposing a high power, low energy pulse at one end of the cables. These pulses are detected at the other end of the cables and are applied to a resettable multivibrator having a output pulse width slightly greater than the interval between said short duration pulses. If the output of the multivibrator is continuous during a predetermined period, a valid data pulse is recognized.

23 Claims, 82 Drawing Sheets

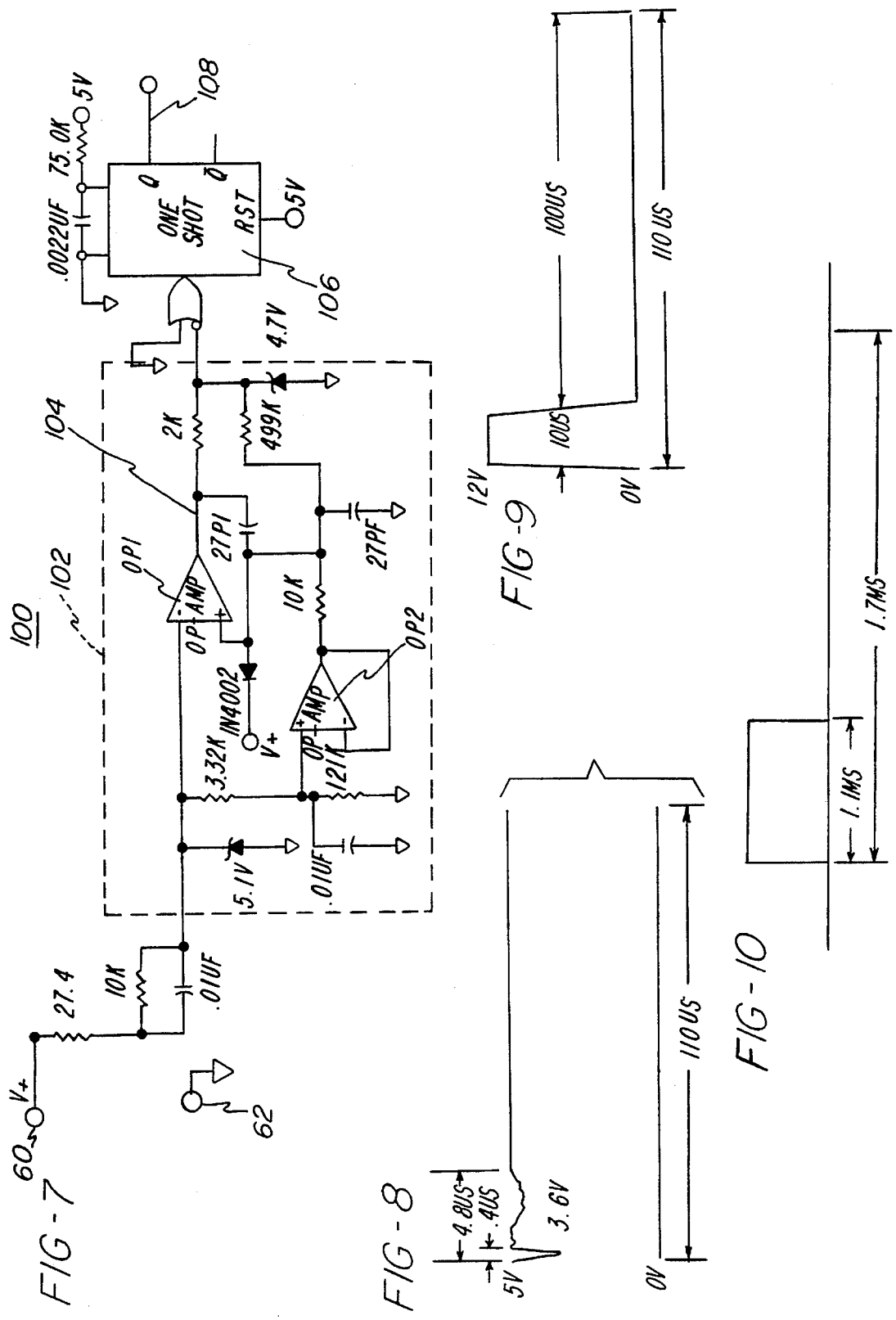

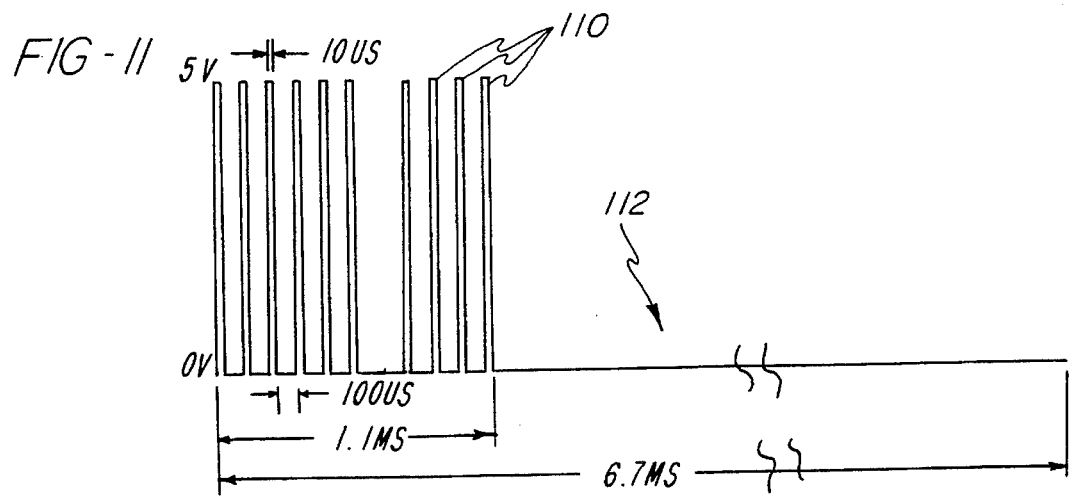
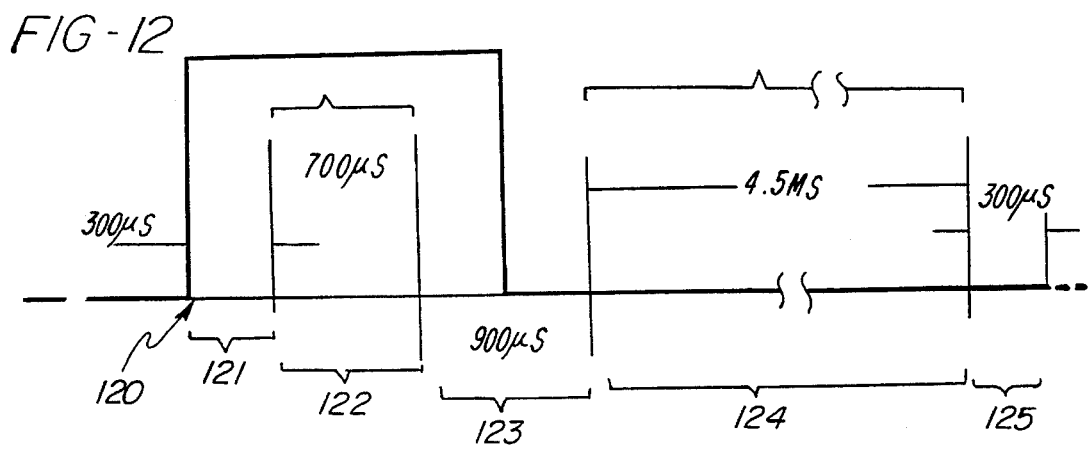
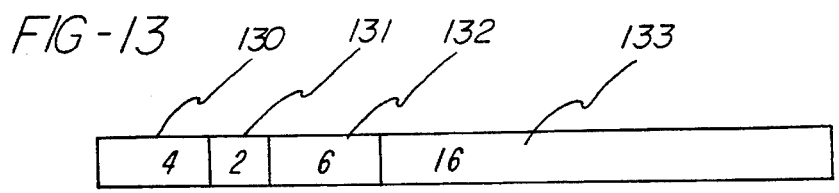
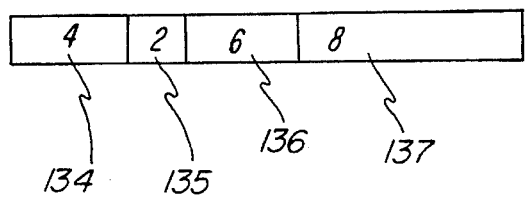

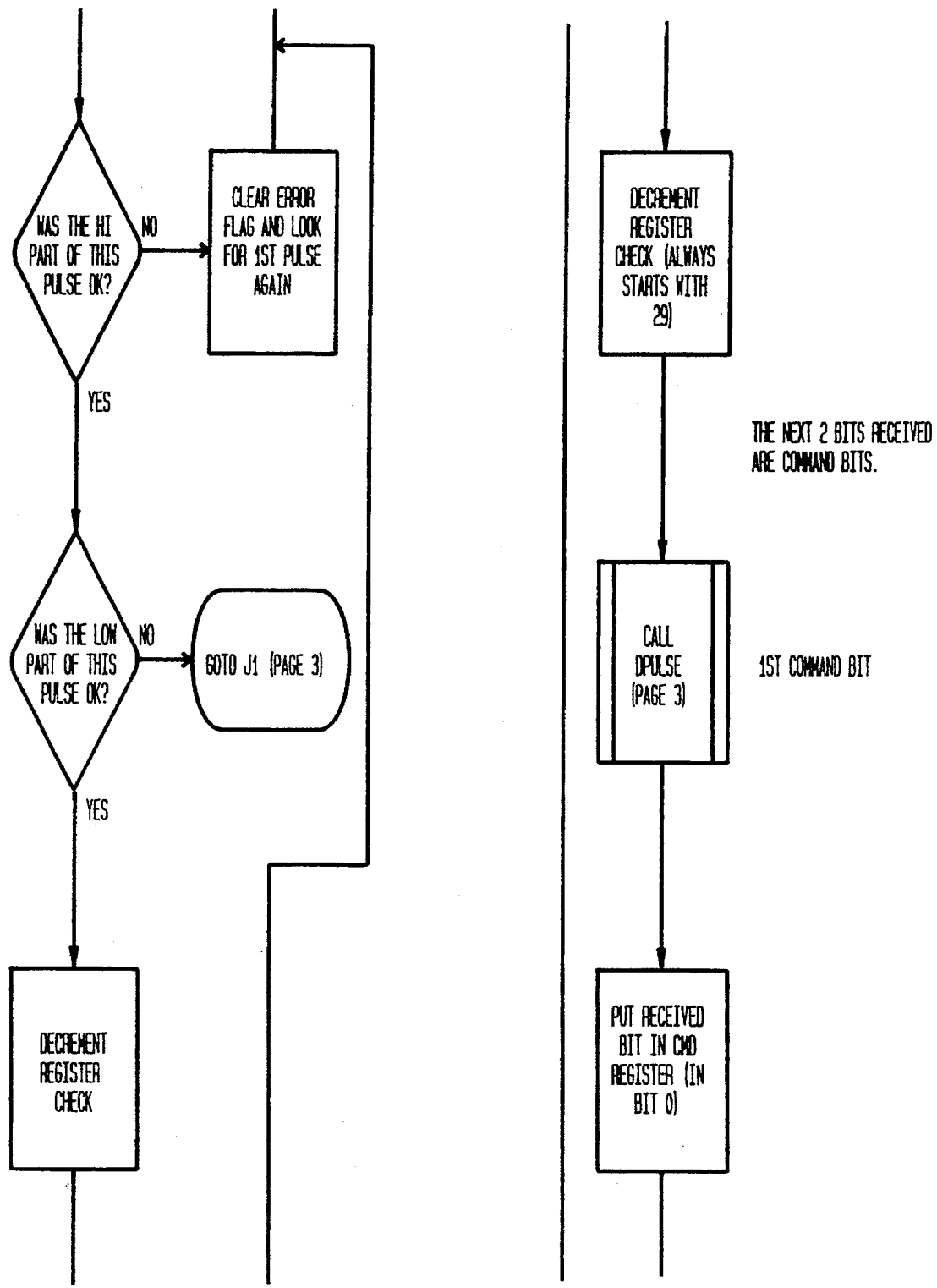

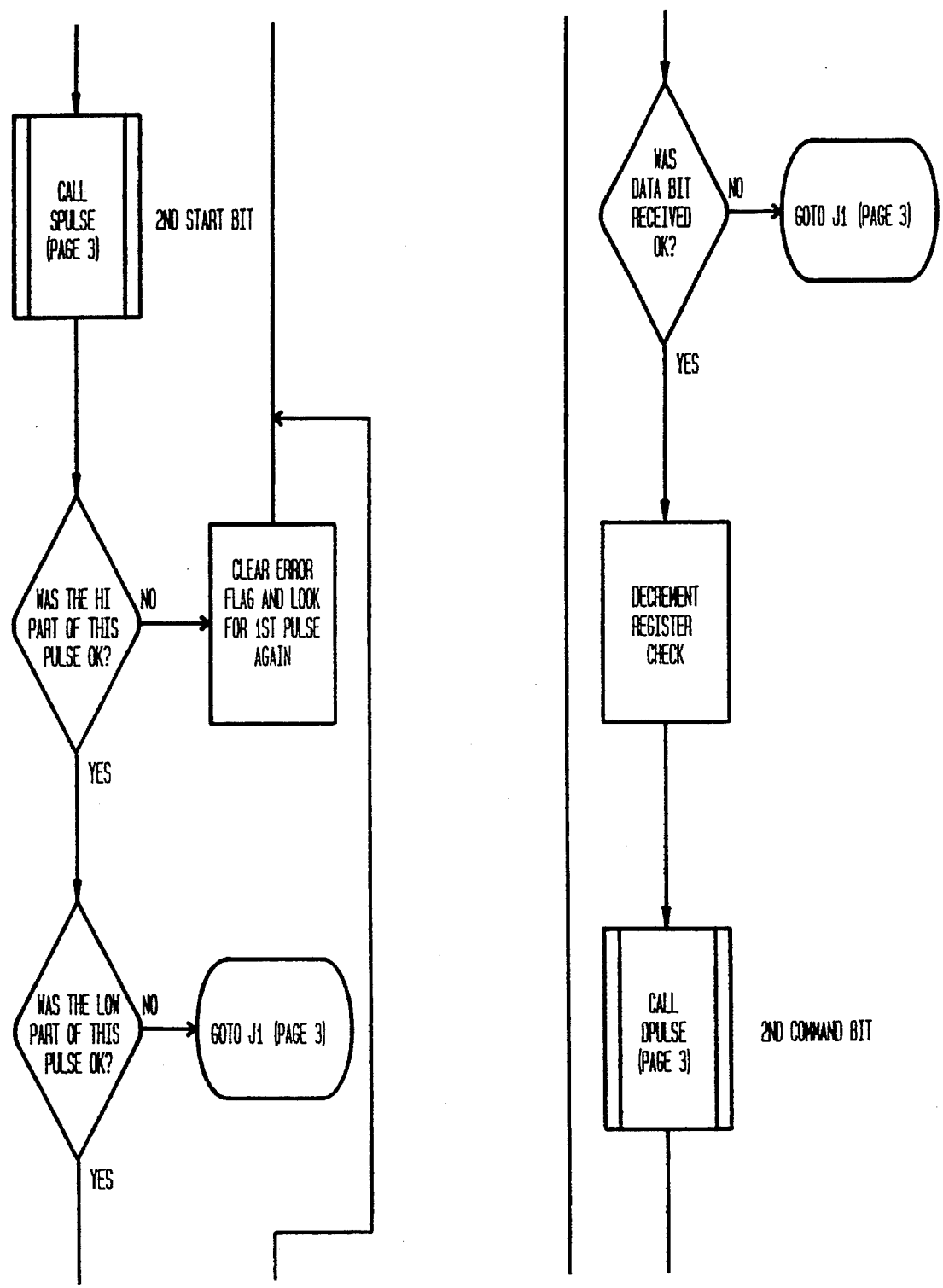

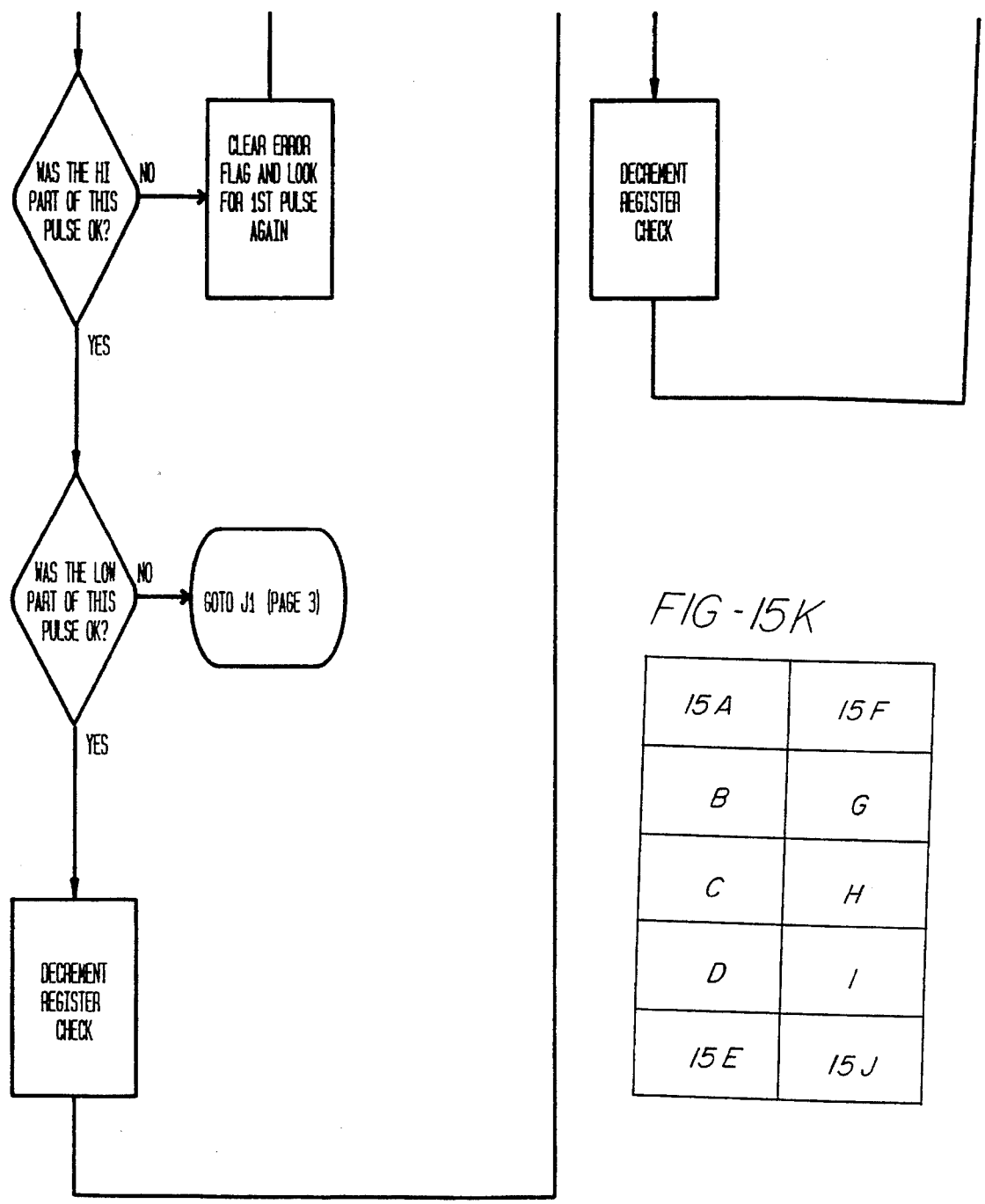

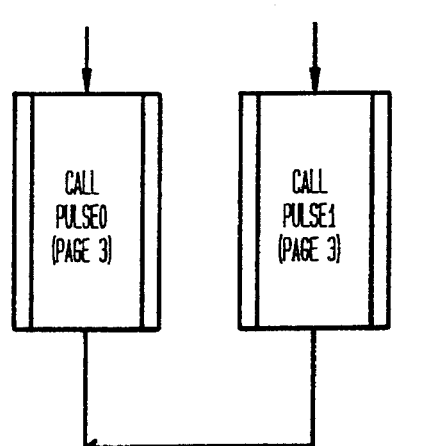
FIG-16D
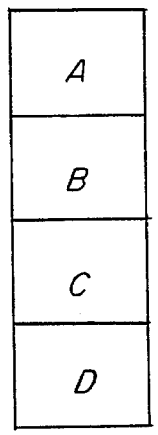
FIG-16E
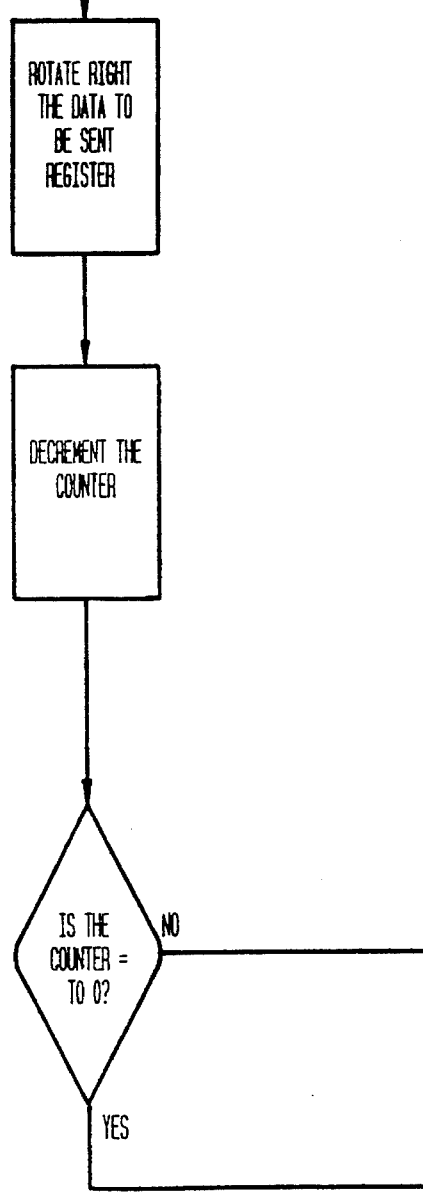

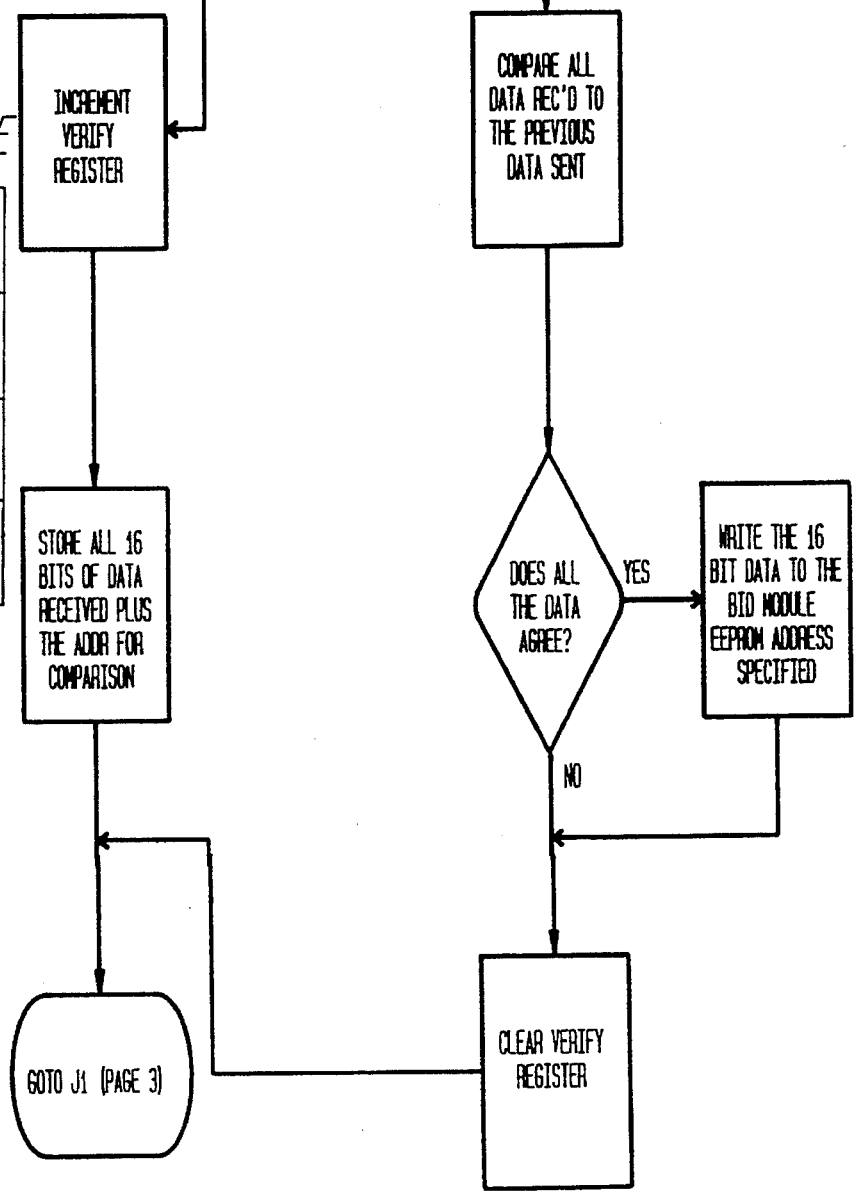

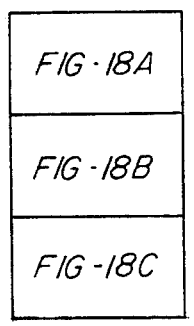
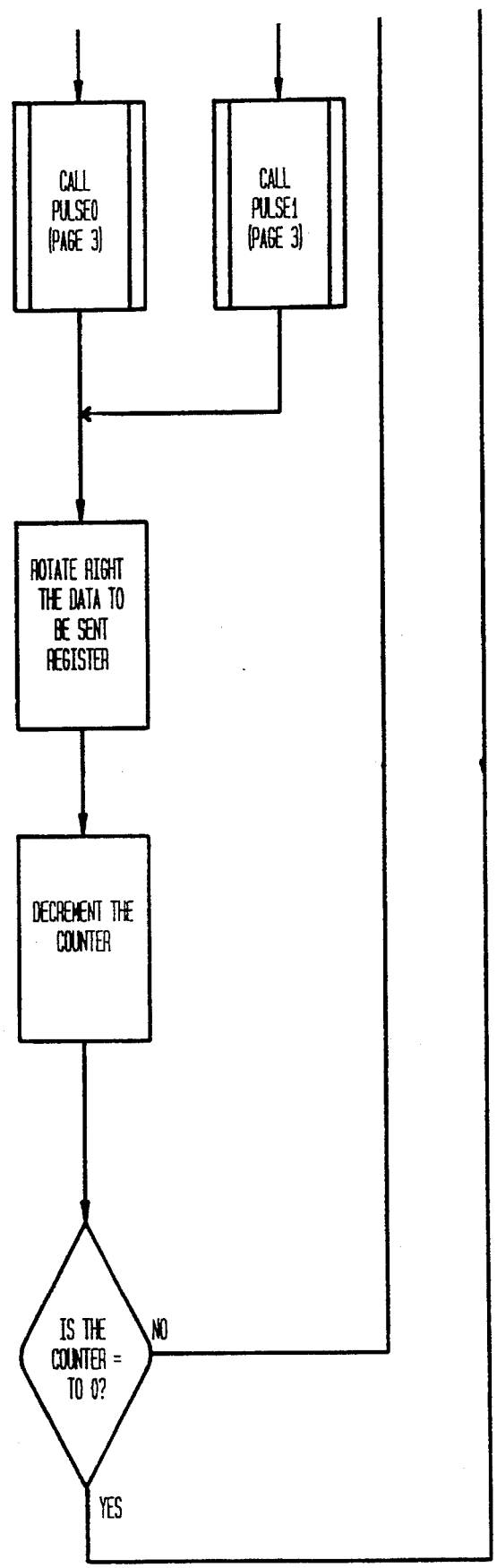

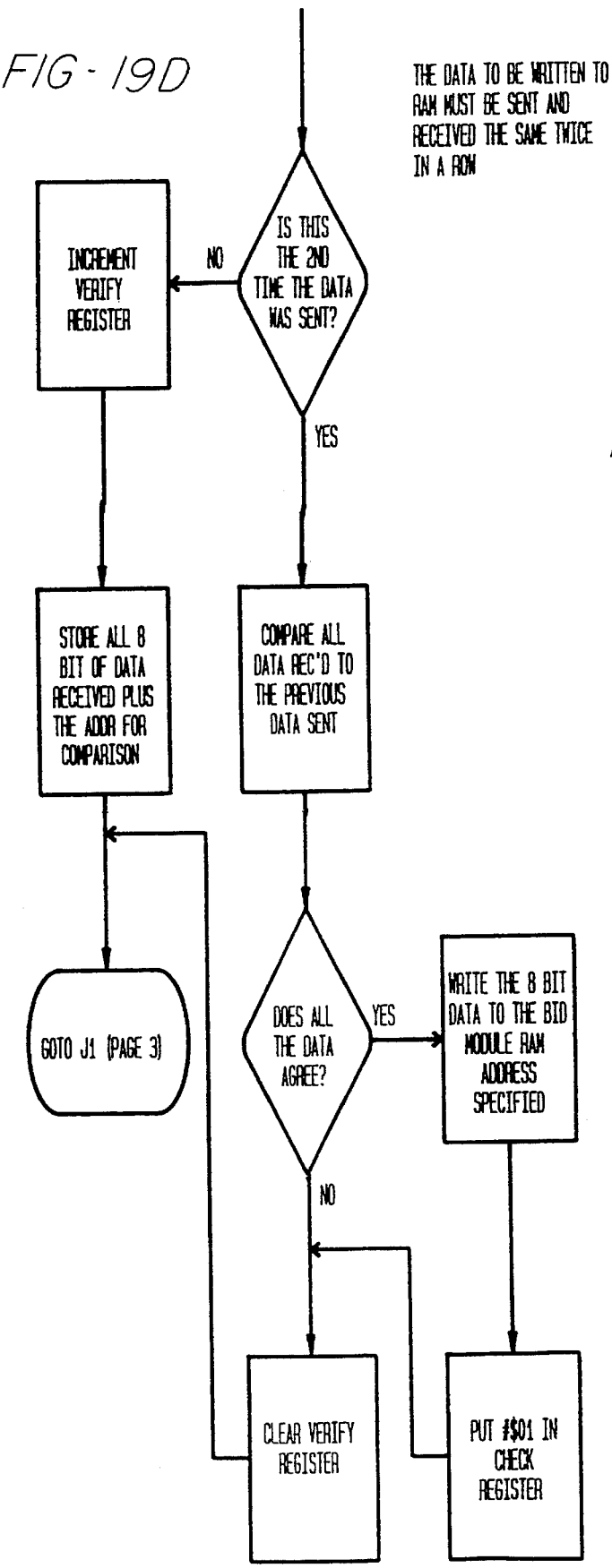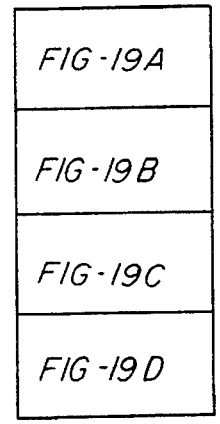

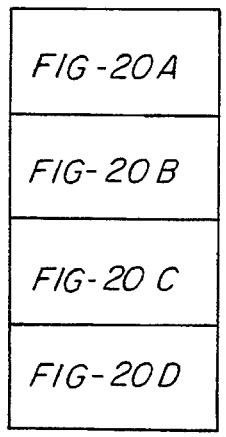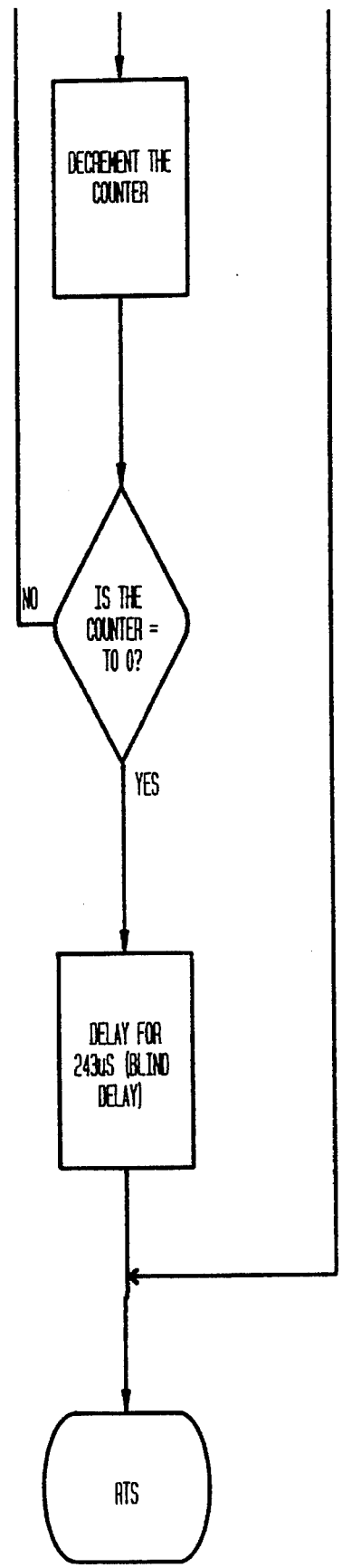

FIG-25A
FIG-25B
FIG-25C
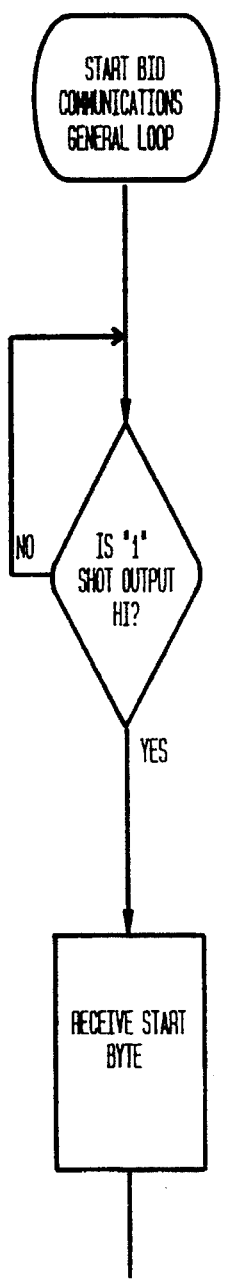
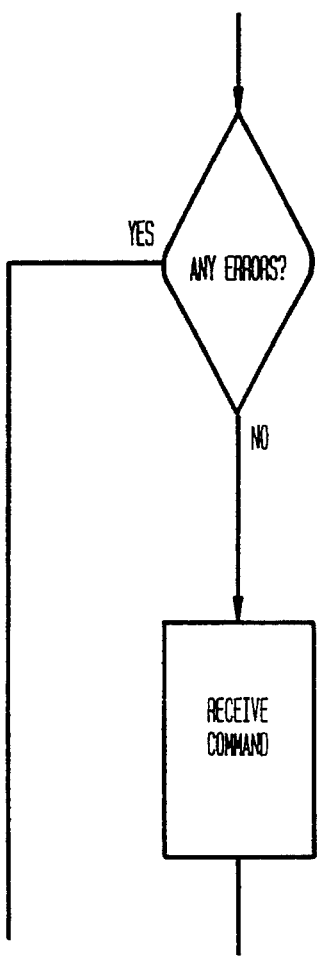
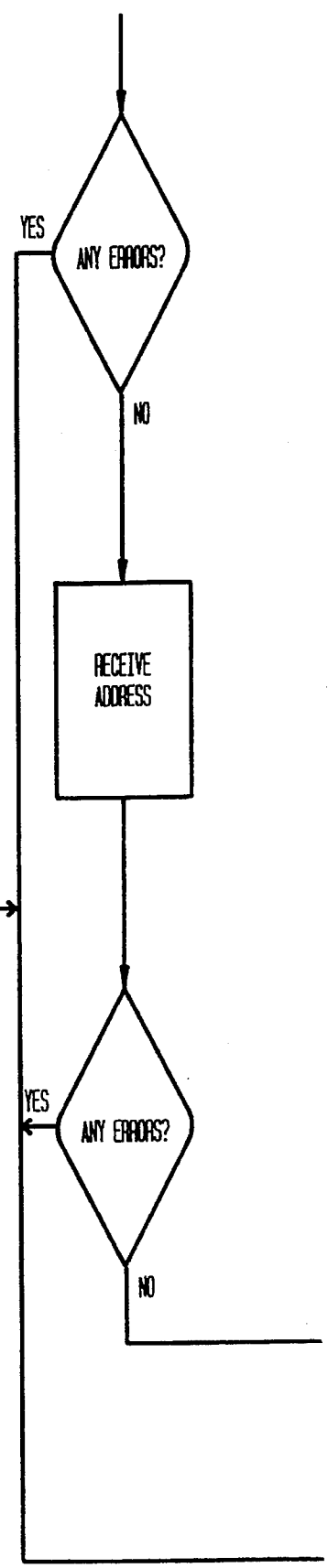

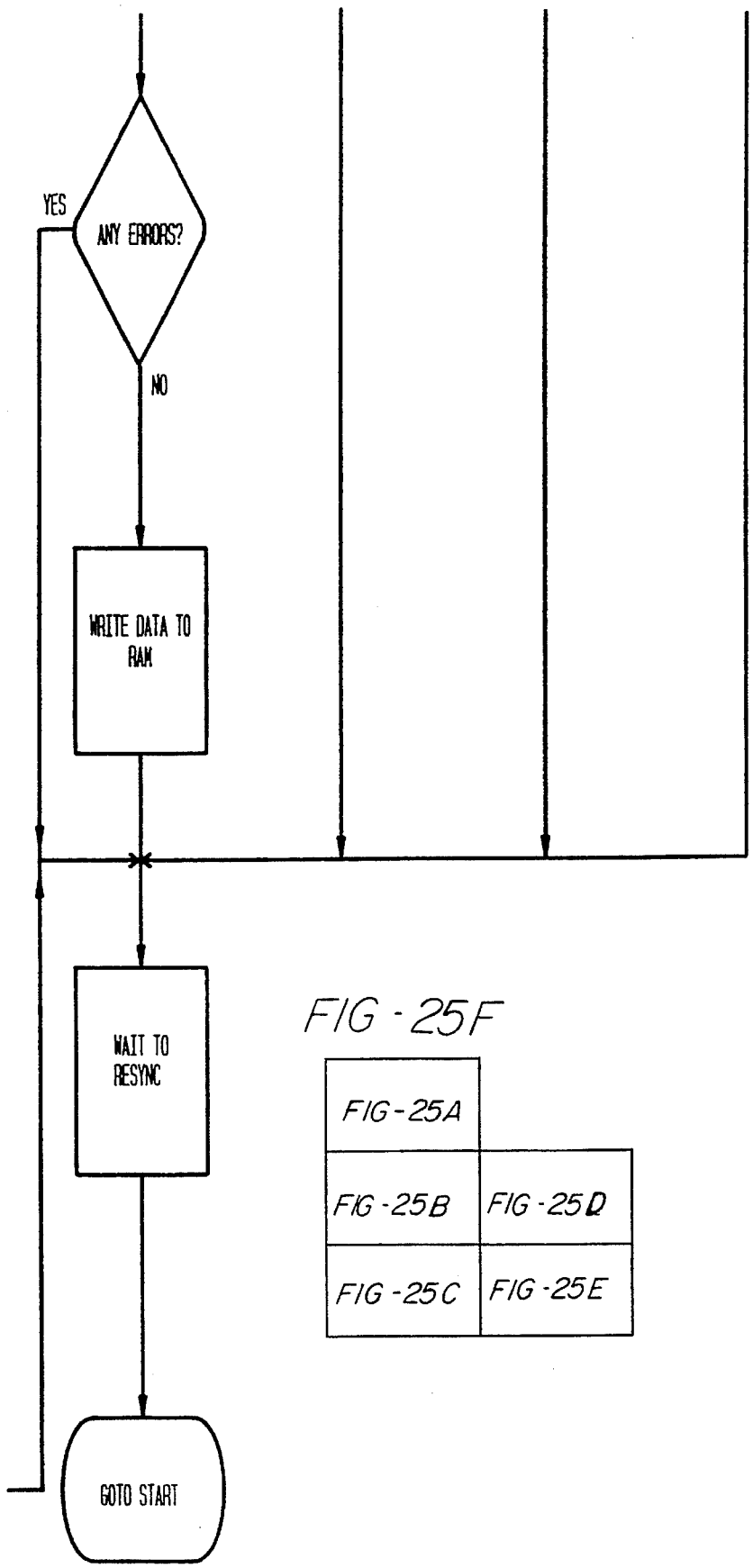

FIG-26C
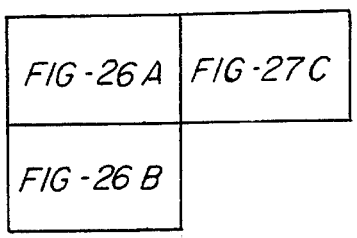
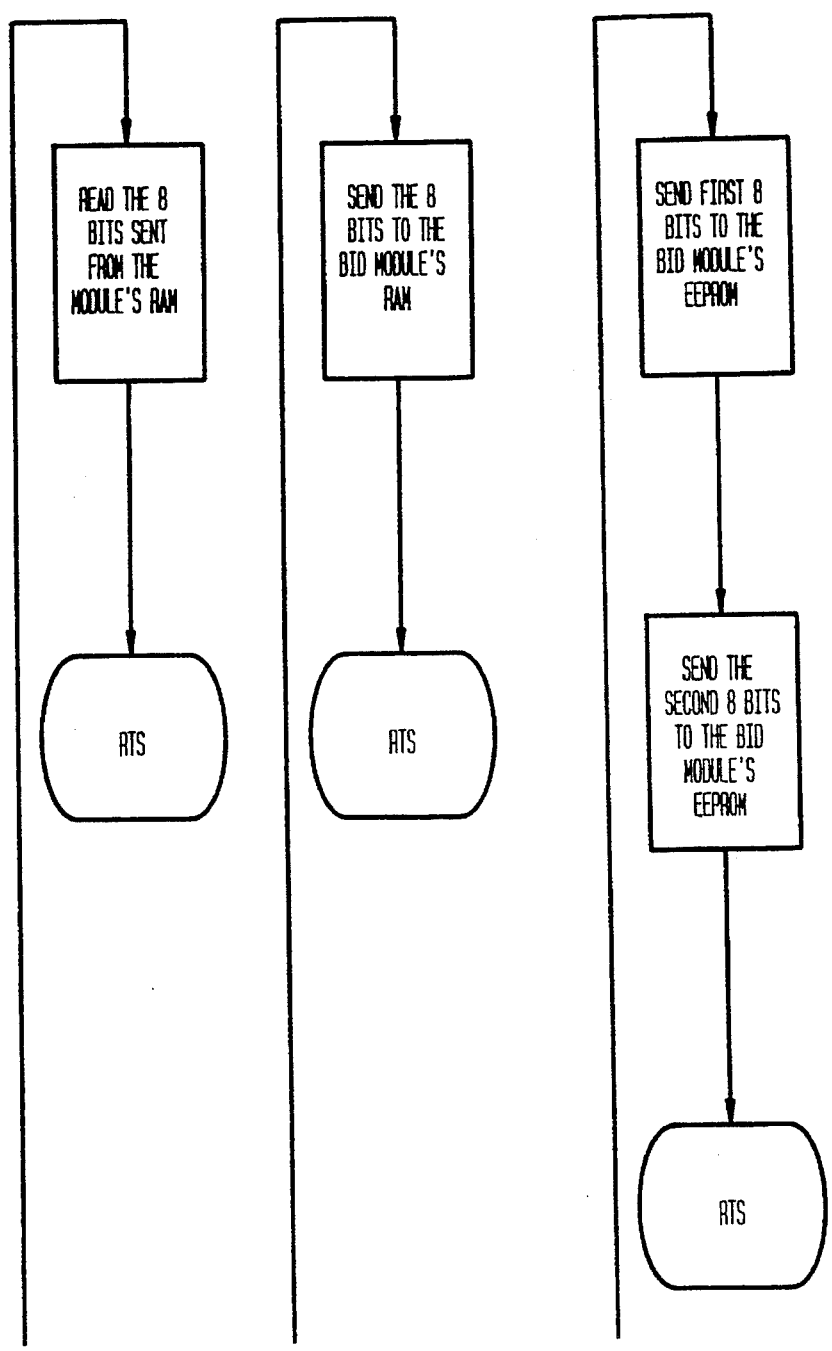

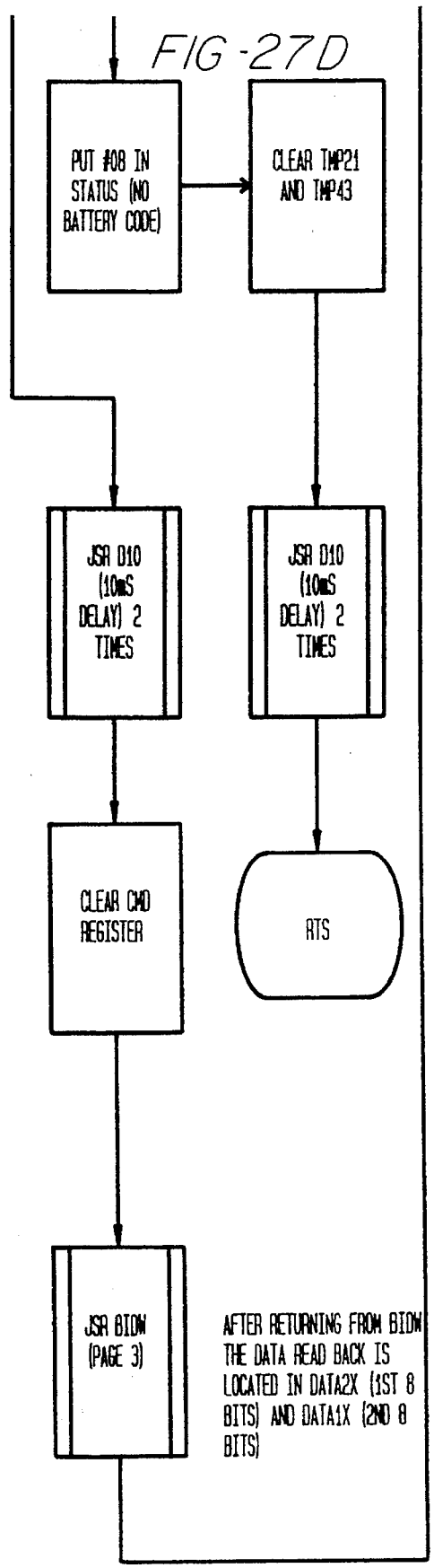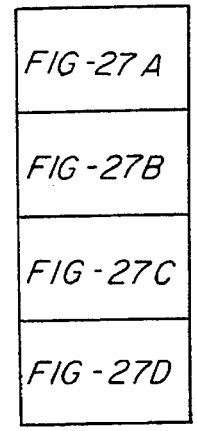

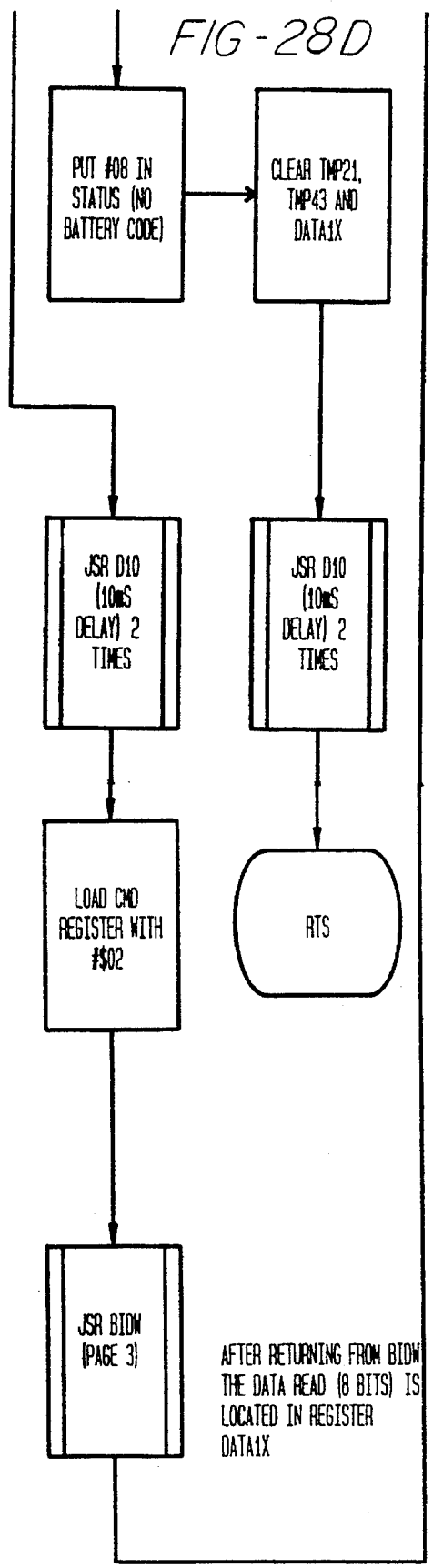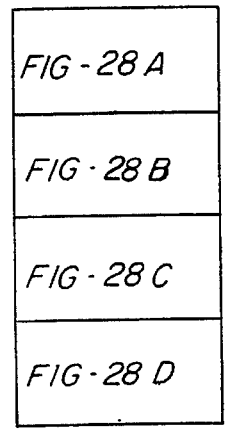

THIS FLOWCHART CONTAINS NBIDRAM AND NBIDEE SUBROUTINES

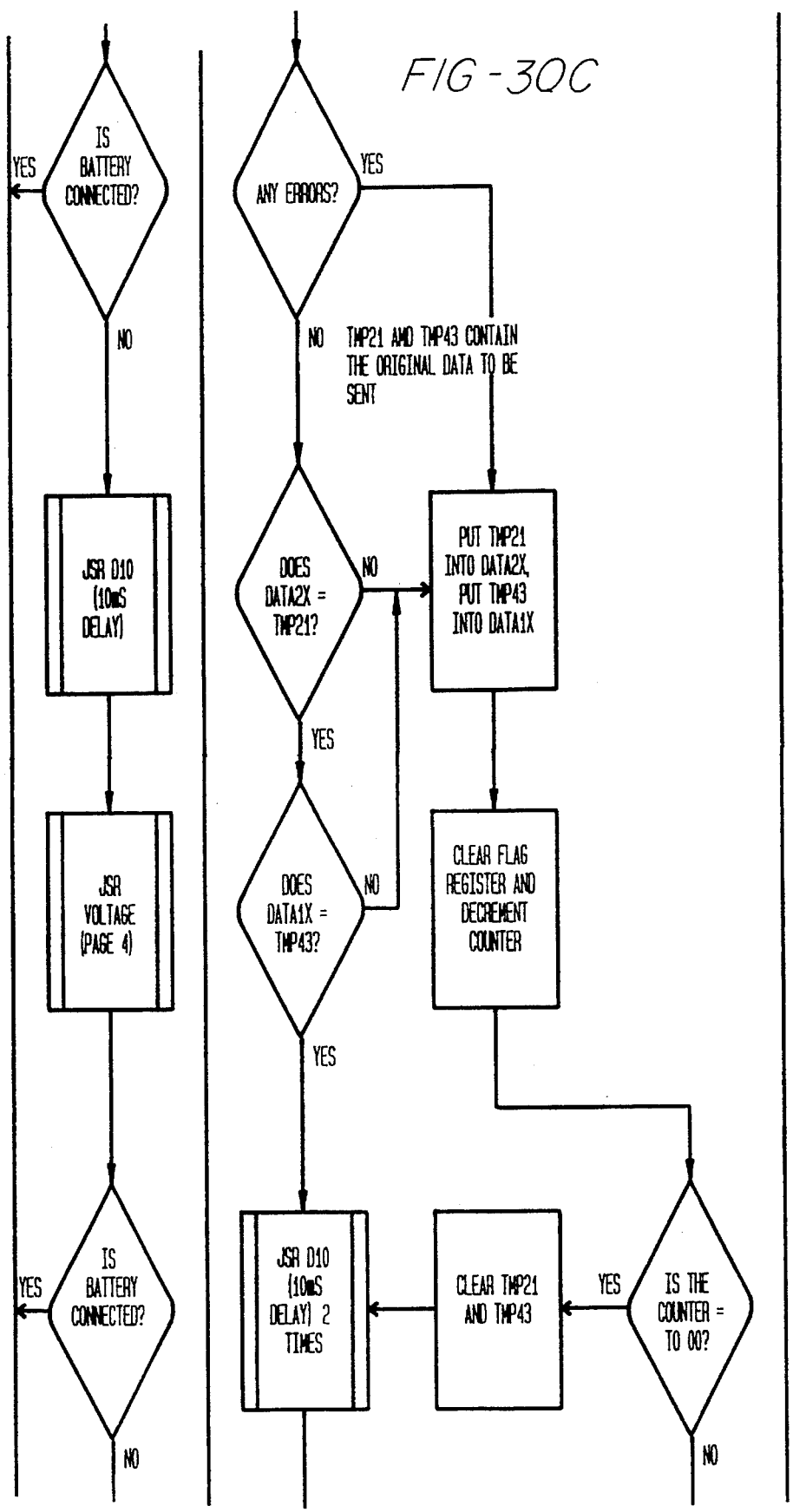

FIG-30D
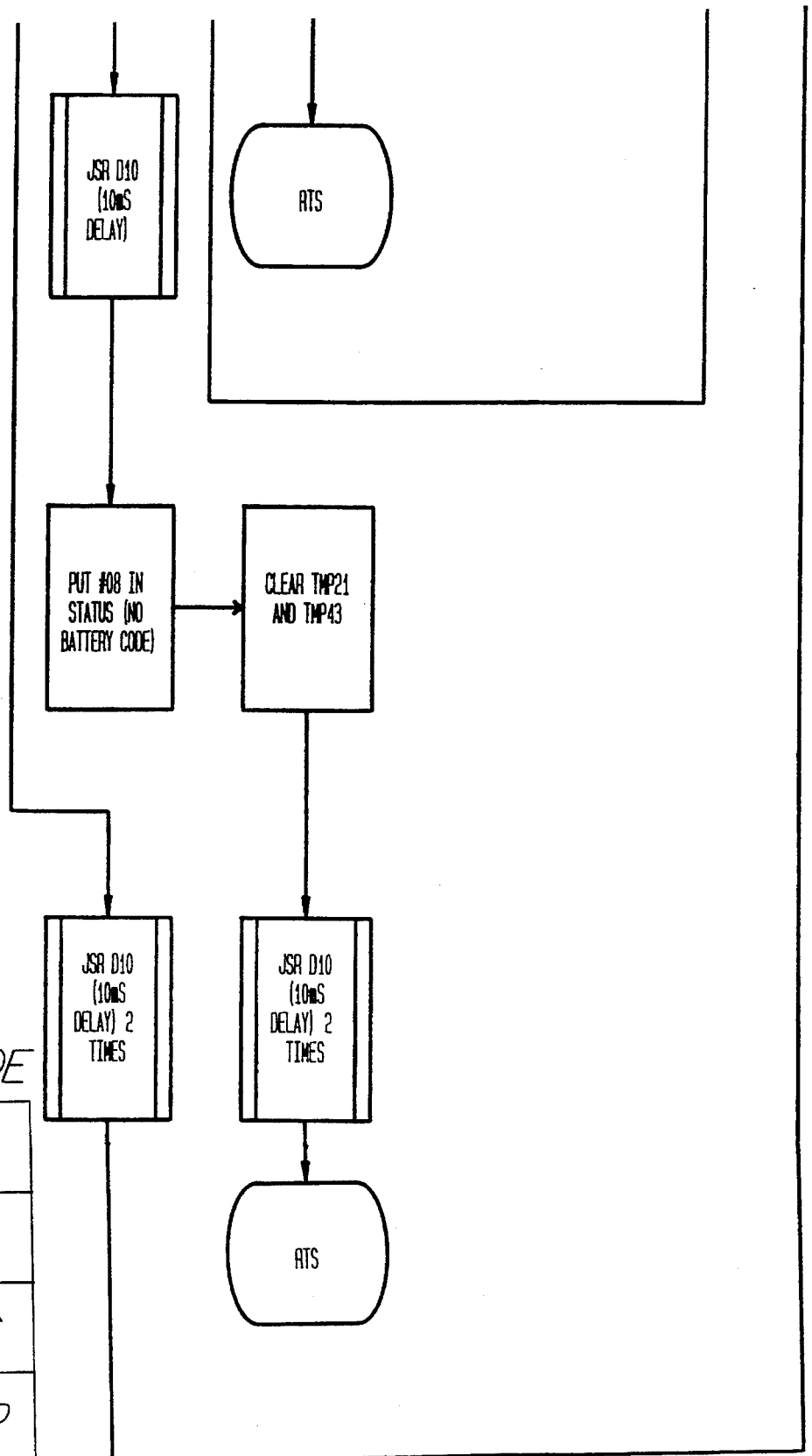
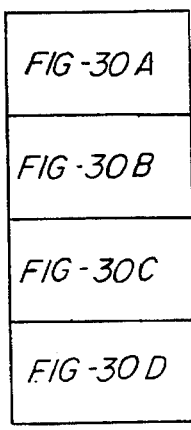
FIG-30E
| FIG-30A |
| FIG-30B |
| FIG-30C |
| FIG-30D |

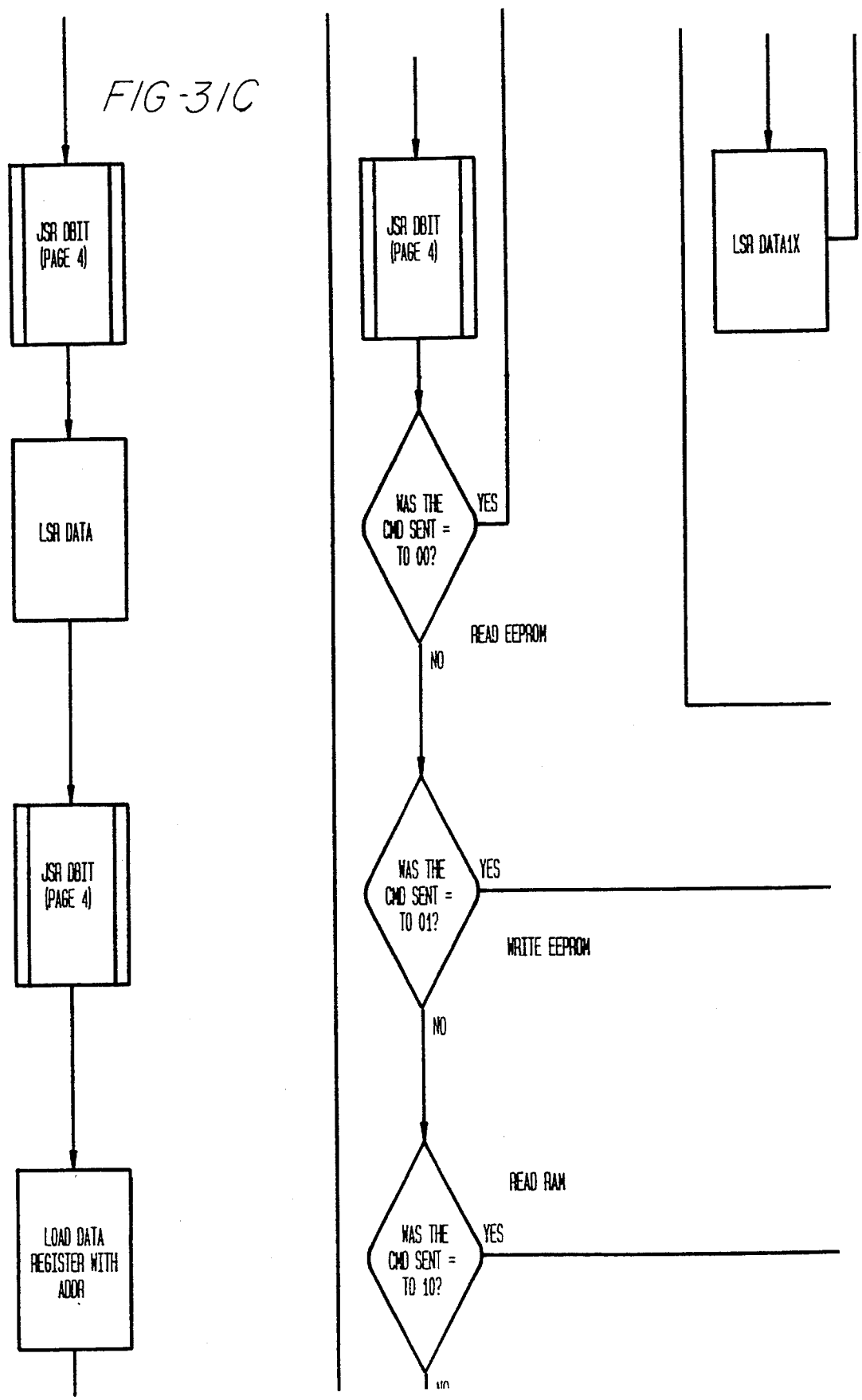

FIG-31L

| FIG-31A | FIG-31E | FIG-31I |
| FIG-31B | FIG-31F | FIG-31J |
| FIG-31C | FIG 31G | FIG-31K |
| FIG-31D | FIG-31H | |

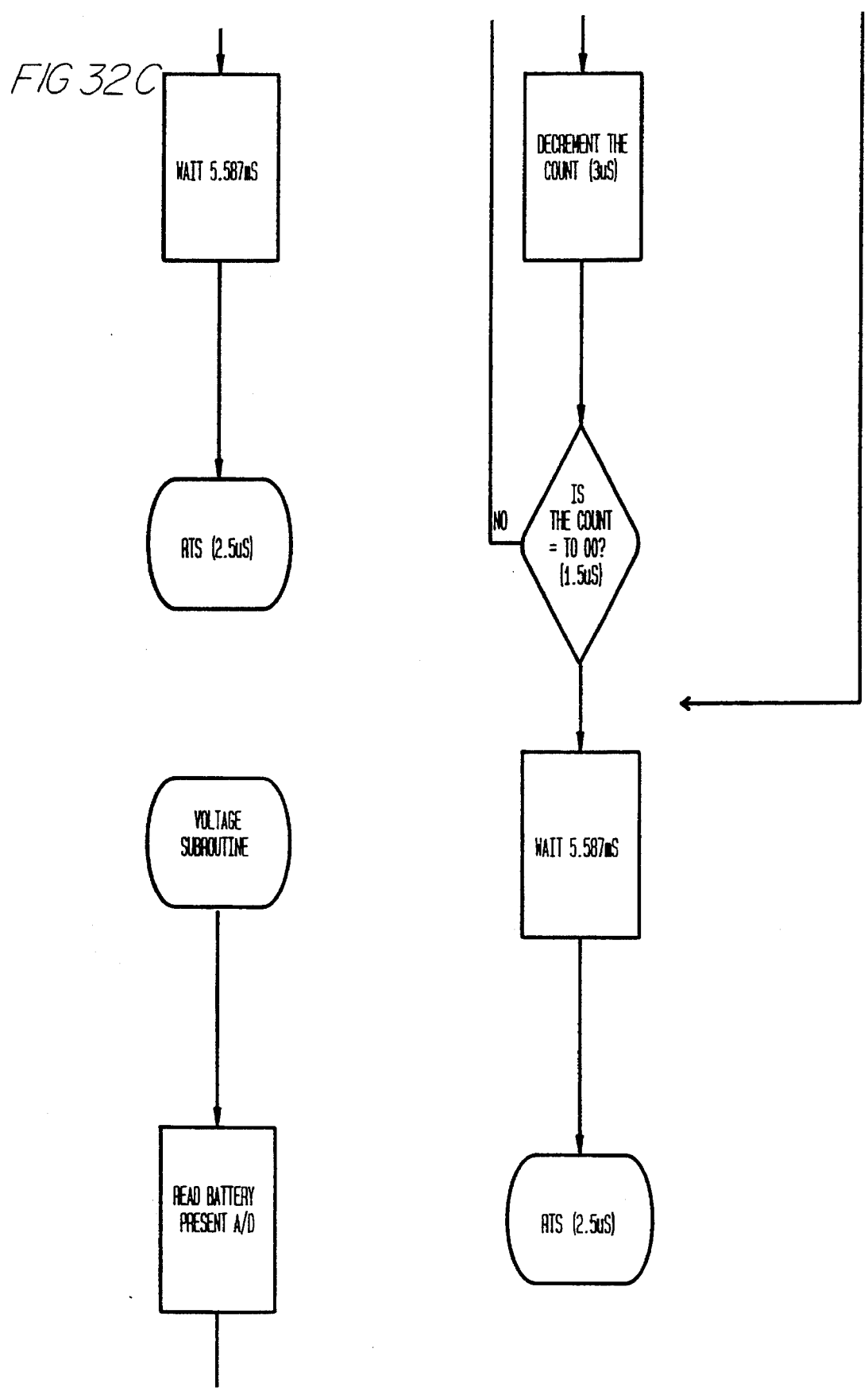

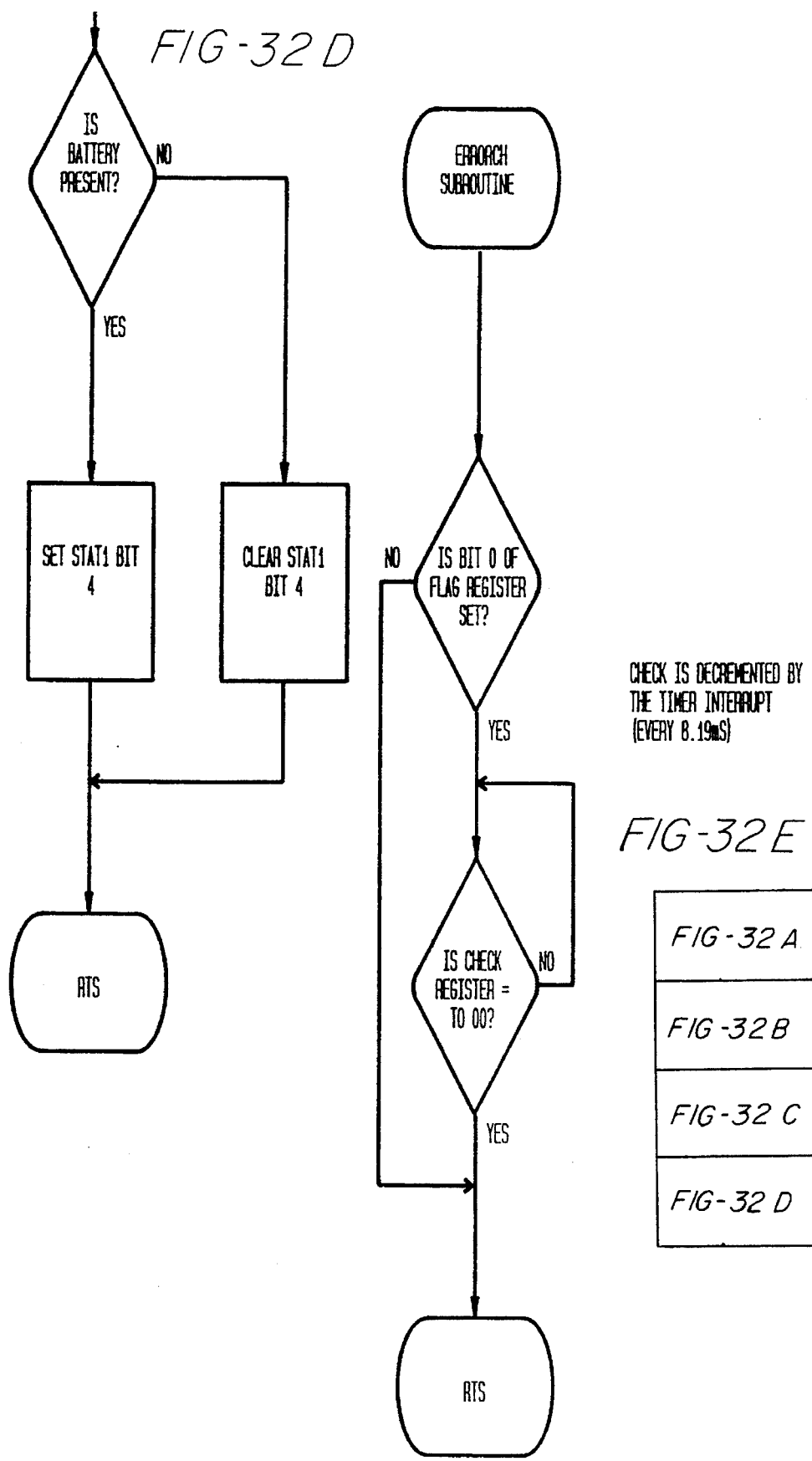

STORAGE BATTERY MEMORY AND COMMUNICATION DEVICE

This is a Continuation of application Ser. No. 07/869,647, filed Apr. 16, 1992, which is now abandoned.

BACKGROUND OF THE INVENTION

This invention relates to a memory and communications device carried on a storage battery for storing and transferring battery identification codes and other data associated with the battery and the vehicle on which the battery is used.

Storage batteries used with battery powered vehicles are typically removed from the vehicle and charged at regular intervals. The storage batteries are multicell units that have an attached pair of cables terminated in a standard connector. The storage batteries are usually removed after a shift of eight hours or less, charged for a period of time, and then allowed to cool for another period of time before being used again. The vehicle may be used continuously, but only after a replacement battery has been installed. Thus, all vehicles and all batteries usually use the same industry standard connector.

Battery data recorders have been installed on storage batteries to maintain a record of charging parameters, such as a battery identification number, the number of times the battery has been charged, the temperature of the battery during each charge, the amount of time the battery has been charged, and other relevant battery charging information. Such prior art battery data recorders are typically installed directly on the battery, and draw their power from the battery itself, but have a non-volatile memory in the event they are disconnected. The information contained in the data recorder is typically downloaded from time to time by connecting a data receiver, or computer, to the data recorder. A special interface cable is used to connect the data recorder to the computer.

In other systems, the charger itself is monitored for the battery charging information. In these systems, however, the battery number is manually recorded each time the battery is connected to the charger.

Clearly, there is a need for a battery monitoring system where battery charging information can be ascertained automatically. Further, there is a need for a system that does not require any special connections to the battery to download any of the stored data.

SUMMARY OF THE INVENTION

In the present invention, a memory device is connected to a storage battery to store the battery identification code and other data associated with the battery, such as charging information. Further, the memory device may be used to record information relating to and sent from the vehicle on which it was used. Information transfer between the battery memory device and the charger, or the vehicle, is done through the battery cables, and therefore no special connections are required.

Information transfer through the battery cables requires the use of special techniques due to the low impedance characteristics of the battery and the inductance of the battery cables. It has been found that even at 500 kHz, an AC sine wave imposed on the battery terminals was attenuated by 99% of its original amplitude. It was discovered, however, that a high power, low energy pulse imposed on the battery leads at one end could be detected at the other end. Accordingly, this invention utilizes this characteristic of the battery in the transfer of information.

Accordingly, it is an object of this invention to provide a method of transmitting data on a pair of cables having a low impedance battery load on one end thereof, the method including the steps of transmitting a data pulse formed from a plurality of short duration pulses whereby each short duration pulse is created by momentarily imposing a high power, low energy pulse at one end of the cables, sensing a change in voltage at the other end of the cables to detect the occurrence of each short duration pulse, applying each detected short duration pulse to a resettable multivibrator having a output pulse width slightly greater than the interval between said short duration pulses, and determining whether the output of the multivibrator is continuous during a predetermined period to indicate the reception of a valid data pulse.

It is a further object of this invention to provide a method of creating high power, low energy pulses by momentarily short circuiting the cables at one end thereof.

It is another object of this invention to provide an interface circuit for use in connection with a battery identification device associated with a battery, said circuit comprising a pair of battery cables connected to a battery, means for generating a plurality of high power, low energy pulses for each data pulse representing a logic "1", and means for converting information stored in said battery identification device into data pulses.

It is still a further object of this invention to provide an apparatus for generating high power, low energy pulses across the terminals of a large capacity battery comprising a fast acting switch, a capacitor, and a current limiting resistor, wherein said switch, capacitor and resistor are connected in series across the terminals of the battery to impose a momentary short circuit at the battery's terminals when said switch is closed.

Other objects and advantages of the invention will be apparent from the following description, the accompanying drawings and the appended claims.

BRIEF DESCRIPTION OF THE DRAWINGS

FIG. 7 is an electrical schematic of a pulse receiver;

FIG. 8 is a waveform diagram showing the shape of a pulse generated by a circuit similar to FIG. 3 as received;

FIG. 9 is a waveform diagram showing the shape of a pulse after intermediate processing by the circuit of FIG. 7;

FIG. 10 is a waveform diagram showing the output pulse after complete processing by the circuit of FIG. 7;

FIG. 11 is a waveform diagram showing in detail the component pulses and space making up one complete data pulse from the circuit of FIG. 7;

FIG. 12 is a waveform diagram showing critical timing events in the data pulse represented in FIG. 11;

FIG. 13 is a representation of a complete set of data pulses for reading and writing to an EEPROM location;

FIG. 14 is a representation of a complete set of data pulses for reading and writing to a RAM location;

FIGS. 15A–15J together comprise a computer flow chart of a communications routine called BIDCOMM; FIG. 15K is diagram showing how the drawings of FIGS. 15A–15J should be arranged;

FIGS. 16A–16D together comprise a computer flow chart of the BIDCOMM communications routine when the command sent is hex 00; FIG. 16E is diagram showing how the drawings of FIGS. 16A–16D should be arranged;

FIGS. 17A–17D together comprise a computer flow chart of the BIDCOMM communications routine when the command sent is hex 01; FIG. 17E is diagram showing how the drawings of FIGS. 17A–17D should be arranged;

FIGS. 18A–18C together comprise a computer flow chart of the BIDCOMM communications routine when the command sent is hex 02; FIG. 18D is diagram showing how the drawings of FIGS. 18A–18C should be arranged;

FIGS. 19A–19D together comprise a computer flow chart of the BIDCOMM communications routine when the command sent is hex 03; FIG. 19E is diagram showing how the drawings of FIGS. 19A–19D should be arranged;

FIGS. 20A–20D together comprise a computer flow chart of a communications routine called SPULSE; FIG. 20E is diagram showing how the drawings of FIGS. 20A–20D should be arranged;

FIGS. 25A–25E together comprise a computer flow chart of how the communications from an expansion board on the battery charger is received and processed; FIG. 25F is diagram showing how the drawings of FIGS. 25A–25E should be arranged;

FIGS. 26A–26C together comprise a computer flow chart of the overall computer program from the battery charger side of the communications path; FIG. 26D is diagram showing how the drawings of FIGS. 26A–26C should be arranged;

FIGS. 27A–27D together comprise a computer flow chart of a communications subroutine called RBIDEE; FIG. 27E is diagram showing how the drawings of FIGS. 27A–27D should be arranged;

FIGS. 28A–28D together comprise a computer flow chart of a communications subroutine called WBIDEE; FIG. 28E is diagram showing how the drawings of FIGS. 28A–28D should be arranged;

FIGS. 30A–30D together comprise a computer flow chart of a communications subroutine called WBIDRAM; FIG. 30E is diagram showing how the drawings of FIGS. 30A–30D should be arranged;

FIGS. 32A–32D together comprise a computer flow chart of a set of communications subroutines called VOLTAGE, ERRORCH, DBIT and STARTB; FIG. 32E is diagram showing how the drawings of FIGS. 32A–32D should be arranged;

DESCRIPTION OF THE PREFERRED EMBODIMENT

Figure 1:
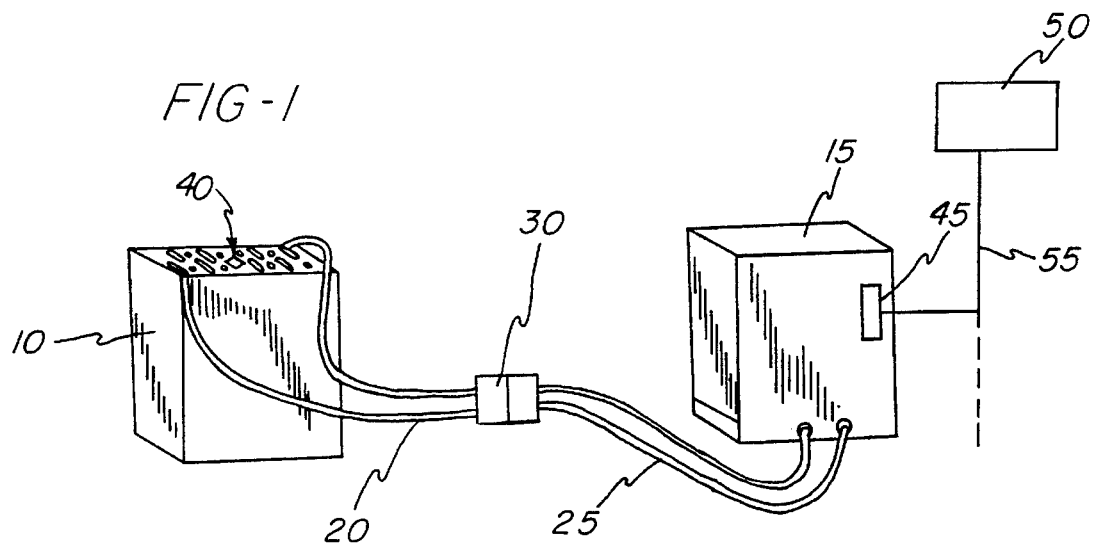
FIG. 1 is a simplified perspective view showing the basic components of the invention.

Referring now to the drawings which illustrate the preferred embodiment of the invention, and particularly to FIG. 1, a battery 10 is shown connected to a battery charger 15. The battery size may range from six to thirty-six cells. A set of cables 20 is attached to the battery and a second set of cables 25 is attached to the charger. The cables are connected together by industry standard connectors 30. The length of the cables is typically ten feet, but cable lengths of up to forty feet may be used.

A battery identification device (BID) or communications module 40 is attached to the battery 10. Module 40 contains a variety of information concerning the battery, such as its identification number, the present and maximum temperatures to which the battery has been subjected, the present and minimum battery voltage, and calibration information. Other information, such a information relating to vehicle may also be stored in the module. The information contained in the module 40 is conveyed to an expansion board 45 preferably contained in the battery charger 15.

A computer 50 is connected to the battery charger expansion board 45 by a cable 55 to control operation of the system. The cable 55 is also connected to other battery chargers within the facility, and each is polled from time to time.

In the present invention, the transfer of information between the module 40 and the expansion board 45 uses the existing cables sets 20 and 25; no other wires are needed for this purpose. The cable set 20 is connected directly to the battery 10, and since the battery is typically a high capacity lead-acid battery capable of providing several hundred amperes of current over an eight hour shift to power a vehicle, special techniques are required to impose a usable data signal on the cable set.

Figure 2:
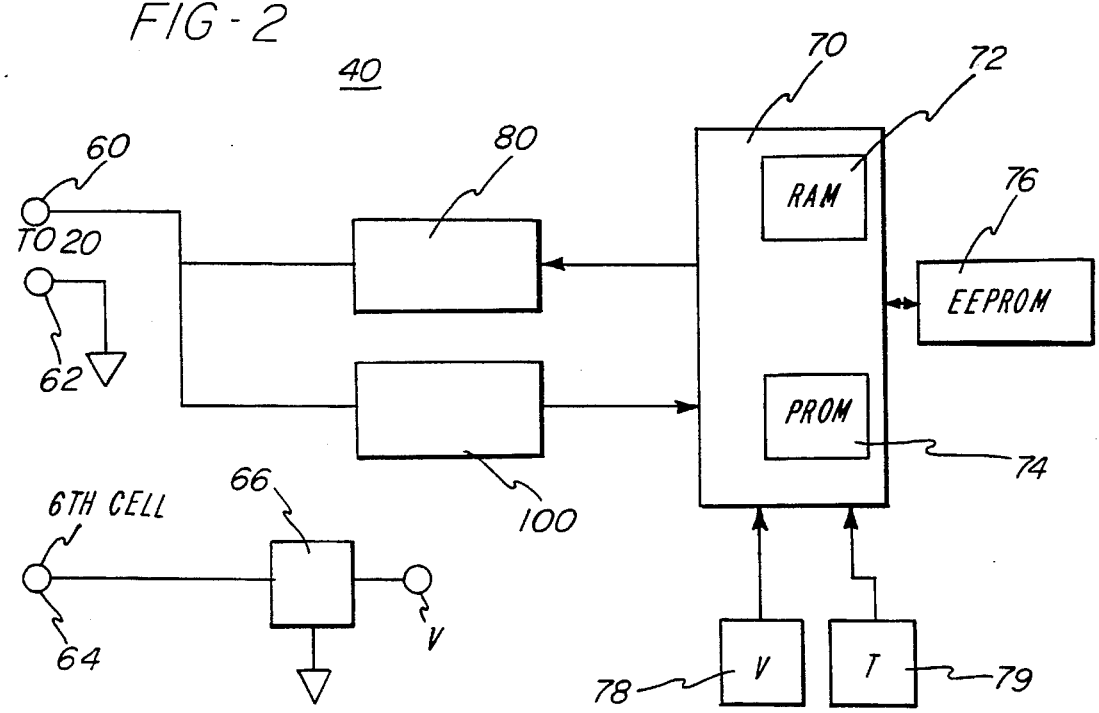
FIG. 2 is a simplified block diagram of a communications module.

In FIG. 2, the communications module 40 is shown in block diagram form and includes connections 60 and 62 to the battery cable set 20. A connection 64 is also made to one of the cells of the battery, preferably the sixth cell, for providing operating current to the module itself through a voltage regulator 68.

The module includes a microprocessor 70 which may contain an internal temporary memory or random access memory (RAM) 72, and a device for storing the microprocessor's instruction set or program or programmable read only memory (PROM) 74. The RAM 72 will hold data only so long as the device is connected to the battery.

A non-volatile memory or EEPROM 76 is also connected to the microprocessor for storing certain data, such as an identification number and calibration data, which information will be retained even if the module is removed from the battery. The typical life of information stored in an EEPROM is approximately ten years.

Voltage sensor 78 and temperature sensor 79 provide data to the microprocessor, which will be stored in the RAM 72. A pulse transmitter 80 is connected to the microprocessor 70 to send data as a series of pulses over the cable set when instructed by the microprocessor, and a pulse receiver 100 senses the pulses on the cable set from the expansion board and for applying appropriately modified signals to the microprocessor.

Figure 3:
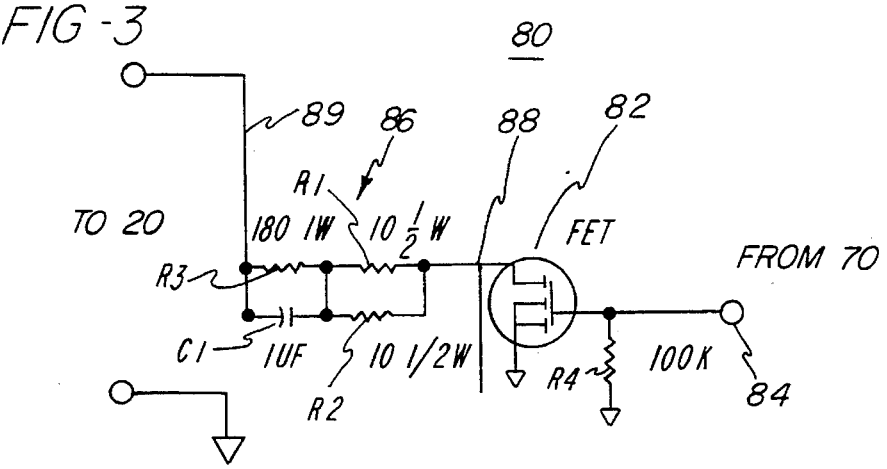
FIG. 3 is an electrical schematic of a pulse transmitter.
Figure 4:
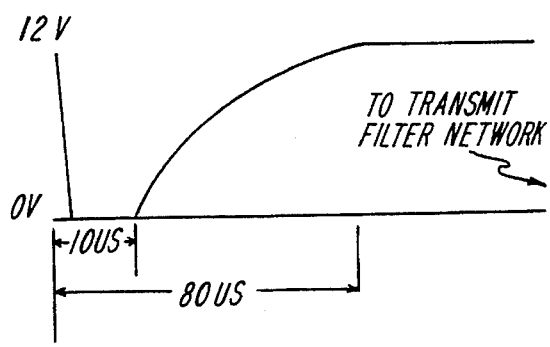
FIG. 4 is a waveform diagram showing the shape of an output pulse applied to a transmitter filter circuit.
Figure 5:
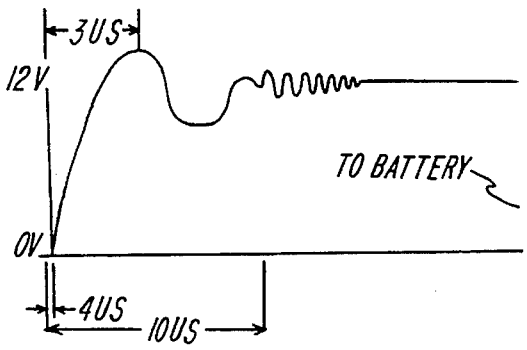
FIG. 5 is a waveform diagram showing the shape of an output pulse on the terminals of a battery.

FIG. 3 is an electrical schematic diagram of a preferred embodiment of the pulse transmitter 80. It is simply a fast acting switch in the form of a FET device 82 having it input 84 connected to the microprocessor 70, and a resistor-capacitor circuit 86 connected to the cable set 20. Upon receipt of a pulse from the microprocessor, the FET will produce an output at 88, which is illustrated in FIG. 4. The pulse will provide 10 microseconds (10 μs) of a complete short circuit to the input of the FET, but the resultant pulse at 89 will have the shape generally shown in FIG. 5 at the terminals of a cable set, due to the impedance characteristics of the battery and the circuit 86.

The circuit 86 is a series circuit including a capacitor C1 and a pair of resistors R1 and R2 connected to the FET 82. When the FET conducts, an effective short circuit is momentarily created by the capacitor C1. The value of this capacitor is chosen to be large enough to insure that the voltage at the battery's terminals will be brought down to its minimum voltage (as a result of the battery's impedance), but not so large that its effectiveness is exceeded and power is wasted. Resistor R3 is a bleeder provided to discharge the capacitor C1 after the FET opens. Resistor R4 insures the FET remains in a non-conducting state absent a switching pulse on its input.

Figure 6:
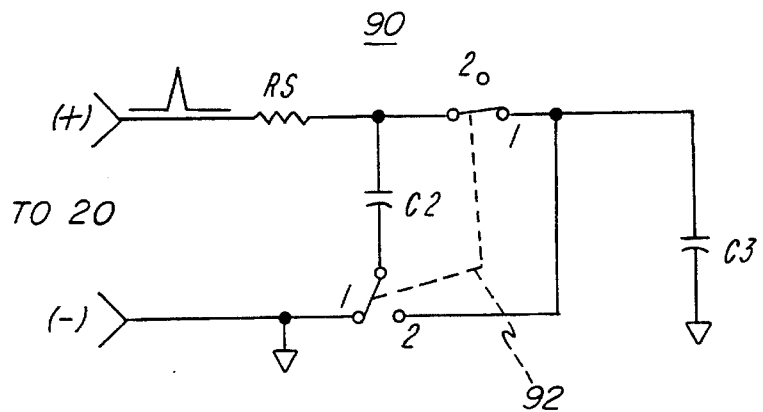
FIG. 6 is an electrical schematic of alternate embodiment of a pulse transmitter.
Figure 15A:
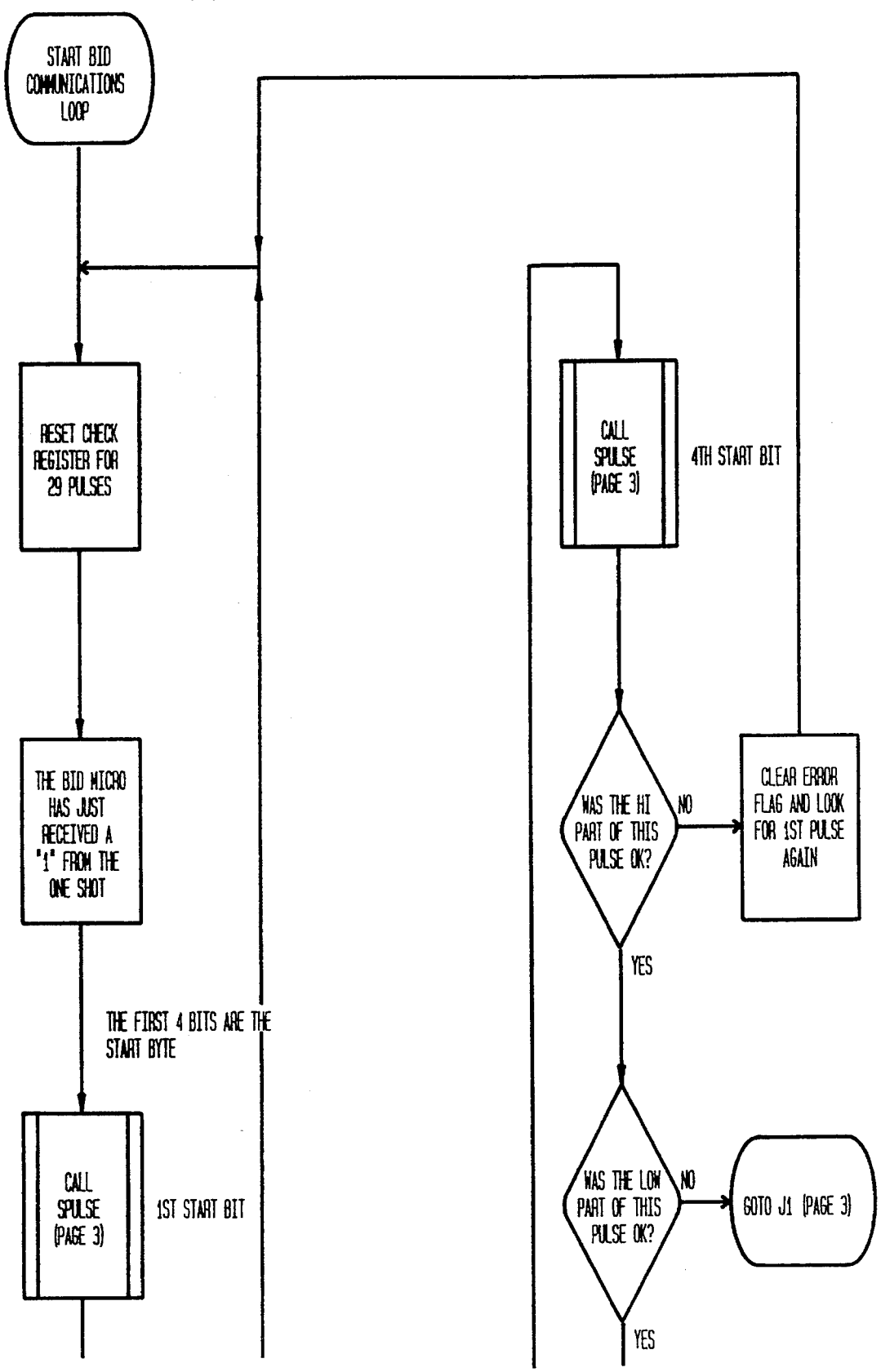
Figure 15D:
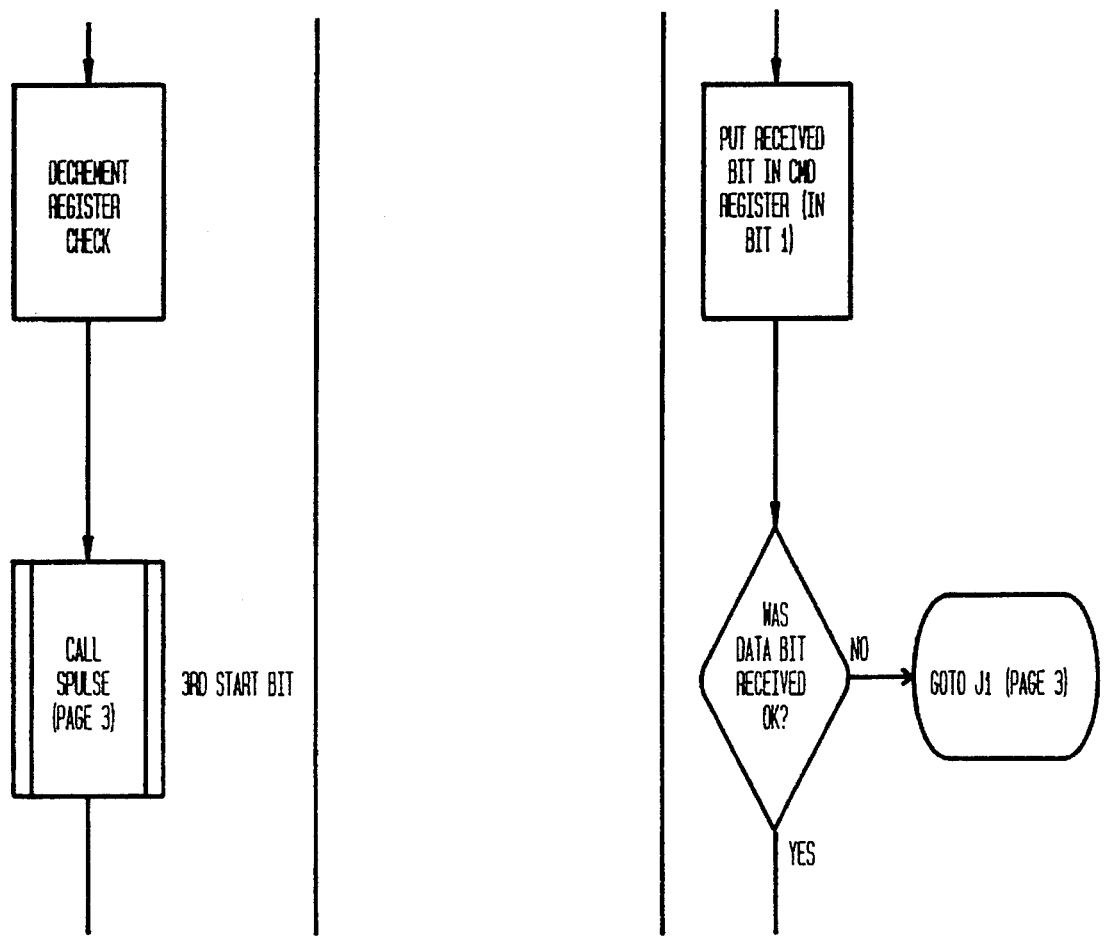
Figure 15F:
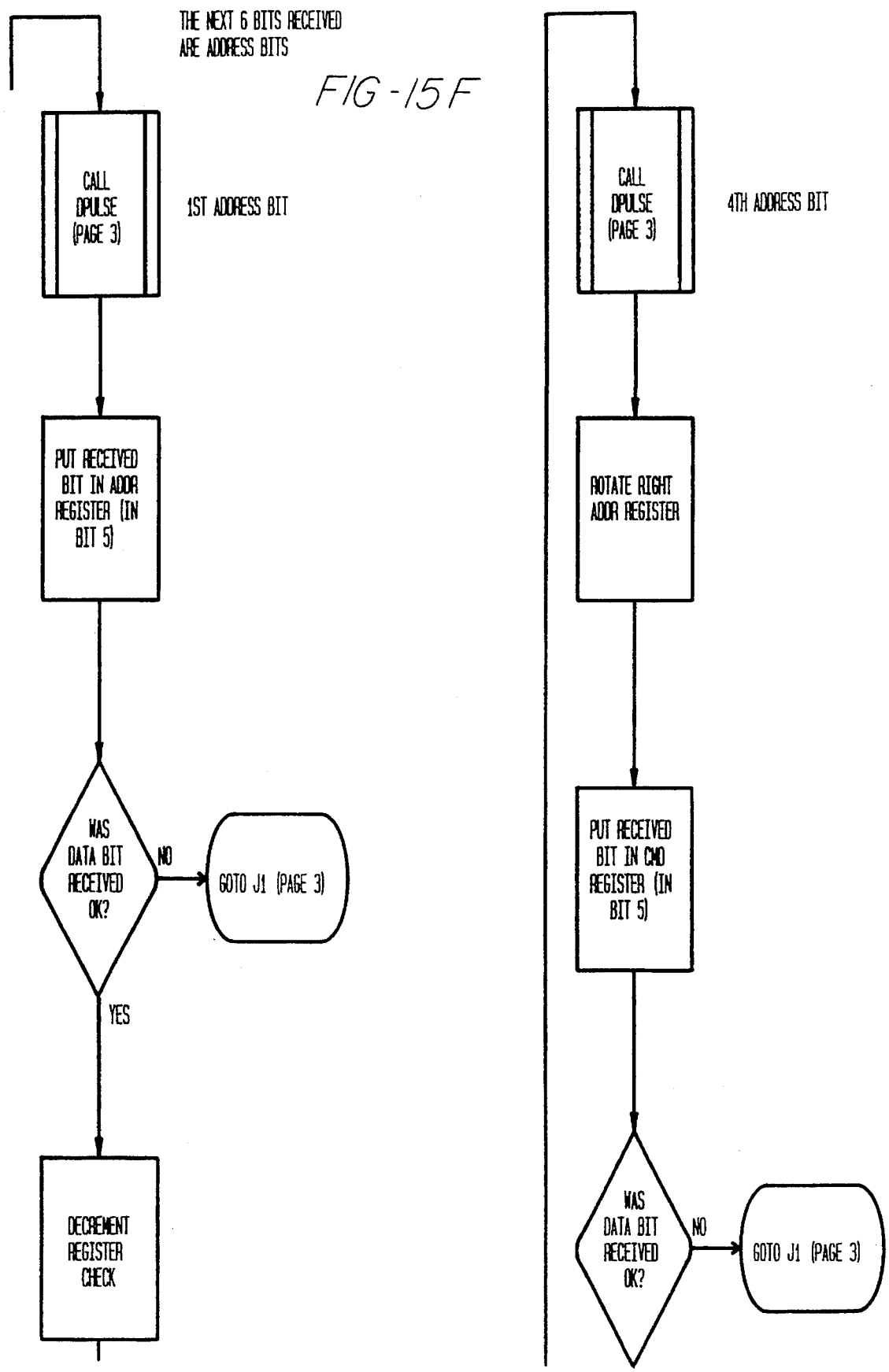
Figure 15G:
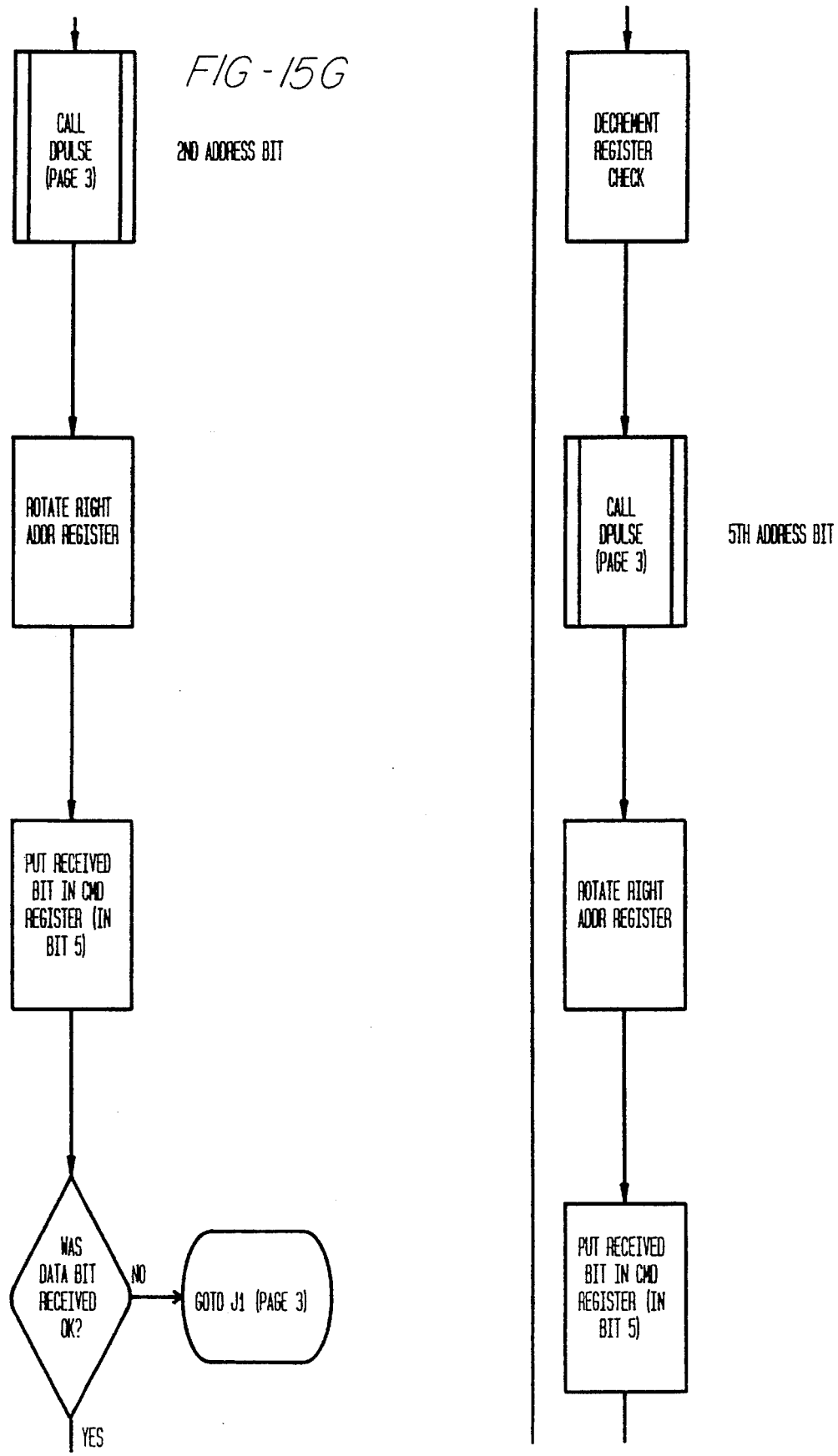
Figure 15H:
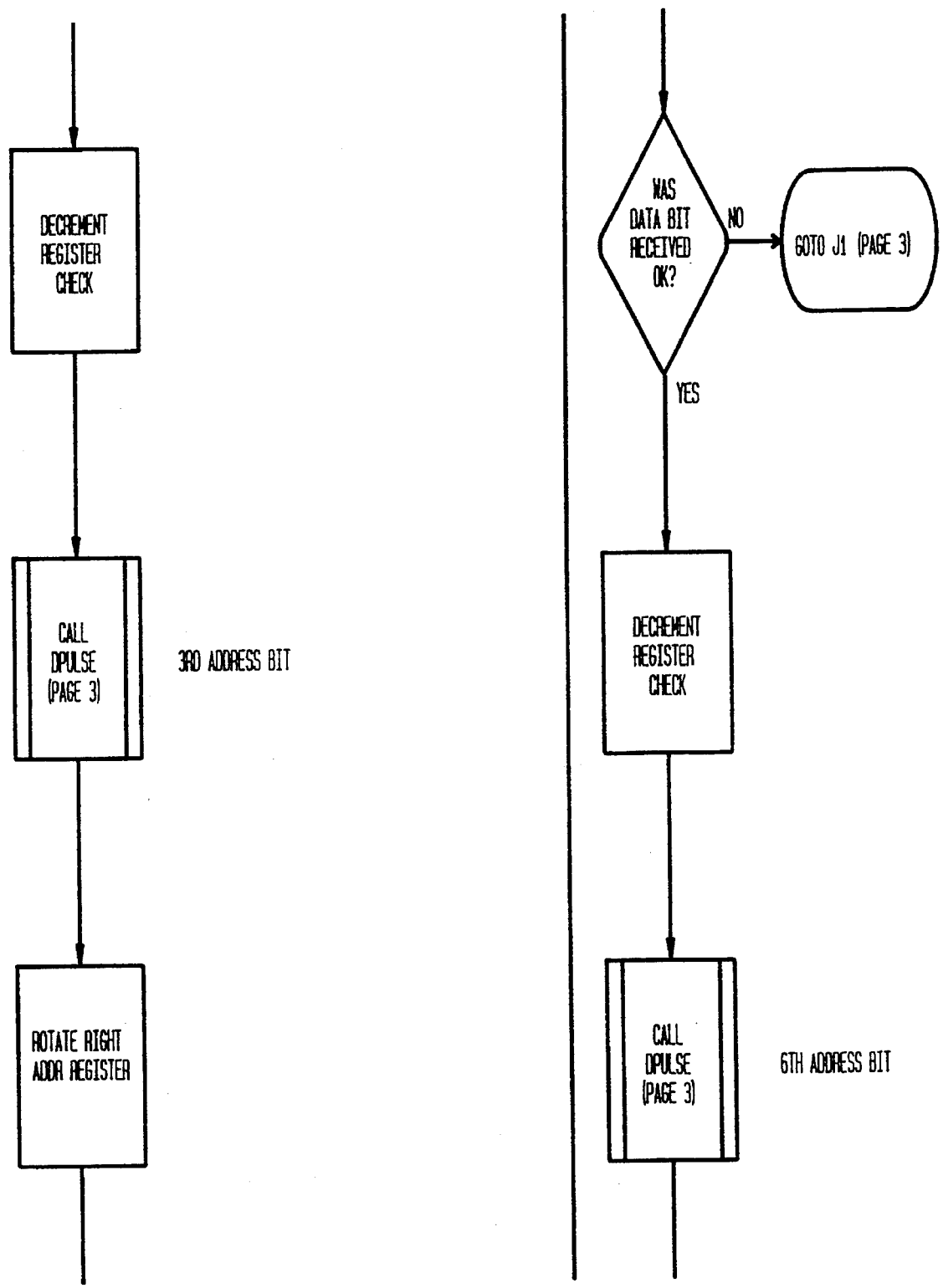
Figure 15I:
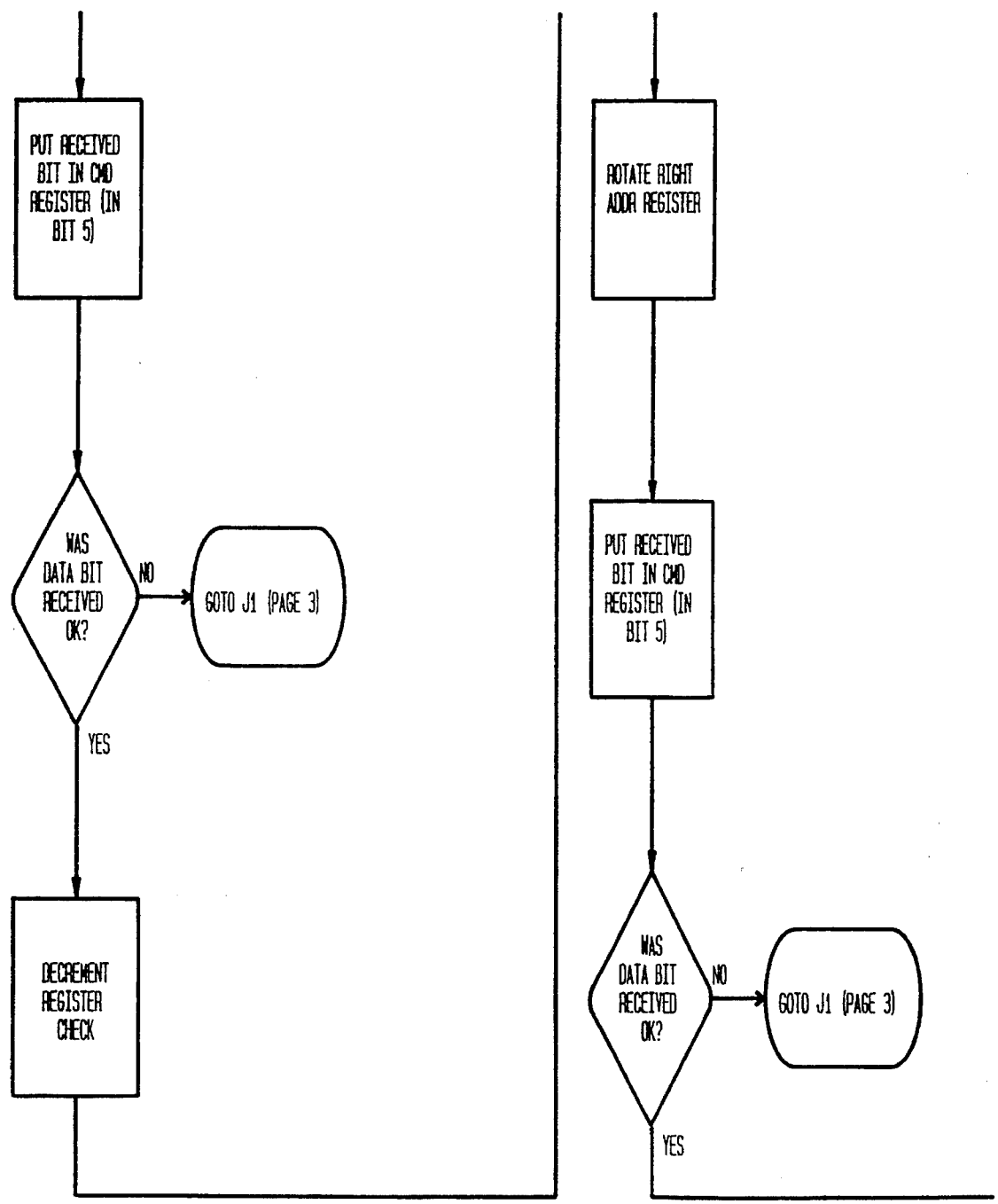
Figure 15J:
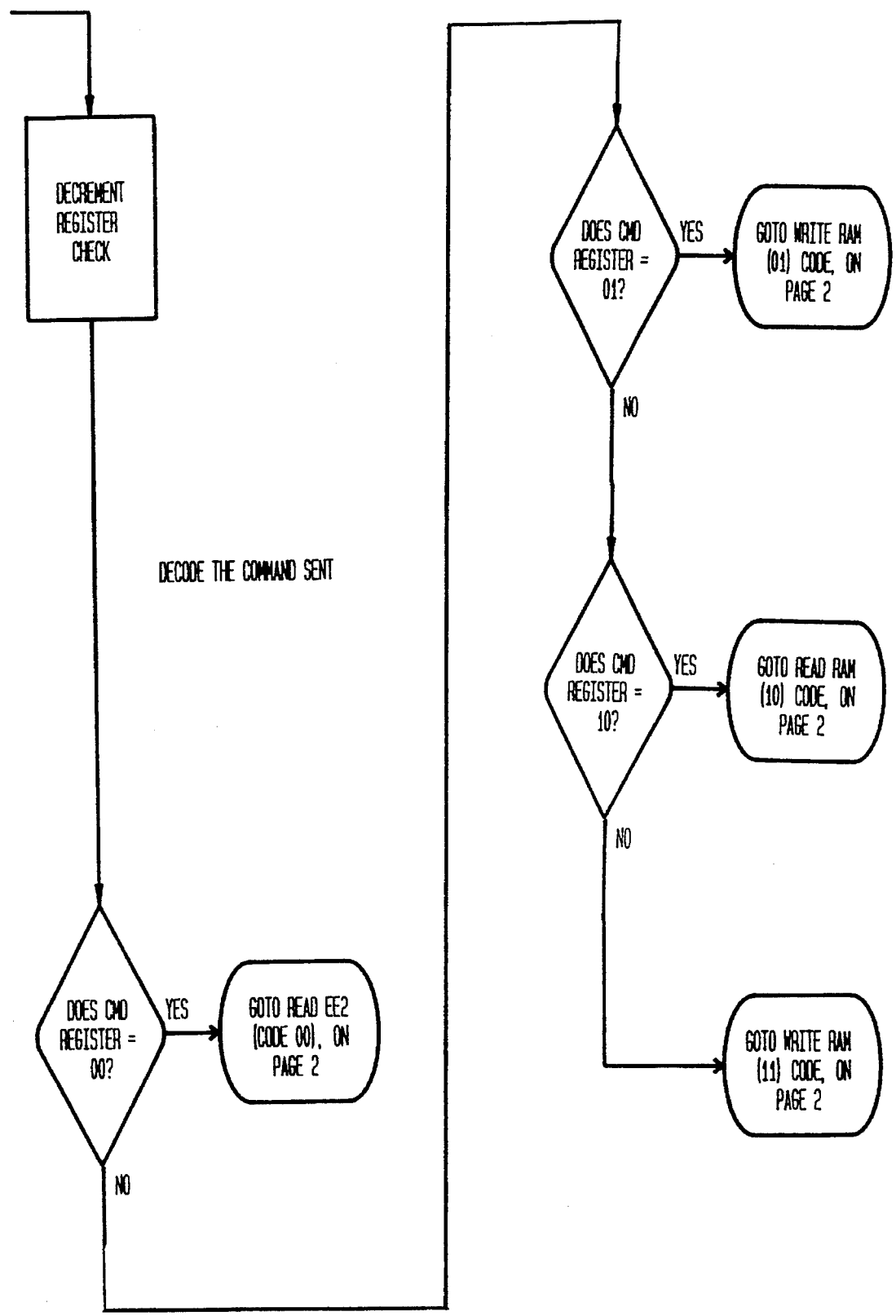

An alternative pulse transmitter 90 is illustrated in FIG. 6 where, rather than short circuiting the terminals of the battery, a higher voltage is imposed on the cable set. This may be done by first charging capacitors C2 and C3 in parallel, and then moving switch 92 to its second position to put the capacitors in series, thus imposing a short duration pulse of higher voltage on the output terminals.

FIG. 7 is an electrical schematic diagram of pulse receiver 100. The receiver is connected to the cable set where it senses pulses having the general waveform shown in FIG. 8. This signal is applied to the circuit 102 which contains a pair of operational amplifiers OP1 and OP2 which form a pulse shaping circuit. All resistor values shown in FIG. 7 are 1% tolerance. FIG. 9 shows a typical output of the circuit at 104 in response to an input signal in the form of FIG. 8. Typically, an individual short duration pulse 110 will have a 10 μs width, followed by an 100 μs space.

The output of circuit 102 is applied to a resettable one-shot multivibrator 106. The multivibrator has a timed output slightly greater than the interval between pulses such that if the pulses are received in sequence, the output remains high, and therefore, if a group of individual short duration pulses is properly received, the output on line 108 of the multivibrator at 106 will take the form shown in FIG. 10 having a pulse 115 of 1.1 ms duration followed by a 5.6 ms space.

Both the pulse transmitter of FIG. 3 and the pulse receiver of FIG. 7 are used in both the battery module 40 and the expansion board 45.

FIG. 11 shows a typical single data pulse, representing a "1", comprising a plurality of individual short duration pulses 110, each of 10 μs duration, followed by a 100 μs space. After a burst of individual short duration pulses, there is a period 112 of approximately 5.6 ms duration where no pulse should be received. The total duration of a data pulse is therefore about 6.7 ms, but it may be made longer or shorter if necessary to facilitate timing factors within the microprocessor 70 or in the expansion board.

FIG. 12 is a waveform diagram showing critical timing events of a typical data pulse. After the beginning of the data pulse 115 at 120, there is a first period 121 (300 μs) where no measurement is made, followed by a second period 122 (700 μs) where the pulse is tested to determine whether any change in status has occurred. A third period 123 (900 μs) is provided, again where the signal is not sensed, and a fourth period 124 (approximately 4500 μs) where the signal is sensed to determine whether any pulse is detected. Finally, a fifth period 125 (300 μs) where no measurement is made.

The first, third and fifth periods are not tested because they are considered transition periods where the signal level could be either high or low, or transitioning between levels. Within the second and fourth periods 122 and 124, the level must not change; otherwise, an error in the detection of the signal is assumed.

Within the battery module 40, there are two types of memories employed. The EEPROM 76 holds information that is not expected to change, except at long intervals. For example, the EEPROM contains the battery identification number, and this number would not change while the module is attached to the battery, but it would be provided with a new number when the module is relocated on a new battery. It also contains calibration information used primarily to calibrate the analog to digital converters used by the voltage and temperature sensors 78 and 79. This data would not normally change unless recalibration became necessary. This data can be changed from the computer 50.

The RAM 72 holds data while connected to a voltage source, which would normally be the case while the module is associated with a particular battery.

The EEPROM read and write commands are represented by FIG. 13. The RAM read and write commands are represented by FIG. 14. Both of these commands are sent from the expansion boards to the battery module, and include four parts: a four bit start byte 130, 134, a two bit command (CMD) code 131, 135 to indicate whether a read or a write command is being sent, an address 132, 136, and a data field 133, 137. For the EEPROM, the data field 133 is sixteen data bits and for the RAM, the data field 137 is eight bits.

The start byte is a set of four logic "1"s to indicate the beginning of each command. The command field (CMD) is a two bit command pulse where 00 hex instructs the module's microprocessor that data from the given address in the EEPROM is to be read; 01 hex means that data from the given address in the EEPROM is to be written; 02 means that data at the given address in the RAM is to be read; and 03 hex means that data at the given address in the RAM is to be written.

The microprocessor 70 contains a program in the PROM 74 which responds to the read and write commands shown in FIGS. 13 and 14, and also an internal program that reads the voltage and temperature data to RAM 72 at regular intervals.

The communications link between the battery module 40 and the expansion board 45 is initiated at the battery charger side of the link. A pulse transmitter similar to the one shown in FIG. 3 is generated under control of a microprocessor contained in the expansion board to impose a high power, low energy pulse at the output terminals on the charger and across the charge cables and connector to the battery 10. Due to inductance in the cables 20 and 25 and the battery 10 itself, the signal at the other end of the signal path is significantly attenuated. The higher cell sizes produce the strongest signals.

The receiver circuit in the module 40 turns this pulse into a digital pulse which can be read by the module's microprocessor. Note that it takes ten pulses to create the waveform 115 shown FIGS. 10 and 14. If any of the ten pulses is missing, that pulse would be broken up and rejected as an invalid pulse by the microcontroller.

Data to be written to the BID module 40 is always sent twice for verification. If the expansion board 45 is reading the BID module 40 it always reads the same location in secession for verification.

Figure 26A:
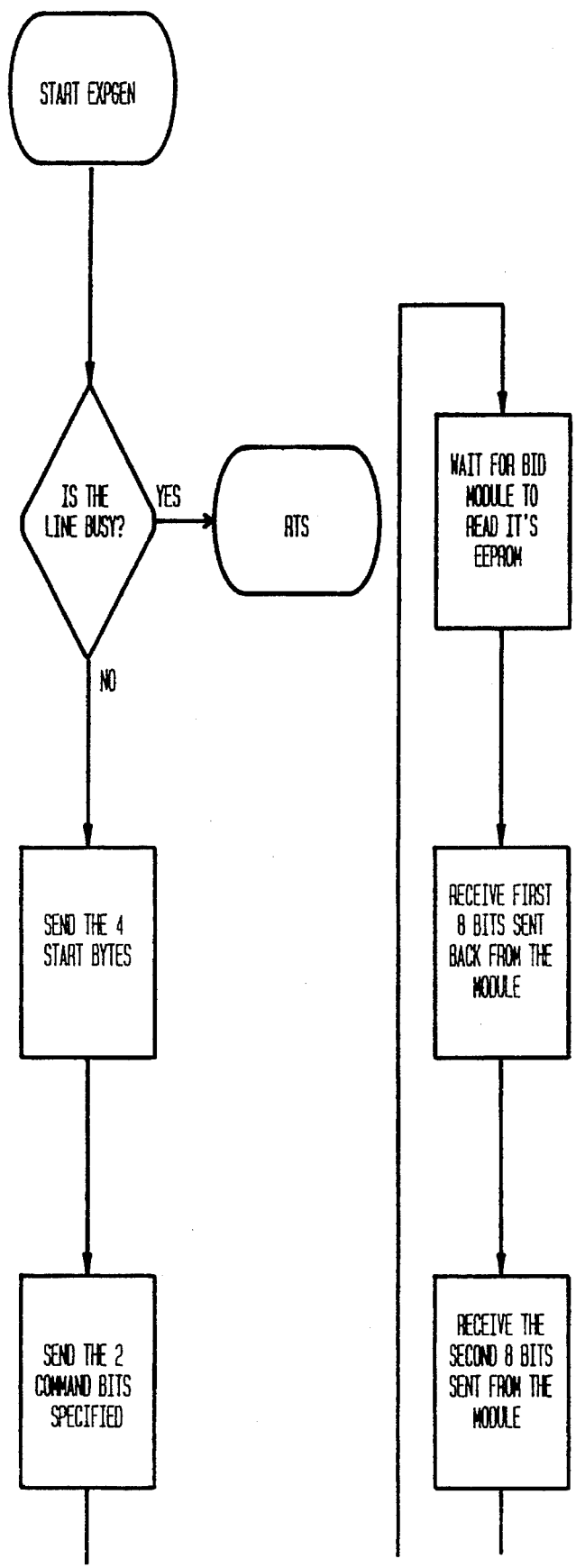
Figure 26B:
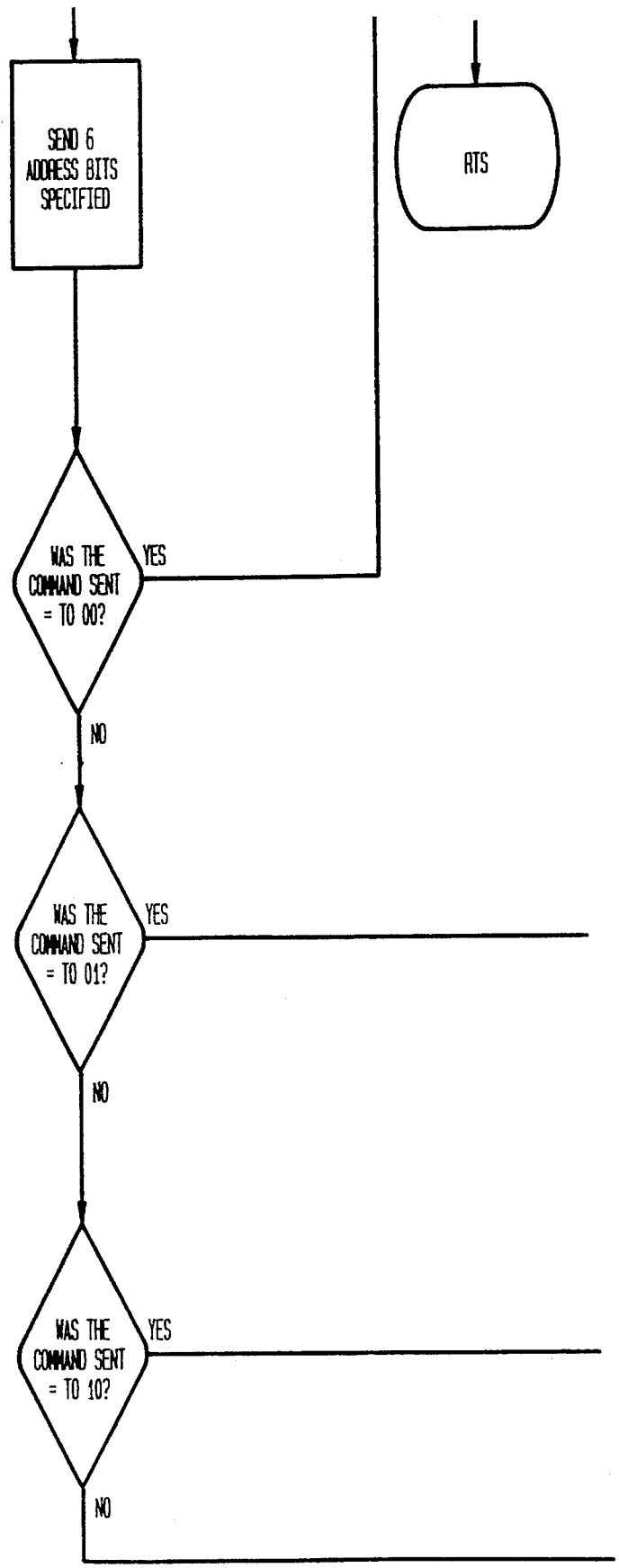

The expansion board 45 (referred to as EXP) general flowchart (FIG. 26) provides an overall picture of the structure of the expansion board side of a communication system. A communication link is initiated by the software contained in expansion board whenever a battery is first connected to the charger, or periodically after the charging operation is complete, or whenever requested by computer 50.

First, four start pulses are sent to the module 40, indicating that a communication event is beginning. The next two data bits sent are command bits which indicate what the module is to do (read or write data). The following six pulses specify the address of the module's memory to be used. At this point the EXP program decodes the CMD code 131, 135 (FIGS. 13 and 14).

If CMD is 00 hex, the expansion board will expect sixteen pulses to be sent back from the module's EEPROM memory. If the CMD code is 01 hex, the expansion board program will send sixteen bits of data to the module's EEPROM memory, that data specified in main program loop. If the CMD code is 02 hex, it means that the module will be sending eight bits of data back from its RAM, and if the CMD code is 03 hex, the module should expect eight bits of data to be sent from the expansion board to the RAM 72.

FIGS. 27 to 30 describe how the communications works from a MAIN loop of the program. Any of the following four subroutines may be called at any particular point in the expansion board program, provided that the proper data had been previously set up (data to be sent, address). Note that these routines are executed prior to or after battery charging operation.

Figure 27A:
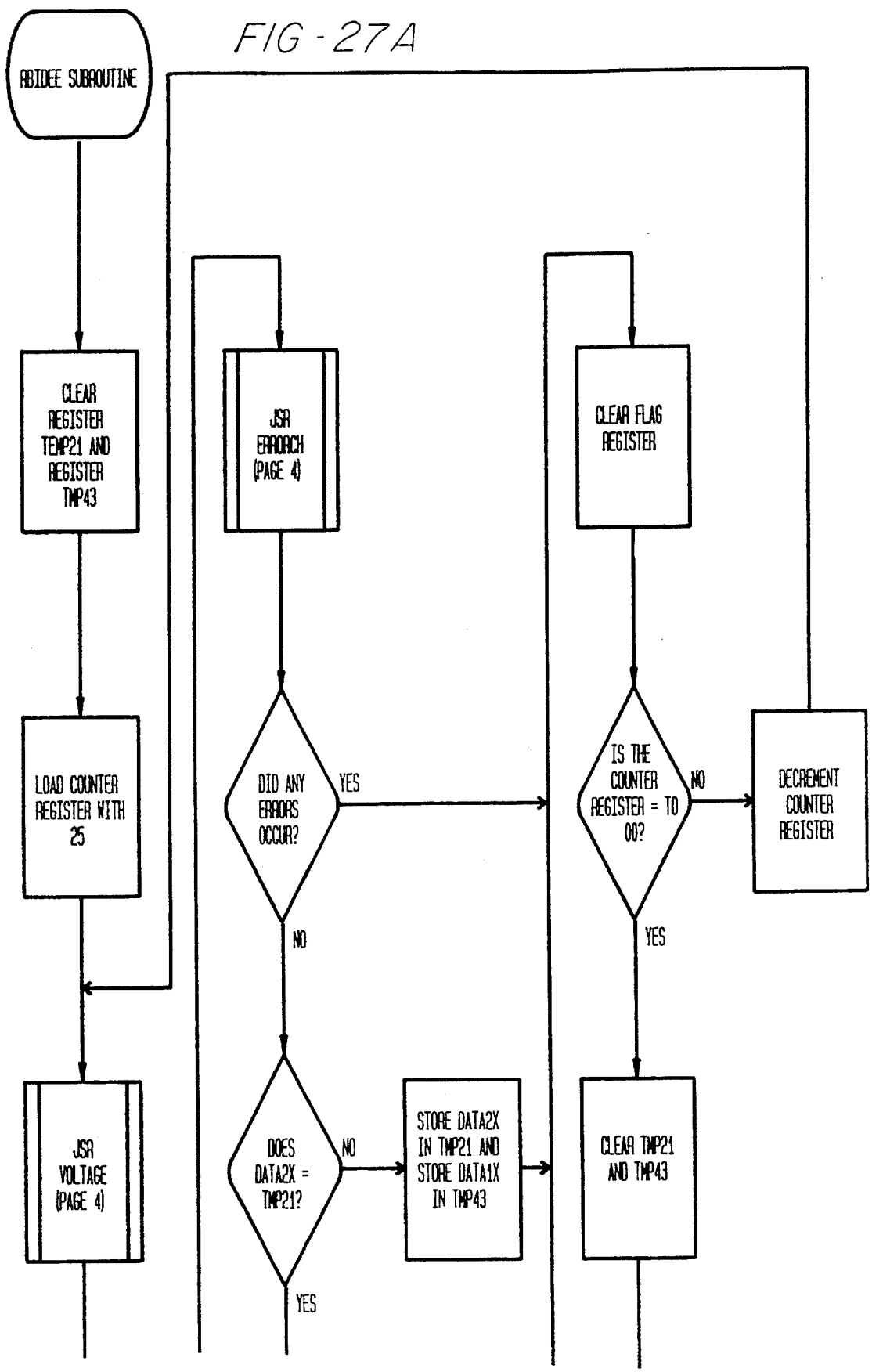
Figure 27B:
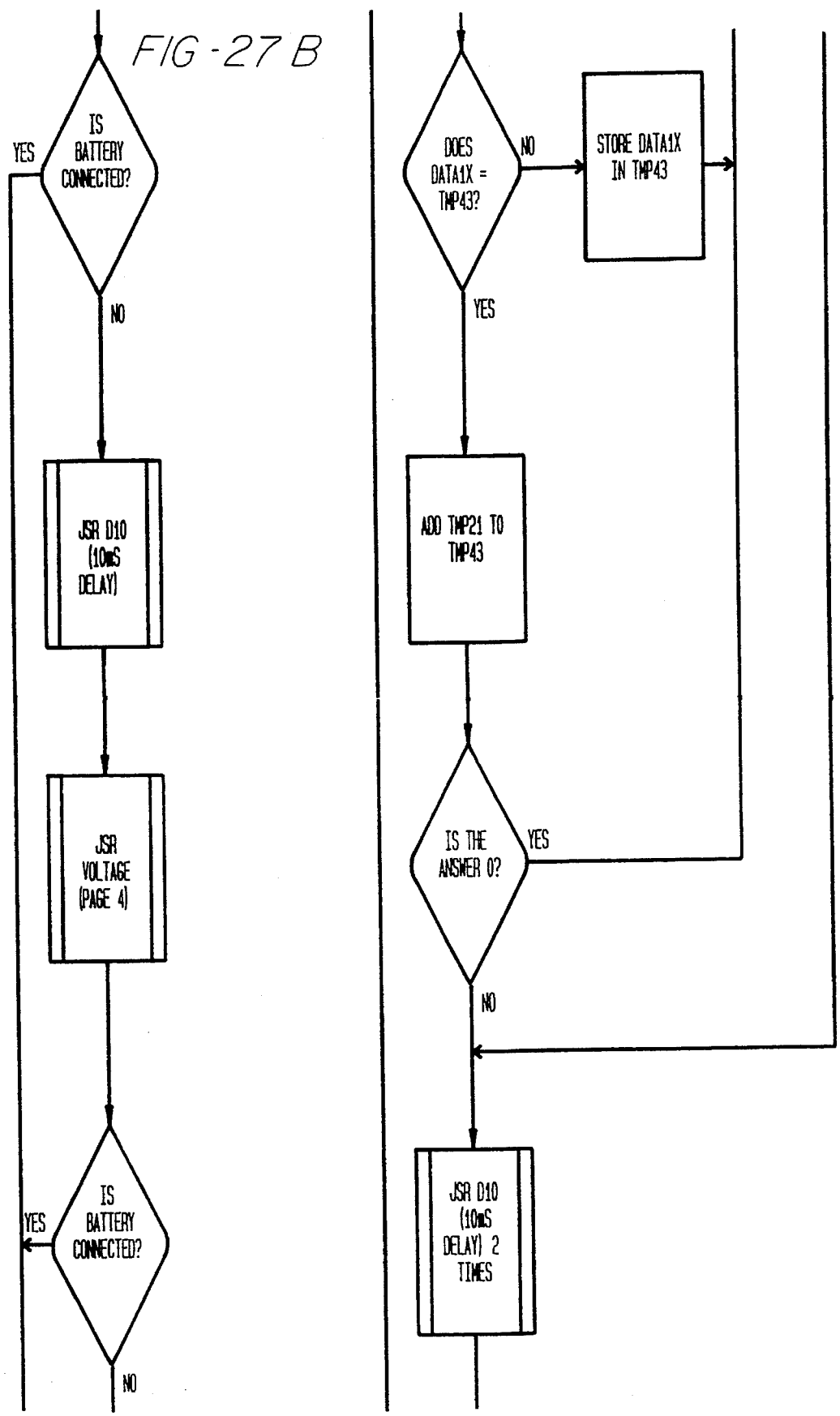
Figure 27C:
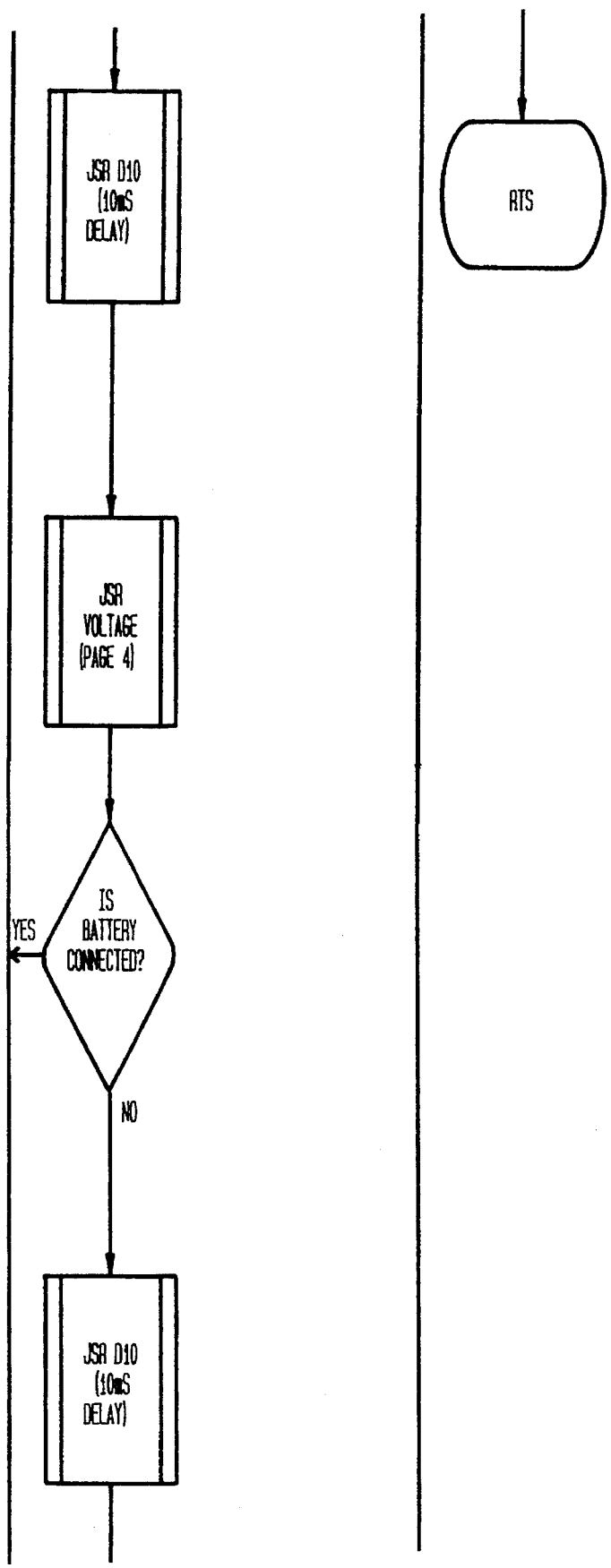

The first subroutine is RBIDEE, shown in FIG. 27, which reads sixteen bits from module's EEPROM. Prior to calling this program, the EEPROM address to read was loaded into a register ADDR. A counter is set so that the dialogue with the BID module may be repeated up to 25 times. This amount of redundancy is required because of the usually noisy environment in which these system operate.

Once all the parameters are checked and set, routine BIDW (FIG. 31) is called. This is where the actual pulses are transmitted to and received from the BID module. The sixteen bits of data from the module must be received error free twice for the data to be accepted. Of course, the data must match twice also. If the data has been accepted, error free, it is checked to see if it is 00. This value would represent a value completely outside the expected range of values, and therefore represents an obvious error, even though the data has been read twice.

Since 00 is not an acceptable answer, the counter is decremented and the loop is started again. If the counter hits 00 (meaning a valid data was never obtained), the answer is cleared. A delay at the end of the subroutine insures the code will be in synchronism with module's code the next time a communication is required.

Figure 28A:
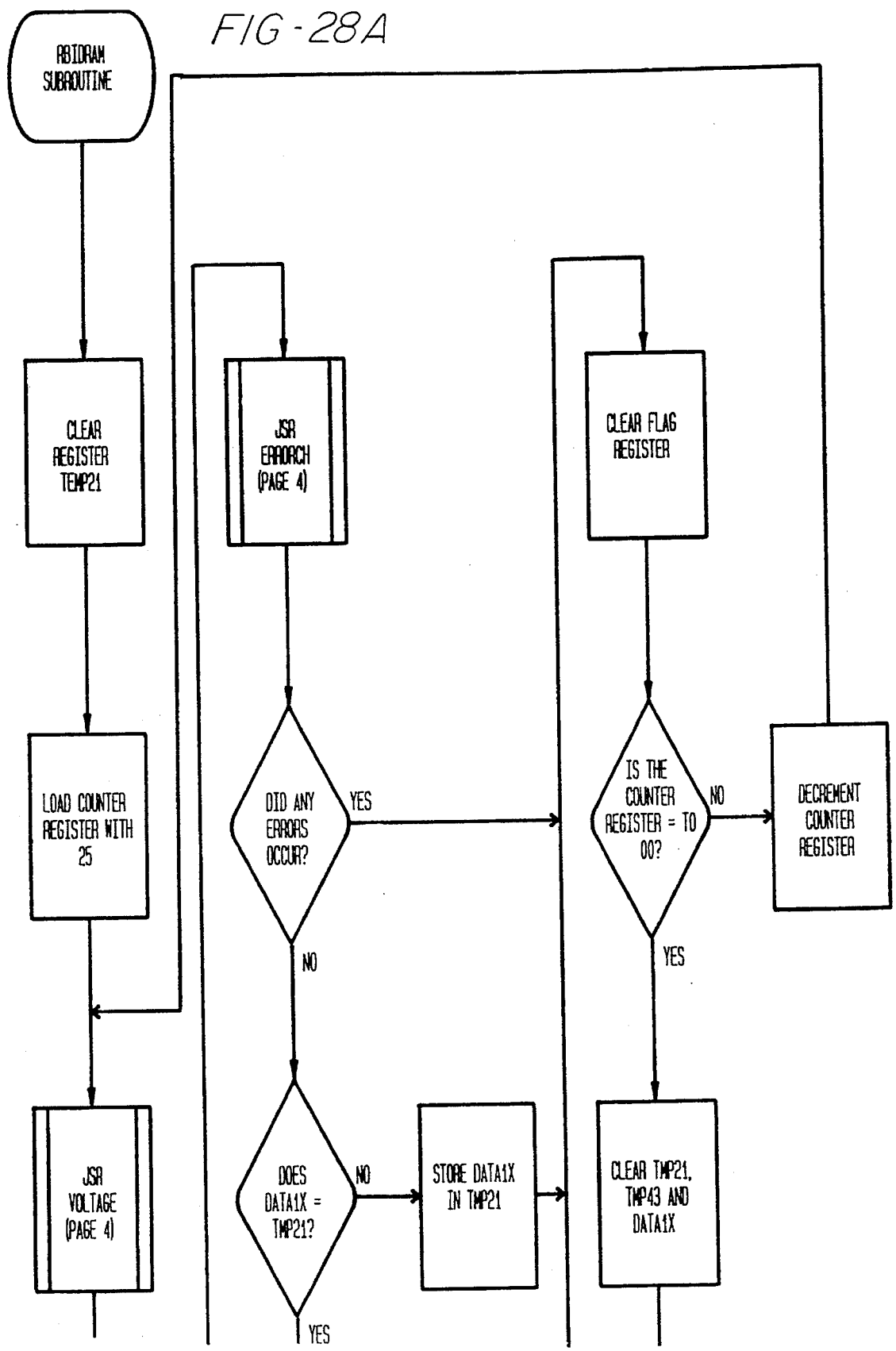
Figure 28B:
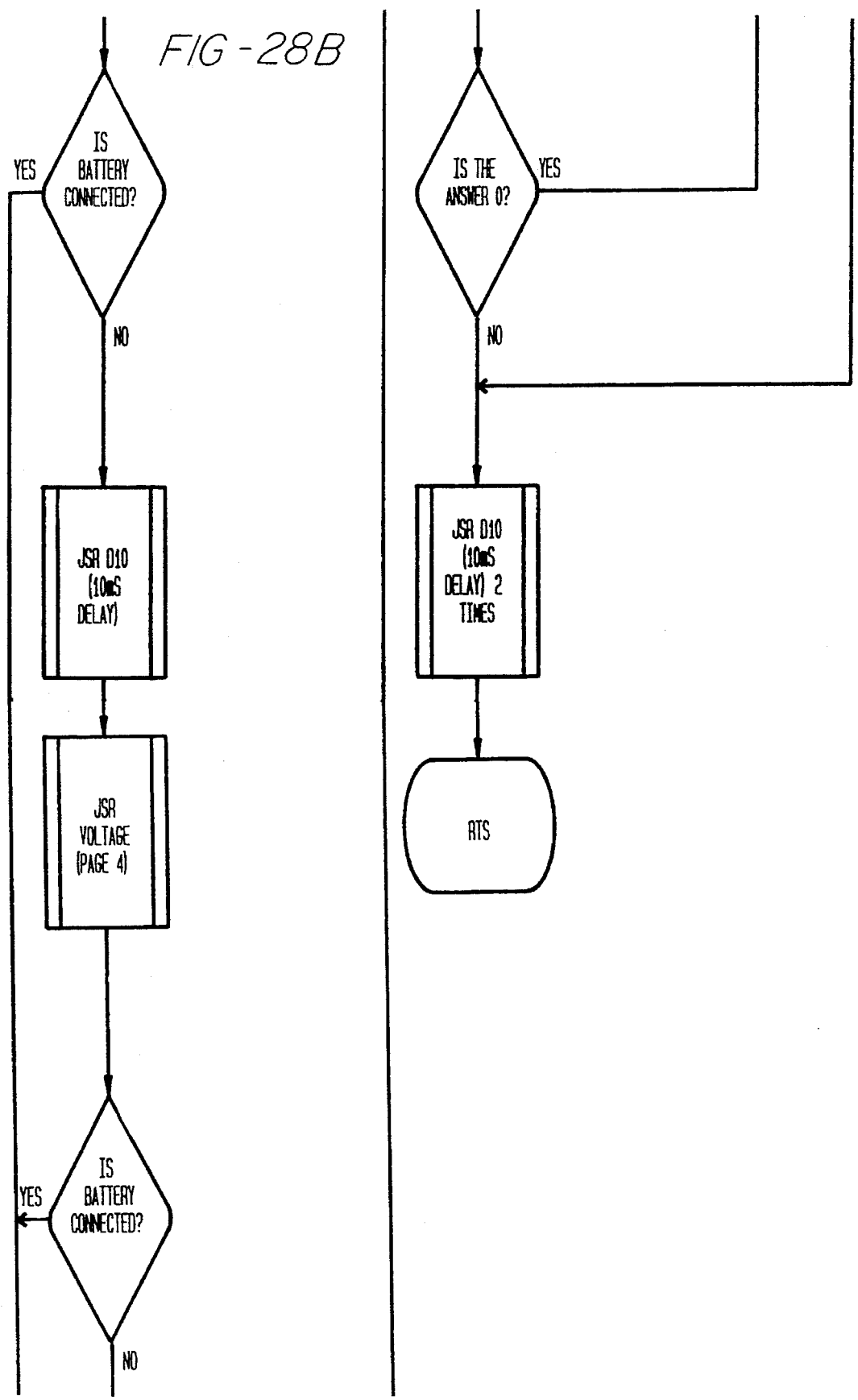
Figure 28C:
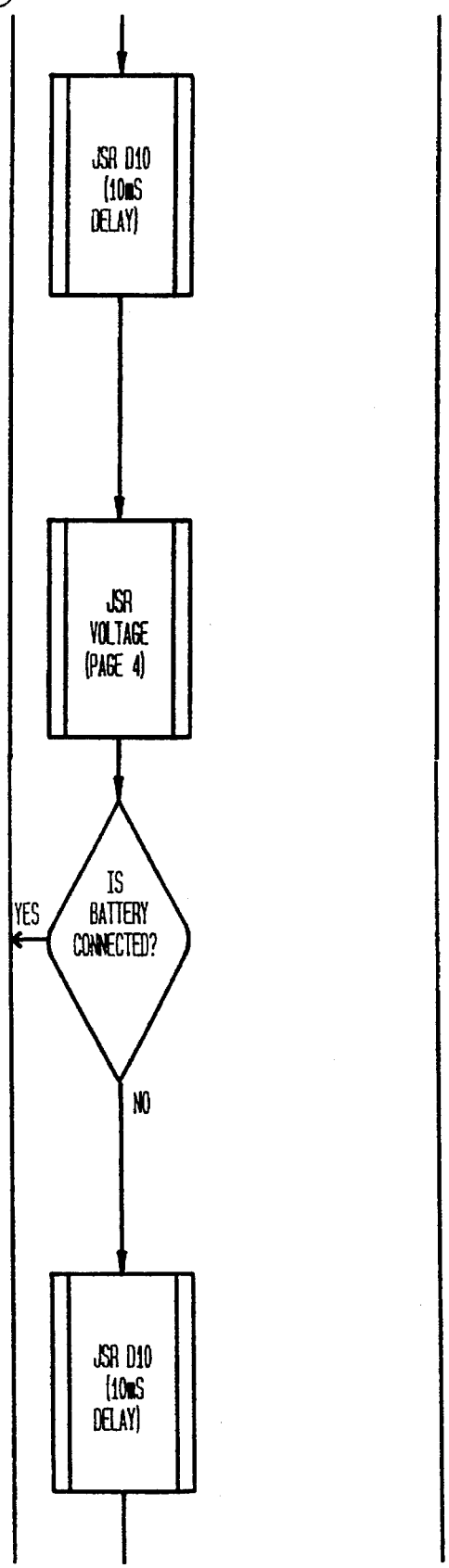
Figure 29A:
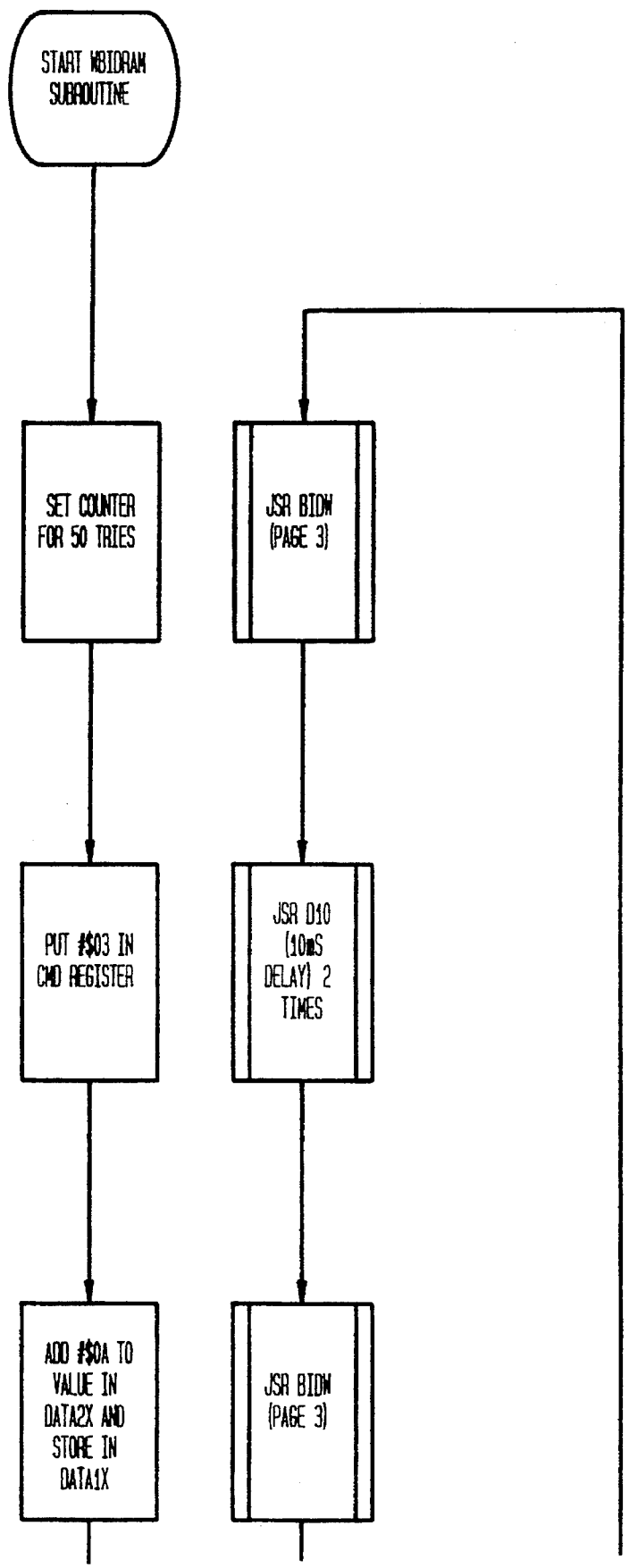
FIGS. 29A–29D together comprise a computer flow chart of a communications subroutine called RBIDRAM.
Figure 29B:
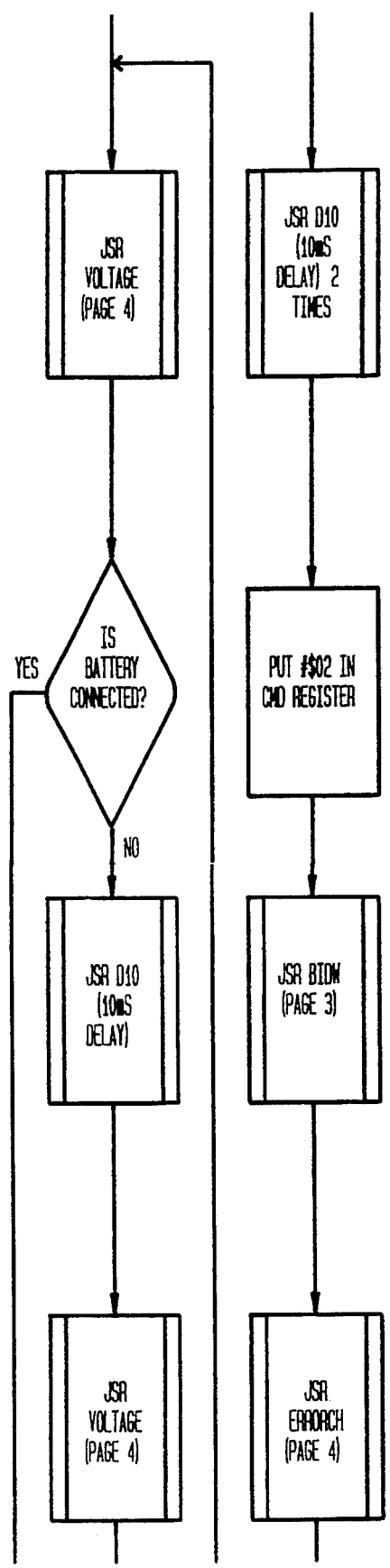
Figure 29C:
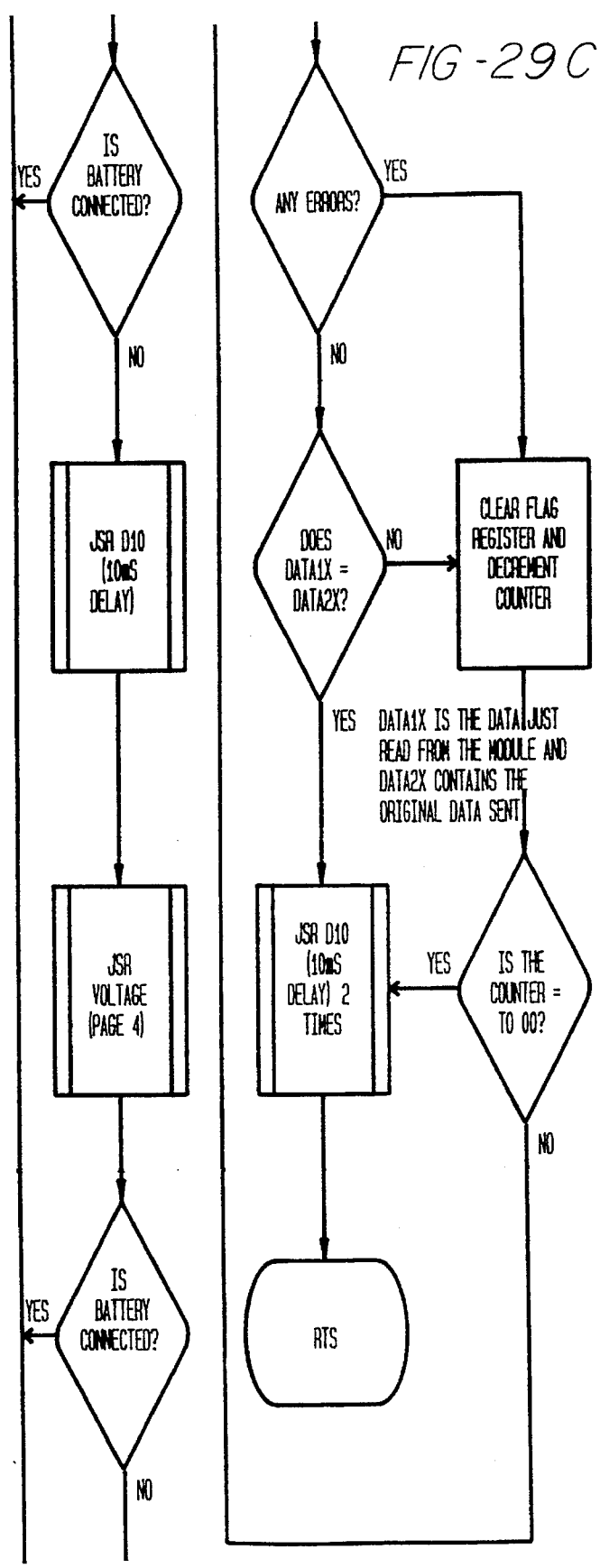
Figure 29D:
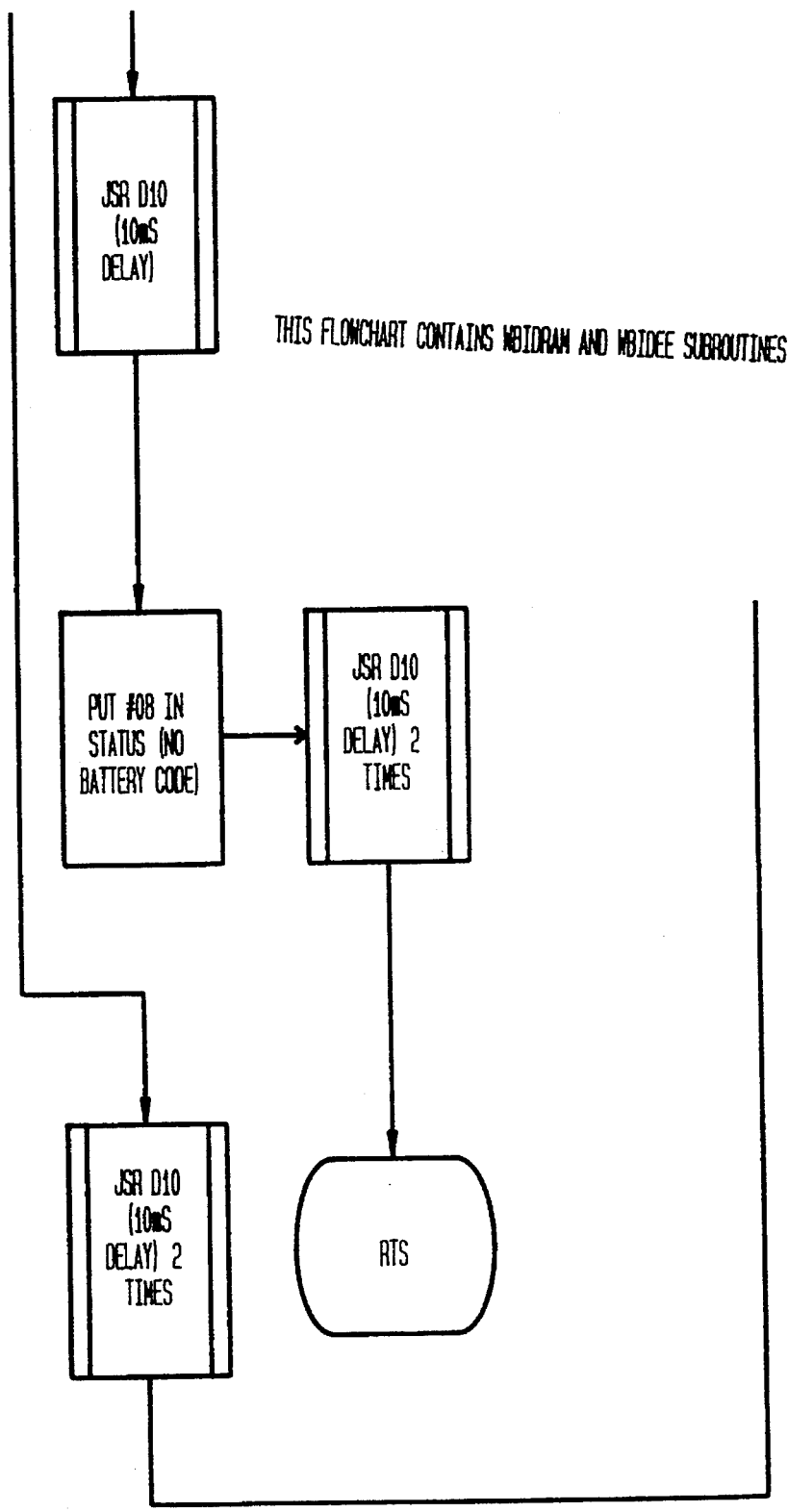
Figure 29E:
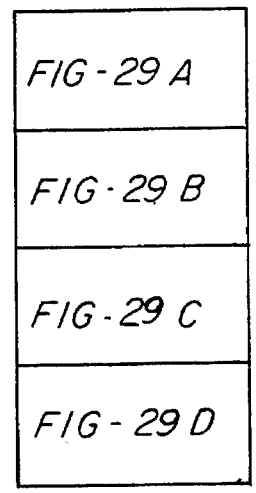
FIG. 29E is diagram showing how the drawings of FIGS. 29A–29D should be arranged.

The second subroutine is RBIDRAM, shown in FIG. 28, and it reads eight bits from the BID module's RAM. Prior to calling this program, the RAM (BID RAM) address to read was loaded into the register ADDR. A counter is set for 25 counts, this means the dialogue with the BID module could happen up to 25 times. Next, the register CMD is loaded with 02 (HEX) this is the command for reading BIDRAM. Once all the parameters are checked and set, routine BIDW (FIG. 31) is called, as previously described.

The third subroutine is the WBIDRAM routine, shown in FIG. 29. It's purpose is to write eight bits of data from the EXP to the BID module's RAM. In this routine, the counter is set for 50 tries. The CMD register is loaded to HEX 03. Two 10 mS delays are called for to insure synchronization with the BID module. Now, subroutine BIDW (FIG. 31) is called twice in a row. This sends the same data two times in a row to insure the module reads it correctly. If not sent twice, the module will reject all data sent.

The EXP reads the same BID RAM address it just wrote to (via the BIDW routine, FIG. 31)). If no errors (reading data back) occurred, DATA1X (the answer from module) is compared to DATA2X (the original data sent), and if they are the same, the routine ends with the normal resynchronizing delay.

Figure 30A:
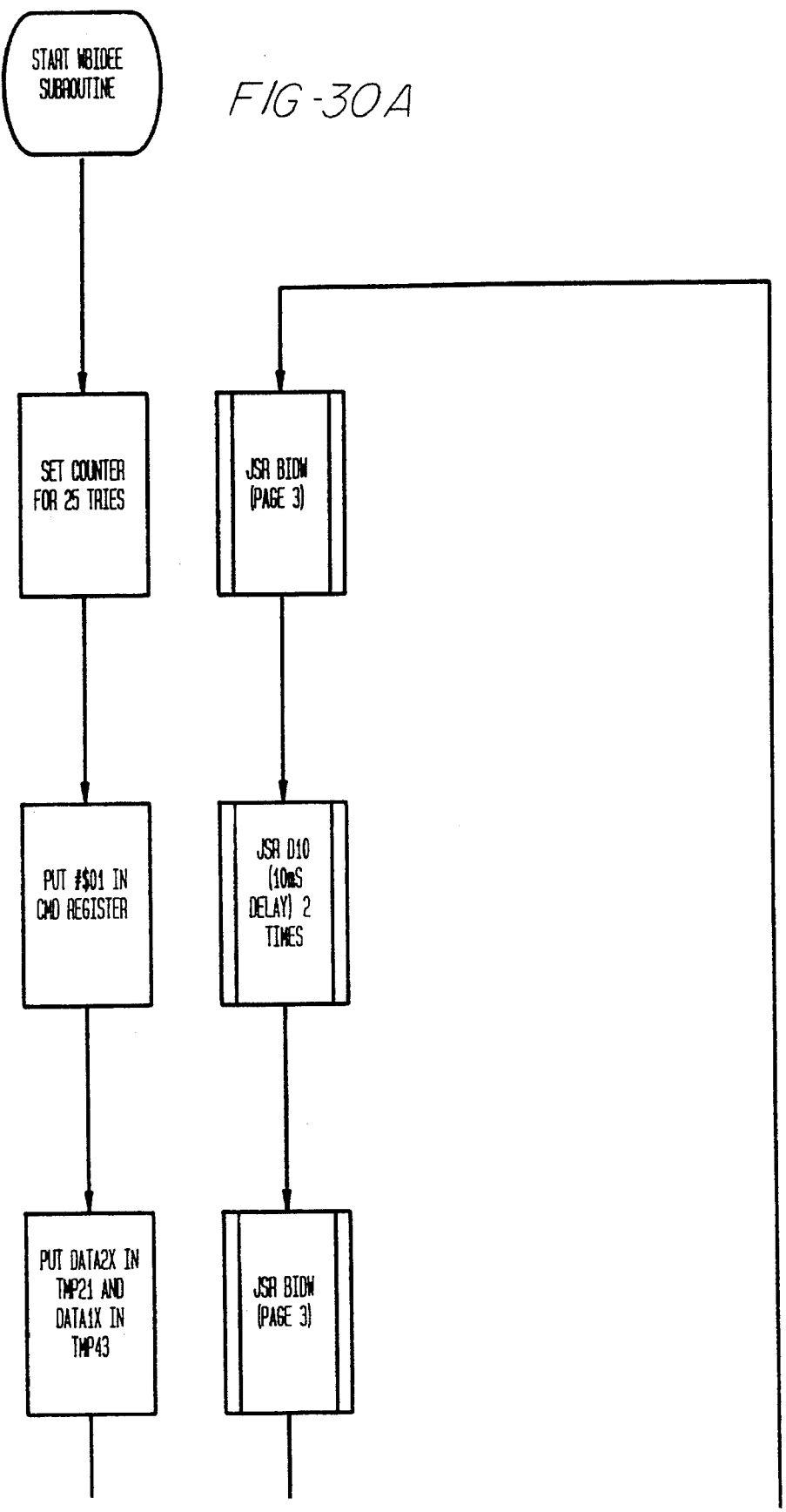
Figure 30B:
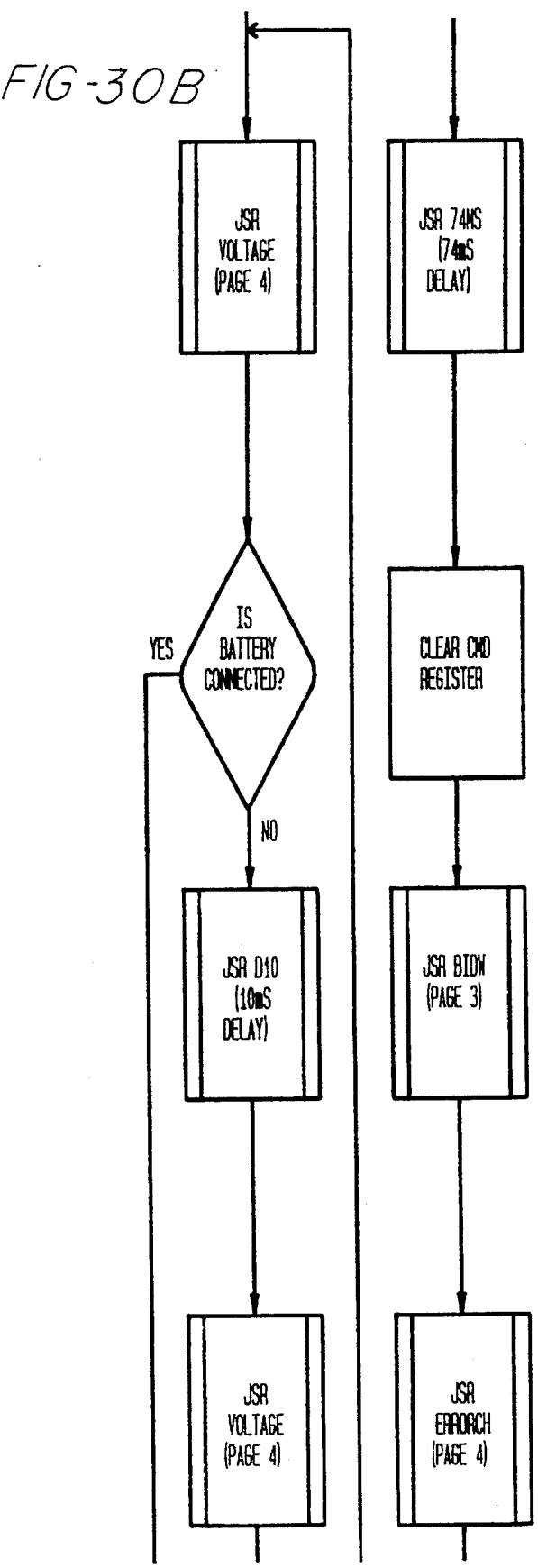

The fourth subroutine, shown in FIG. 30, is the WBIDEE routine. It's purpose is to write sixteen bits of data from the EXP to the BID module's EEPROM. In this routine the counter is set for 25 tries. The CMD register is loaded to HEX 01. Two 10 mS delays are now called for to insure synchronization with the BID module. Subroutine BIDW (FIG. 31) is called twice in a row. This sends the same data two times in a row to insure the module reads it correctly. If not sent twice the module will reject all data sent. Now the EXP reads the same BID EEPROM address (after 74 mS delay for writing to EEPROM) it just wrote to (via BIDW FIG. 31). If no errors (reading data back) occurred DATA1X and DATA2X (the answer from module) is compared to TMP43 and TMP21 respectively (they hold the original data sent), if they are the same, the routine ends with the normal resynchronizing delay.

Figure 31A:
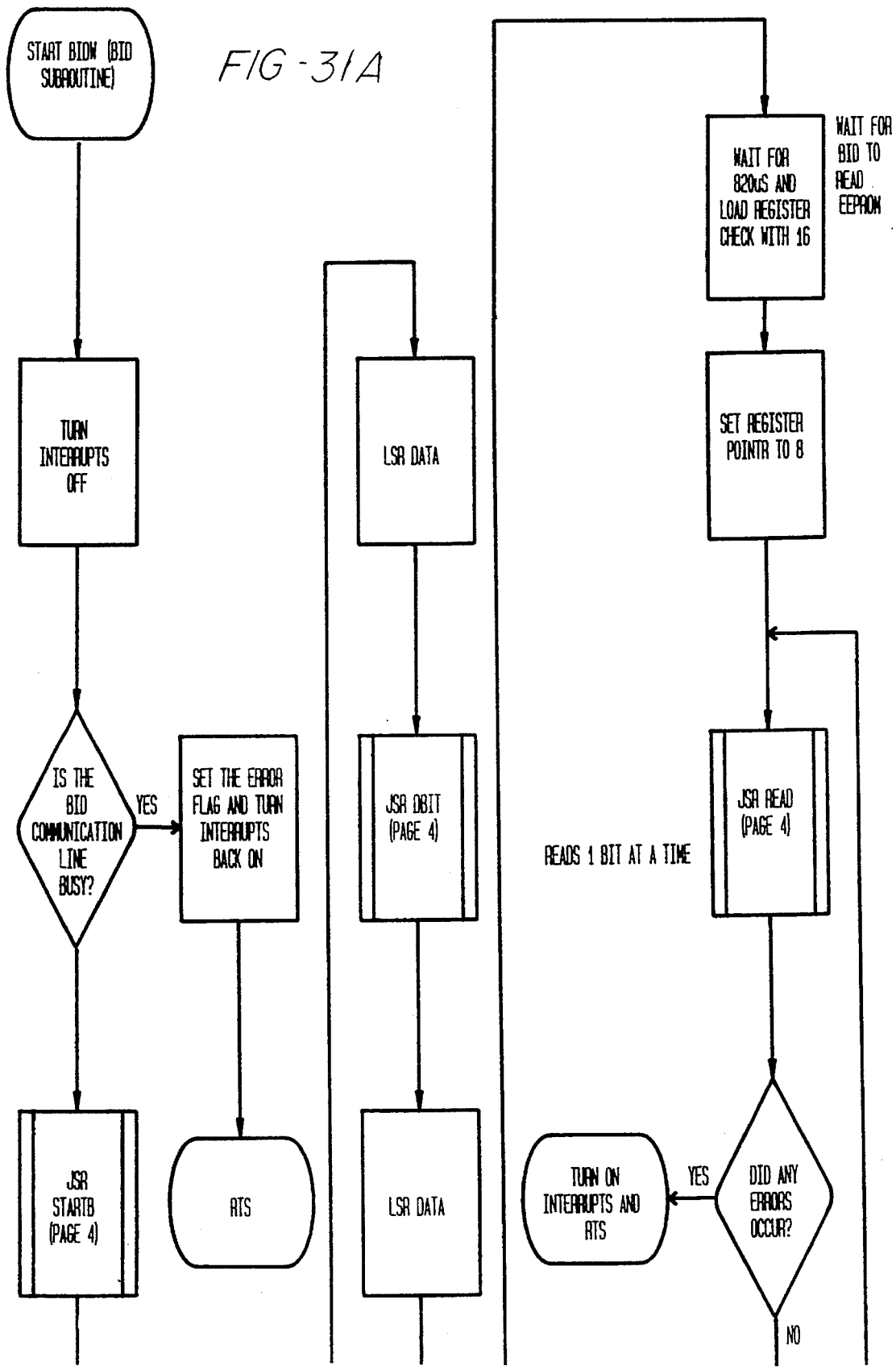
FIGS. 31A–31K together comprise a computer flow chart of a communications subroutine called BIDW.
Figure 31B:
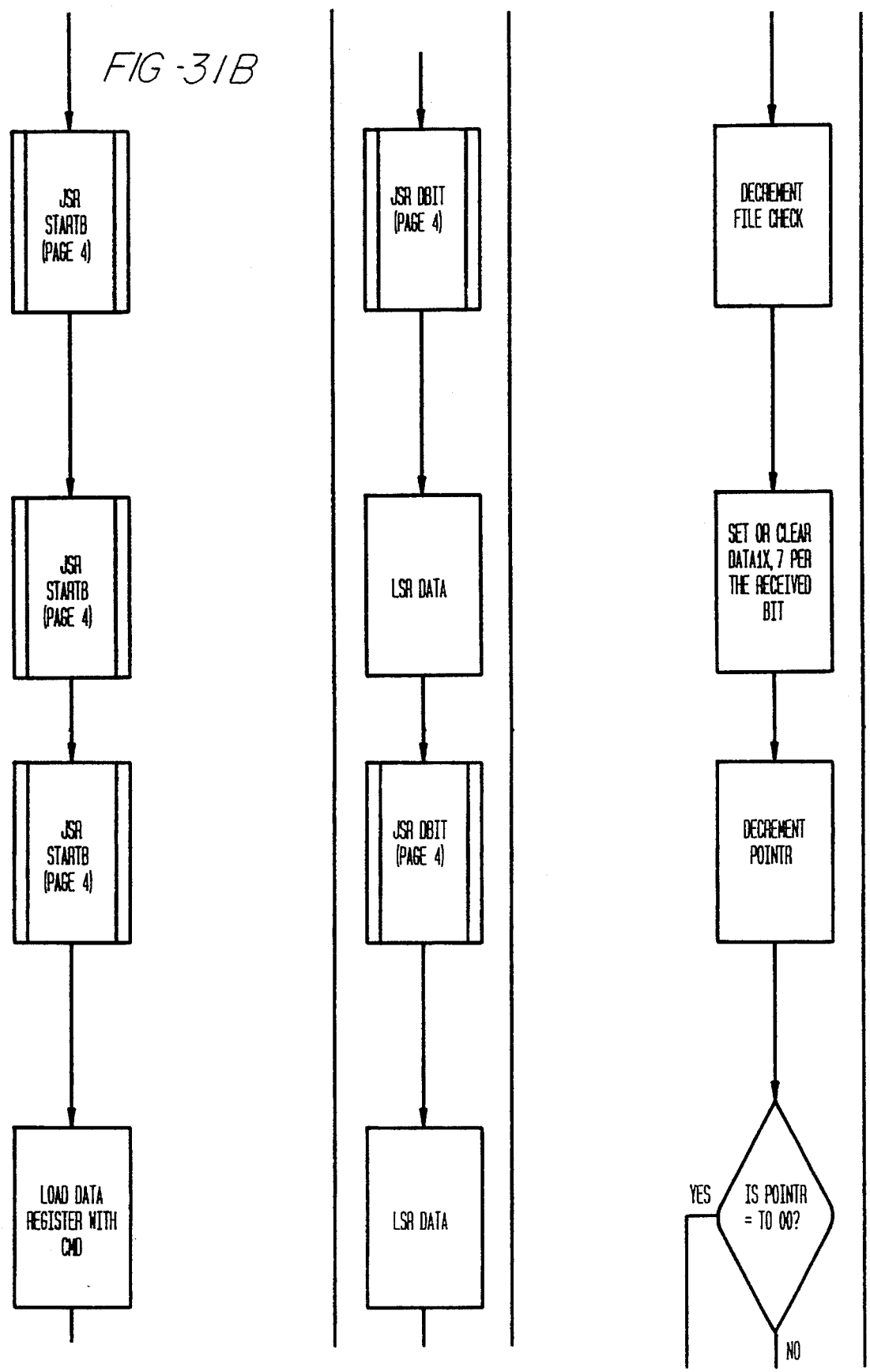
Figure 31D:
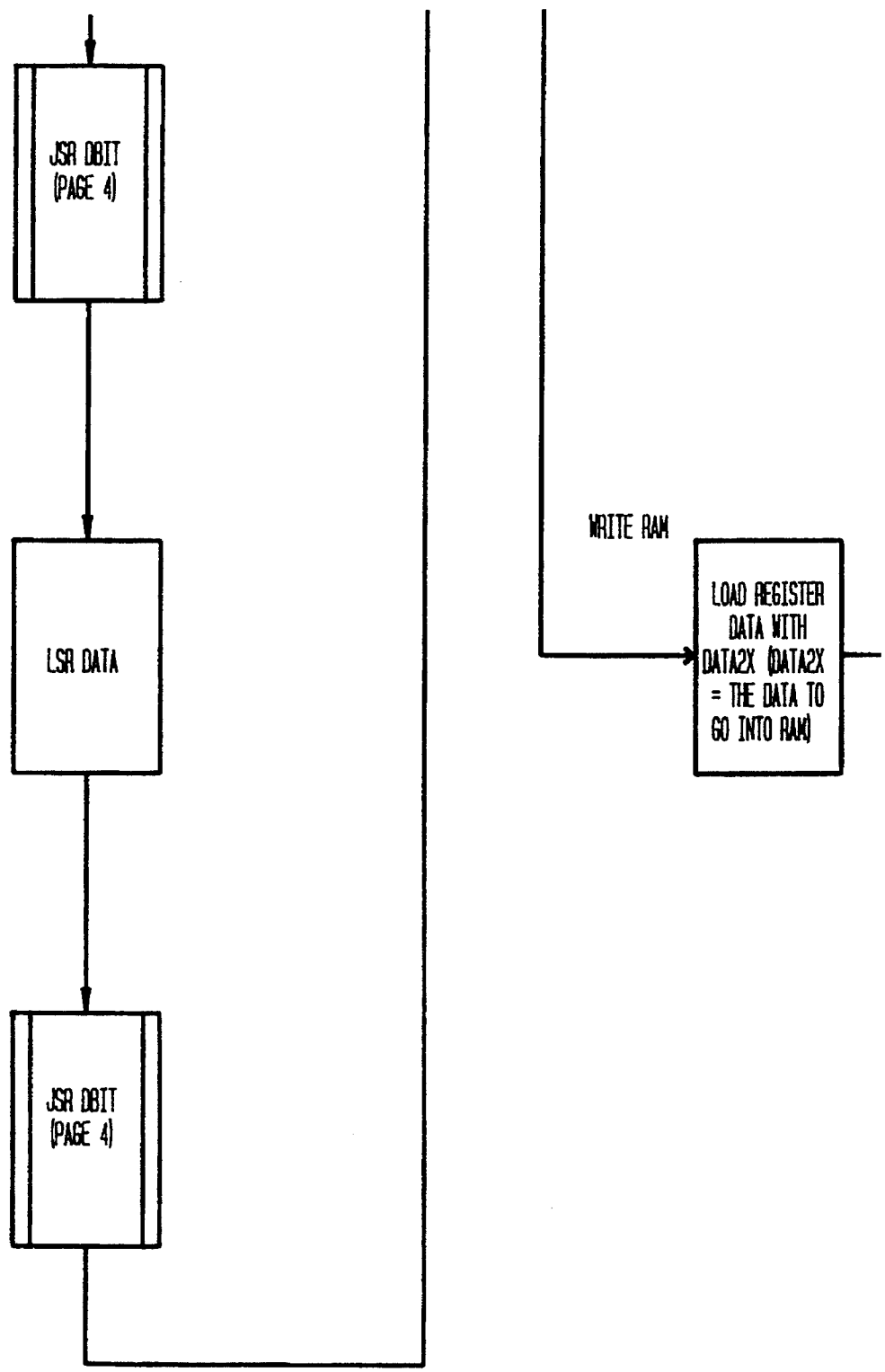
Figure 31E:
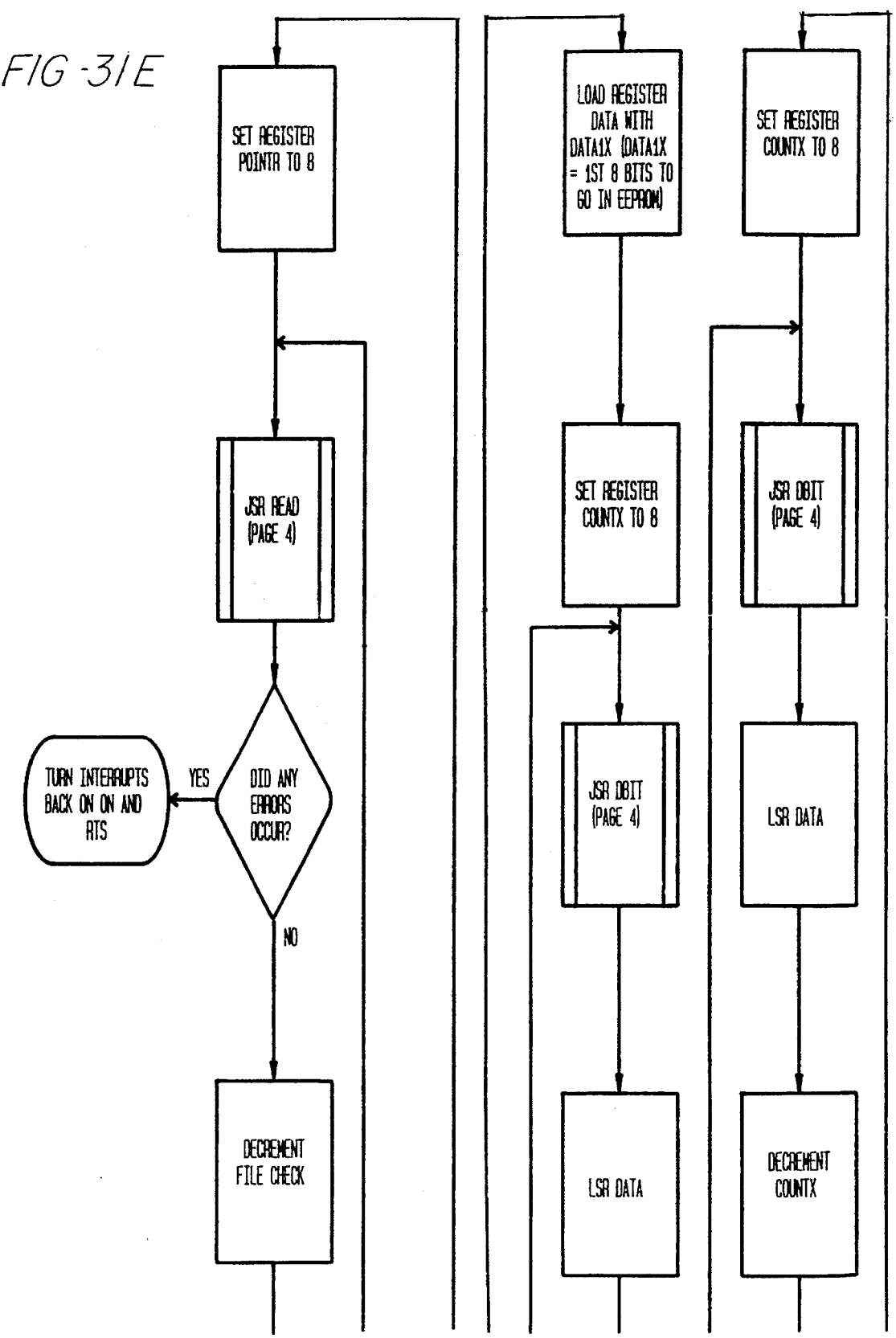
Figure 31F:
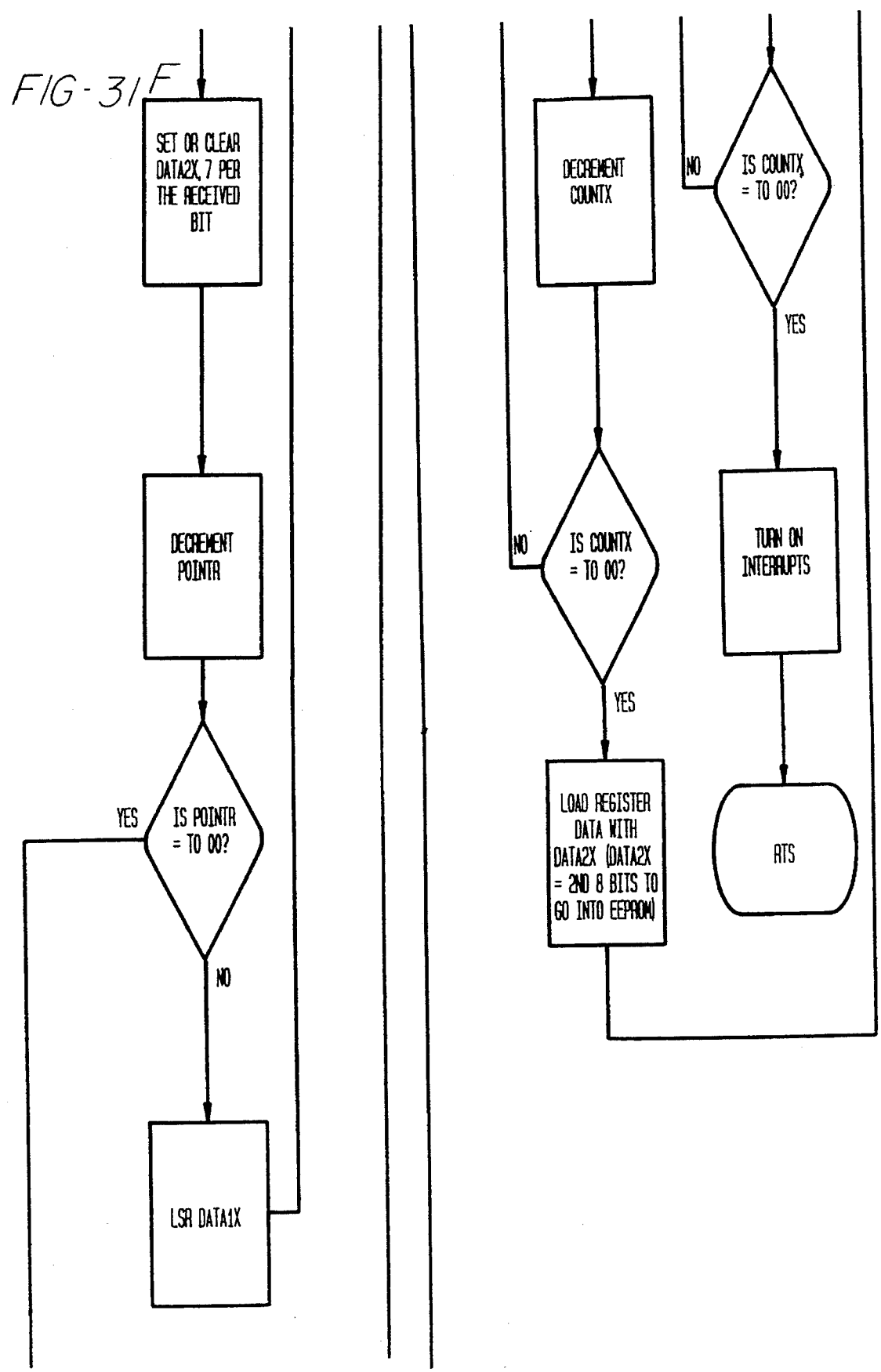
Figure 31G:
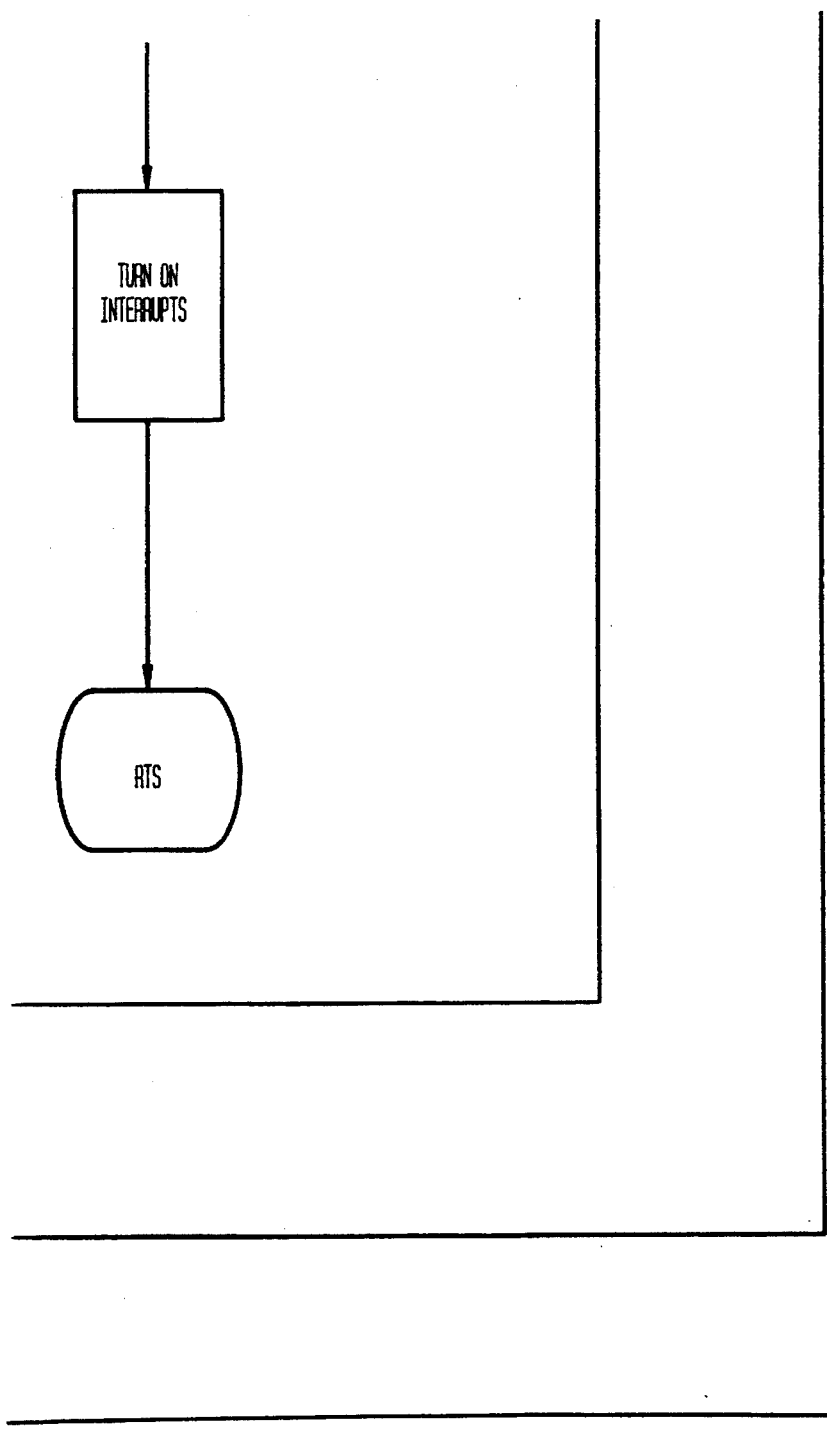
Figure 31H:
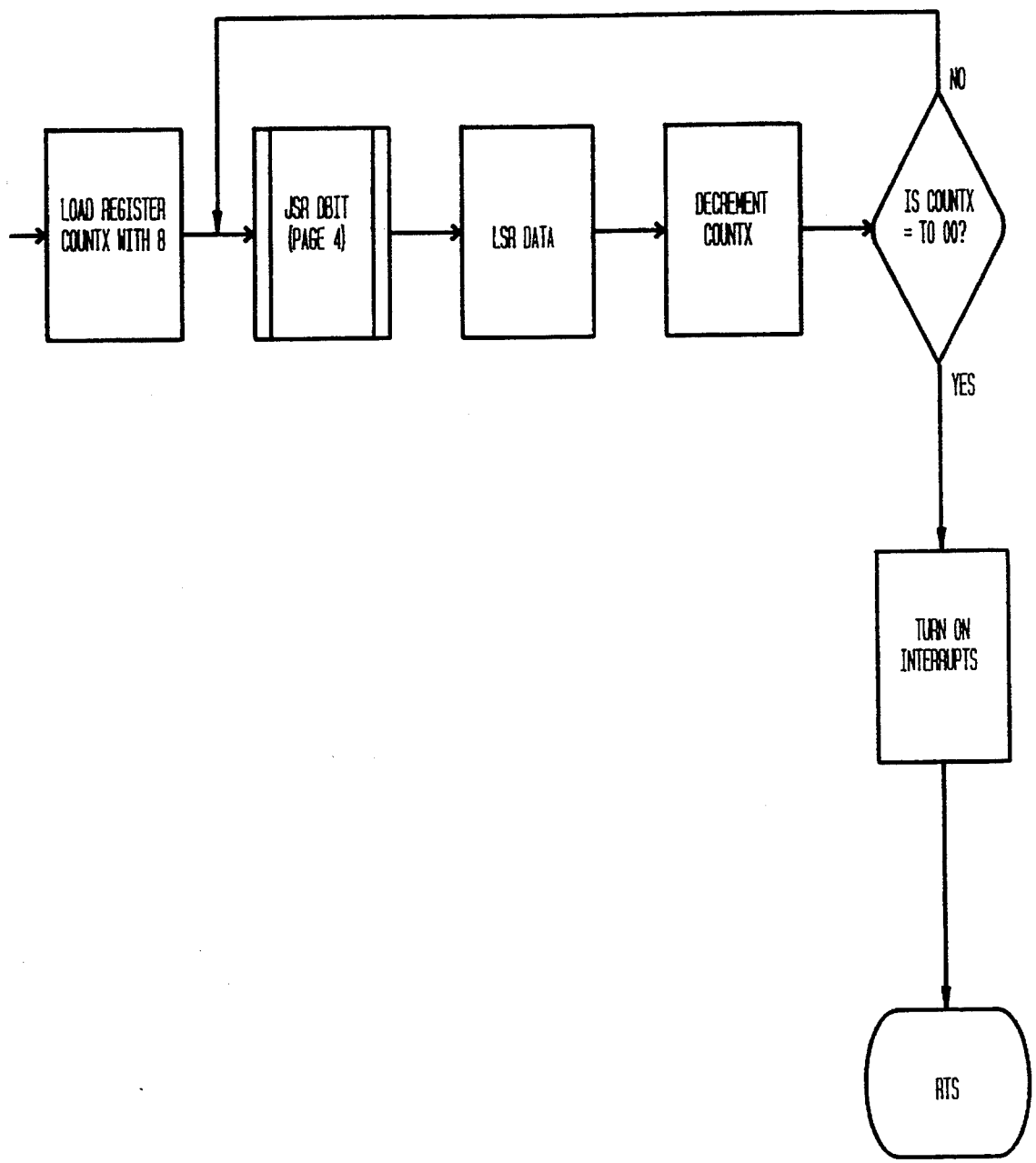
Figure 31I:
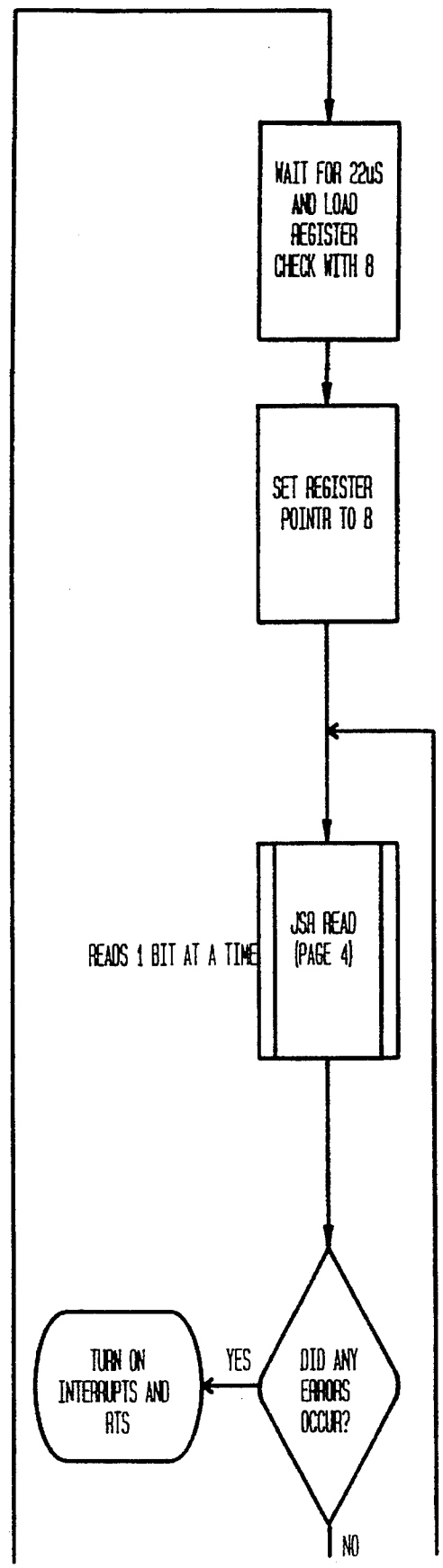
Figure 31:
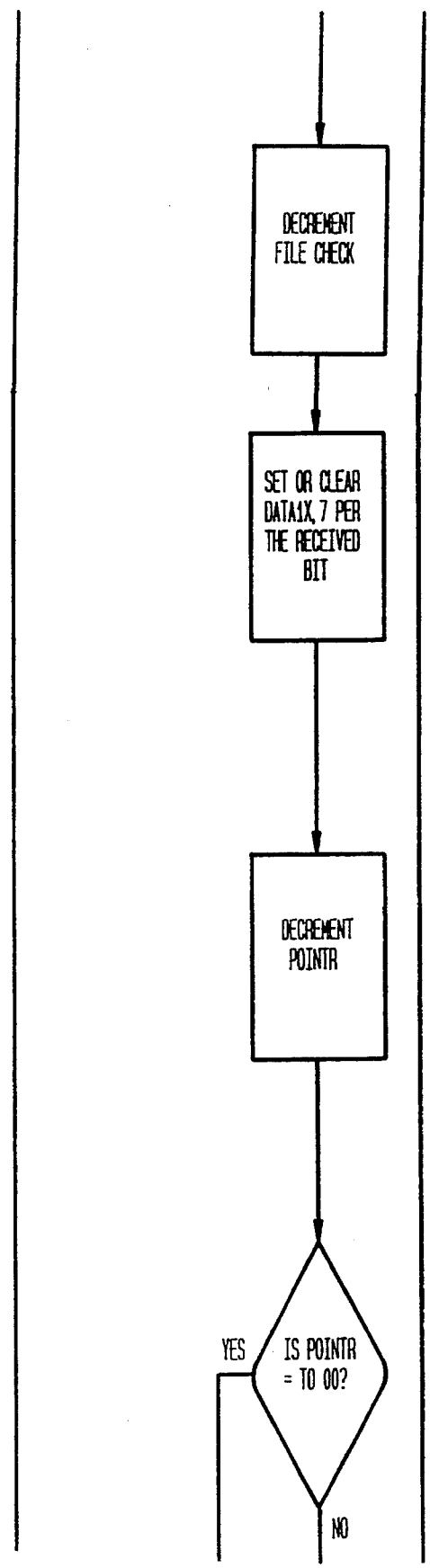
FIG. 31L is diagram showing how the drawings of FIGS. 31A–31K should be arranged.
Figure 31K:
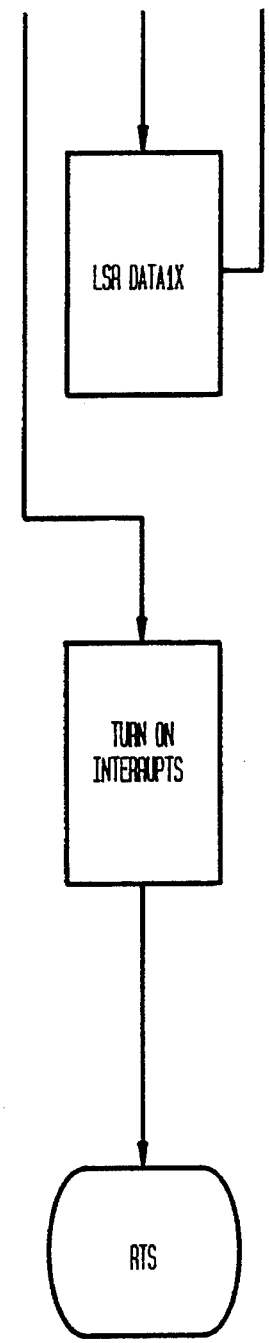

The BIDW routine shown in FIG. 31. This routine calls the subroutines that send a pulse out or read a pulse in (READ, DBIT). The four start bytes are sent to the BID module to let it know a communication is starting. The next two data bits sent are command bits which indicate which transaction will take place. The following six data bits indicate to the module which address in its memory it needs to access. Depending on the CMD code, the subroutine will now either send data or read data.

If the CMD code sent to the module was 00, the routine will wait for the module to read its EEPROM, then read each pulse of data sent back one at a time. If the CMD code sent to the module was hex 01, the routine sends sixteen bits of data to the module one at a time. The CMD's 02 and 03 hex work basically the same as CMD's 00 and 01 but only transfer eight bits of data to or from the module. Both of the read portions (CMD 00 and 01) of this routine have the ability to detect errors (flags produced by read subroutine) occurring while reading the incoming pulse. If any occur, the data is scrapped.

Figure 32A:
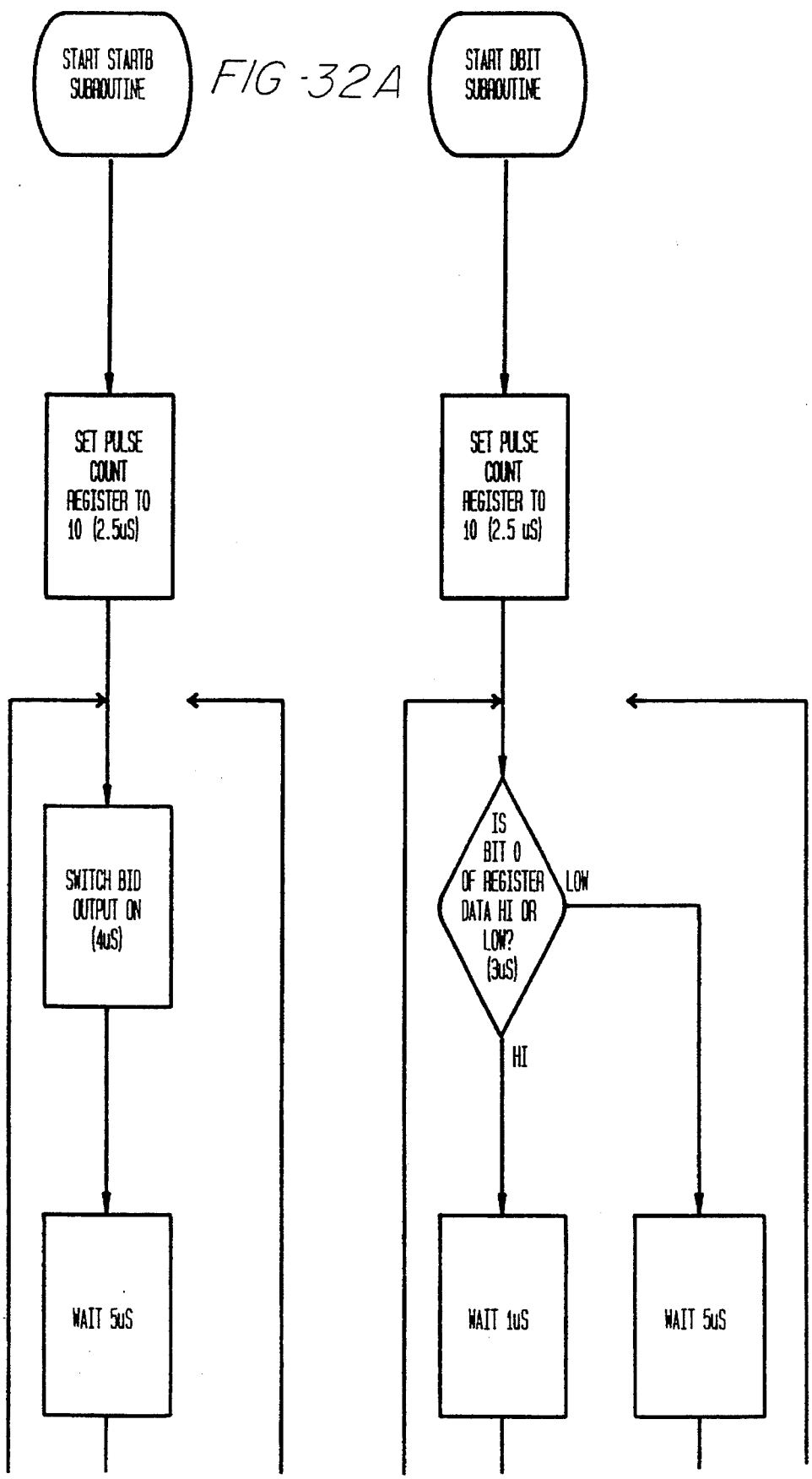
Figure 32B:
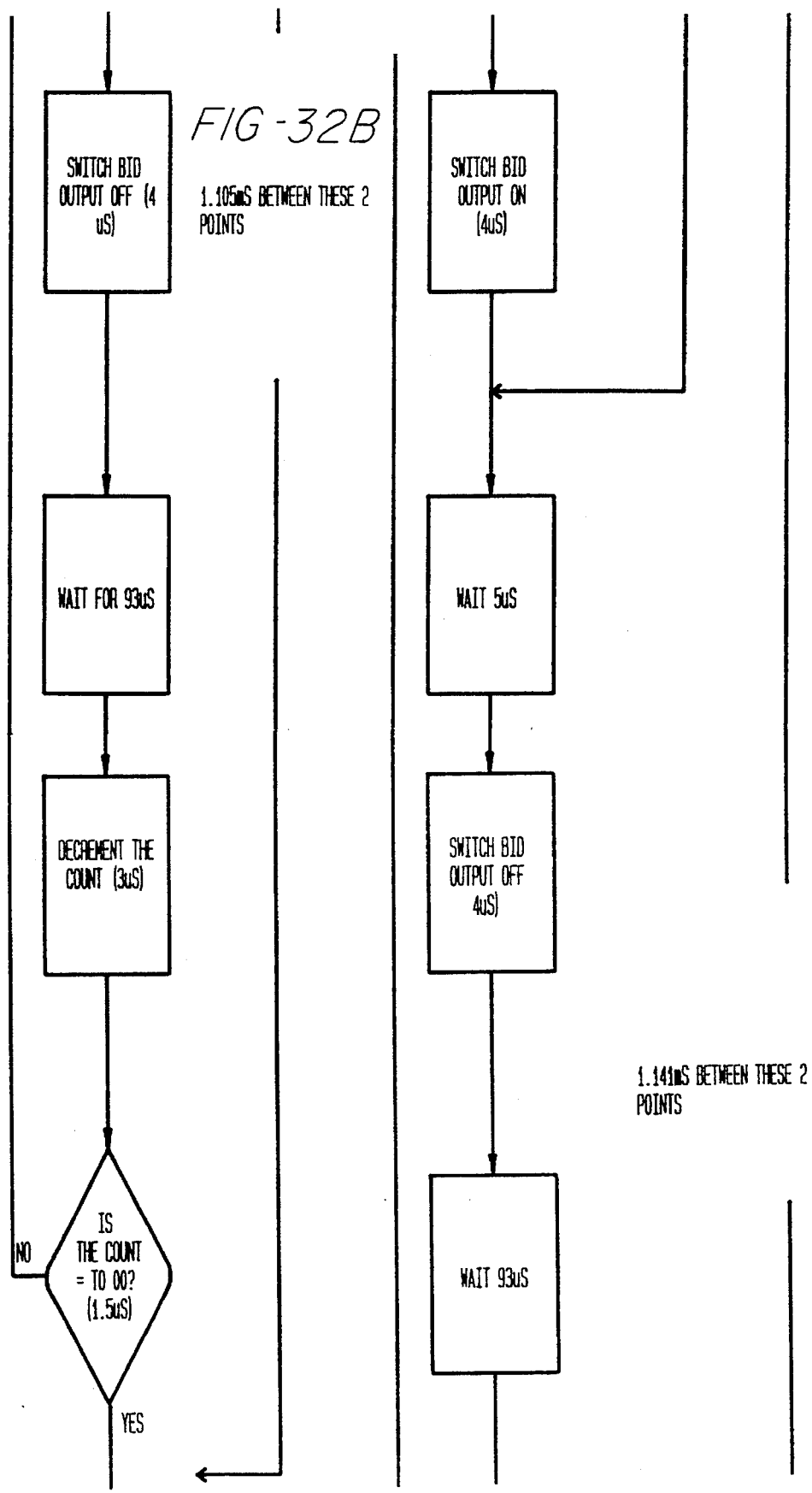
Figure 33A:
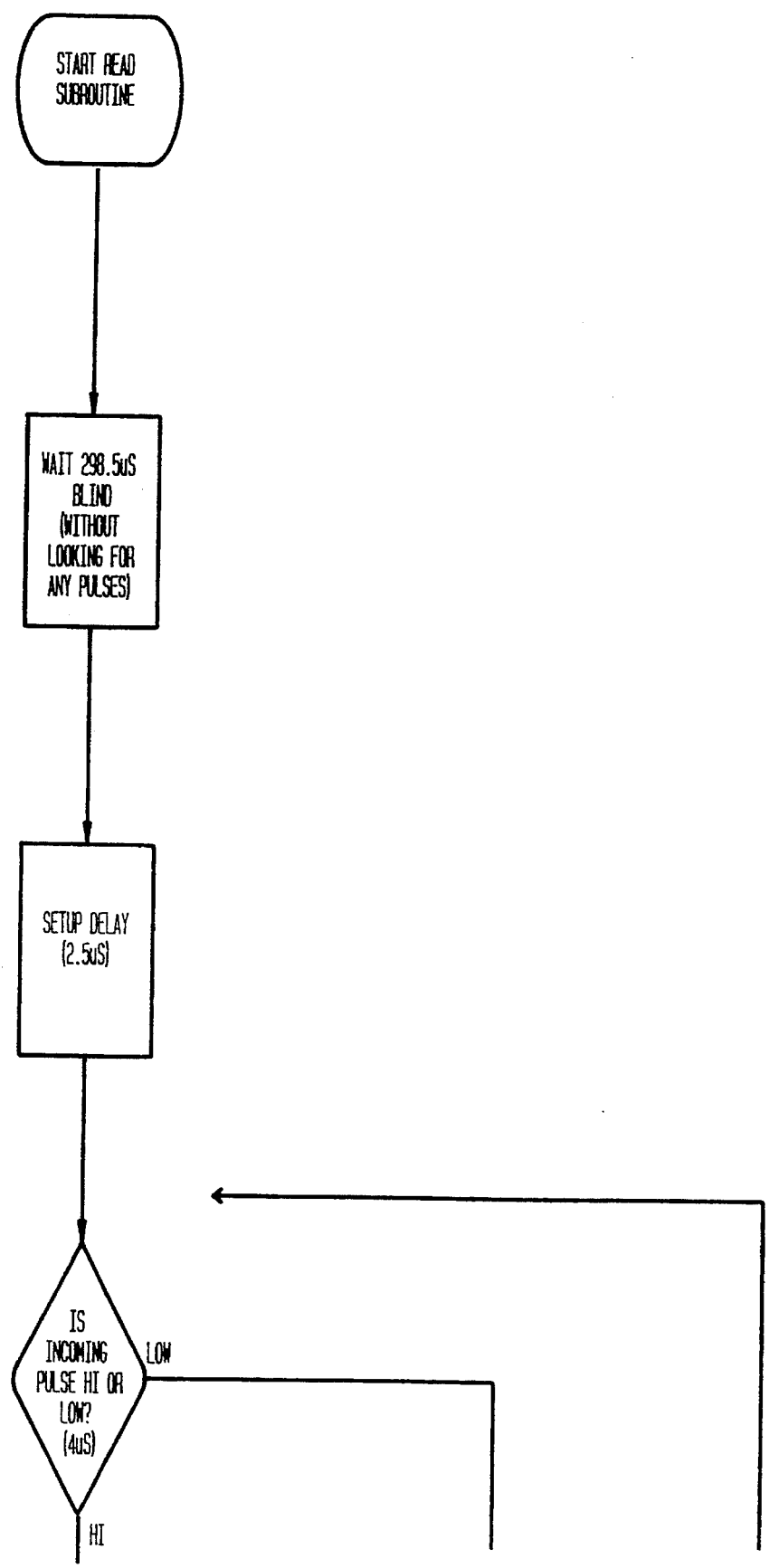
FIGS. 33A–33D together comprise a computer flow chart of a communications subroutine called READ.
Figure 33B:
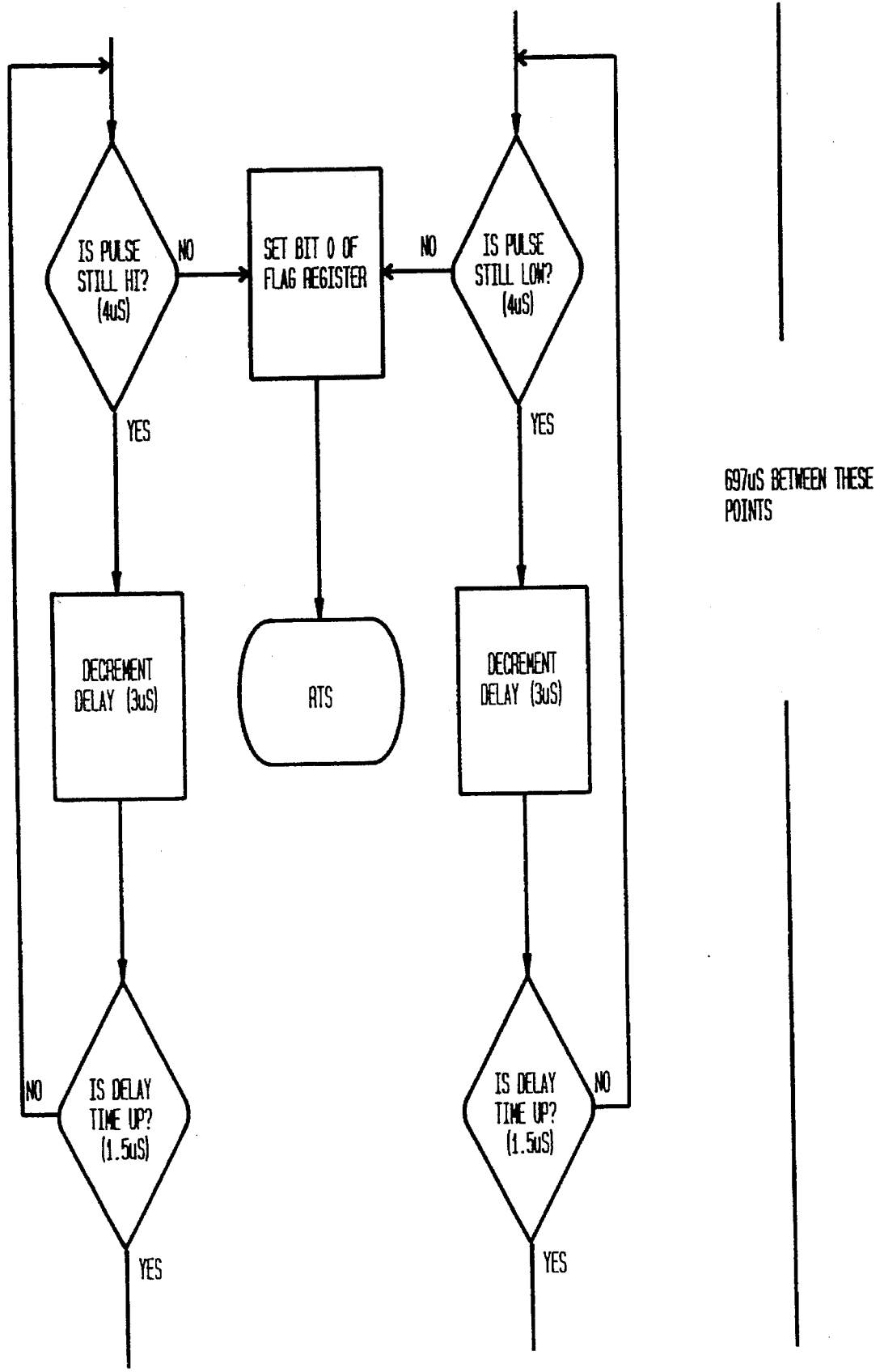
Figure 33C:
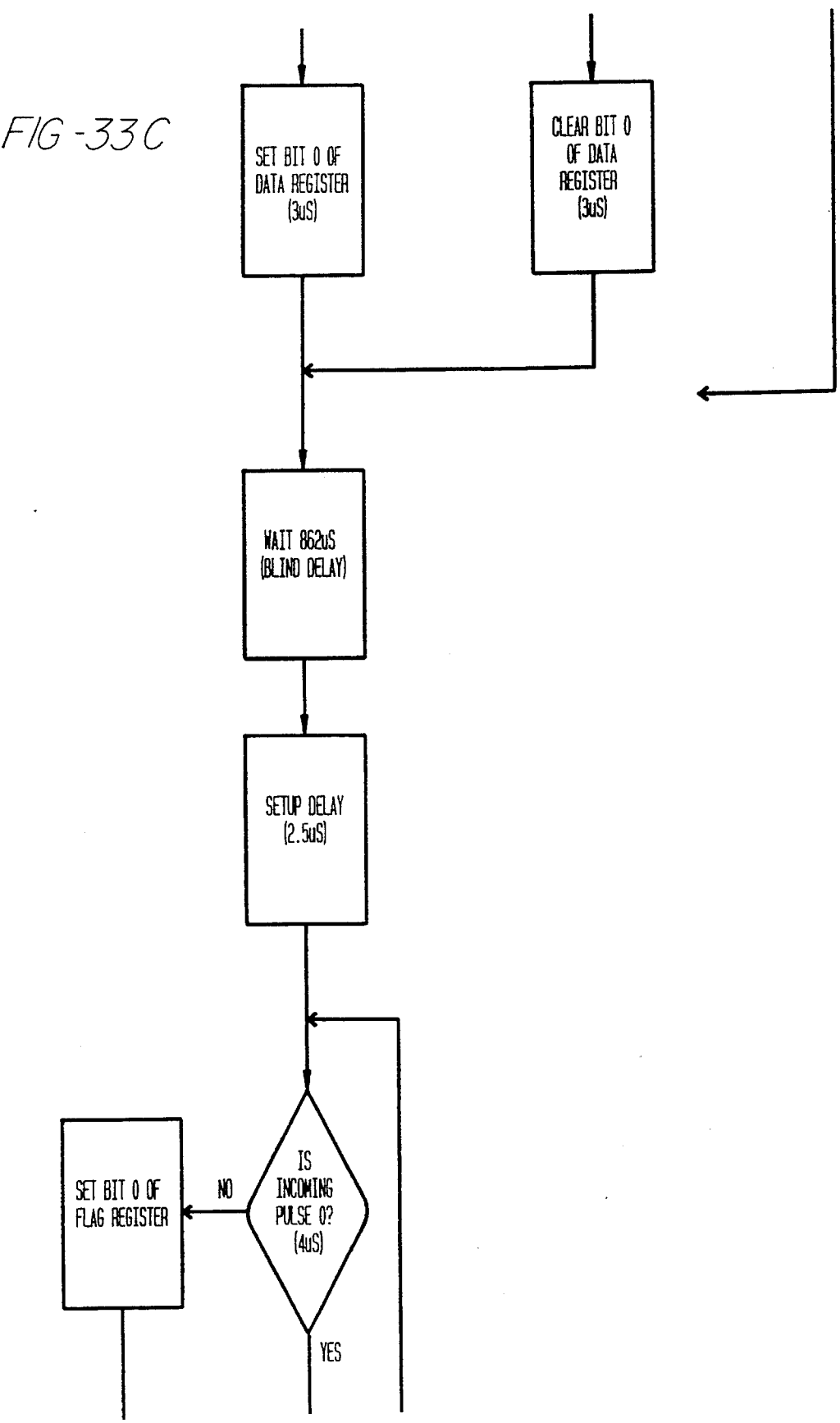
Figure 33D:
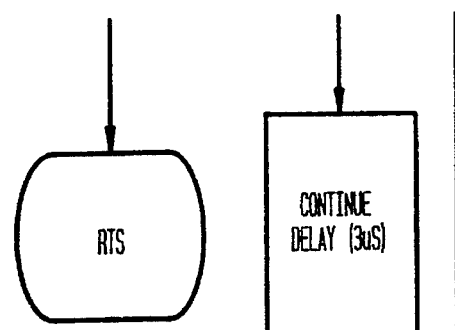
Figure 33E:
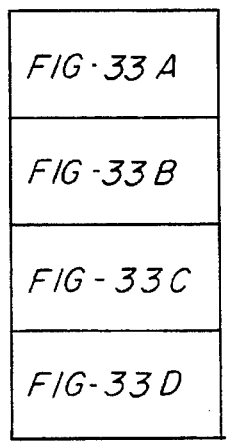
FIG. 33E is diagram showing how the drawings of FIGS. 33A–33D should be arranged.

FIG. 32 shows the VOLTAGE, ERRORCH, DBIT, STARTB subroutines, and FIG. 33 shows the READ subroutine.

The VOLTAGE subroutine simply checks for the presence of battery connected to the charger. It is used in the four write and read BID subroutines because it would be useless to try to communicate to a BID module if a battery were not connected.

The ERRORCH routine checks for a flag bit after returning from the READ subroutine. If this flag is set, the communication timing is resynchronized by staying in this loop until the bit counter register is equal to 00. The counter register is decremented in the timer interrupt every 8.19 mS. The bit counter is set for the number of bits expected from the module.

The DBIT subroutine interrogates the data bit that is about to be sent to the BID and produces a "1" (turn BID FET on) or "0" (FET stays off) accordingly. STARTB always produces a "1" output.

The READ routine looks at the incoming data bit, determines its value ("1" or "0") and stores the bit in the proper place. If unexpected data is read during the pulse, an error flag is set.

Figure 25D:
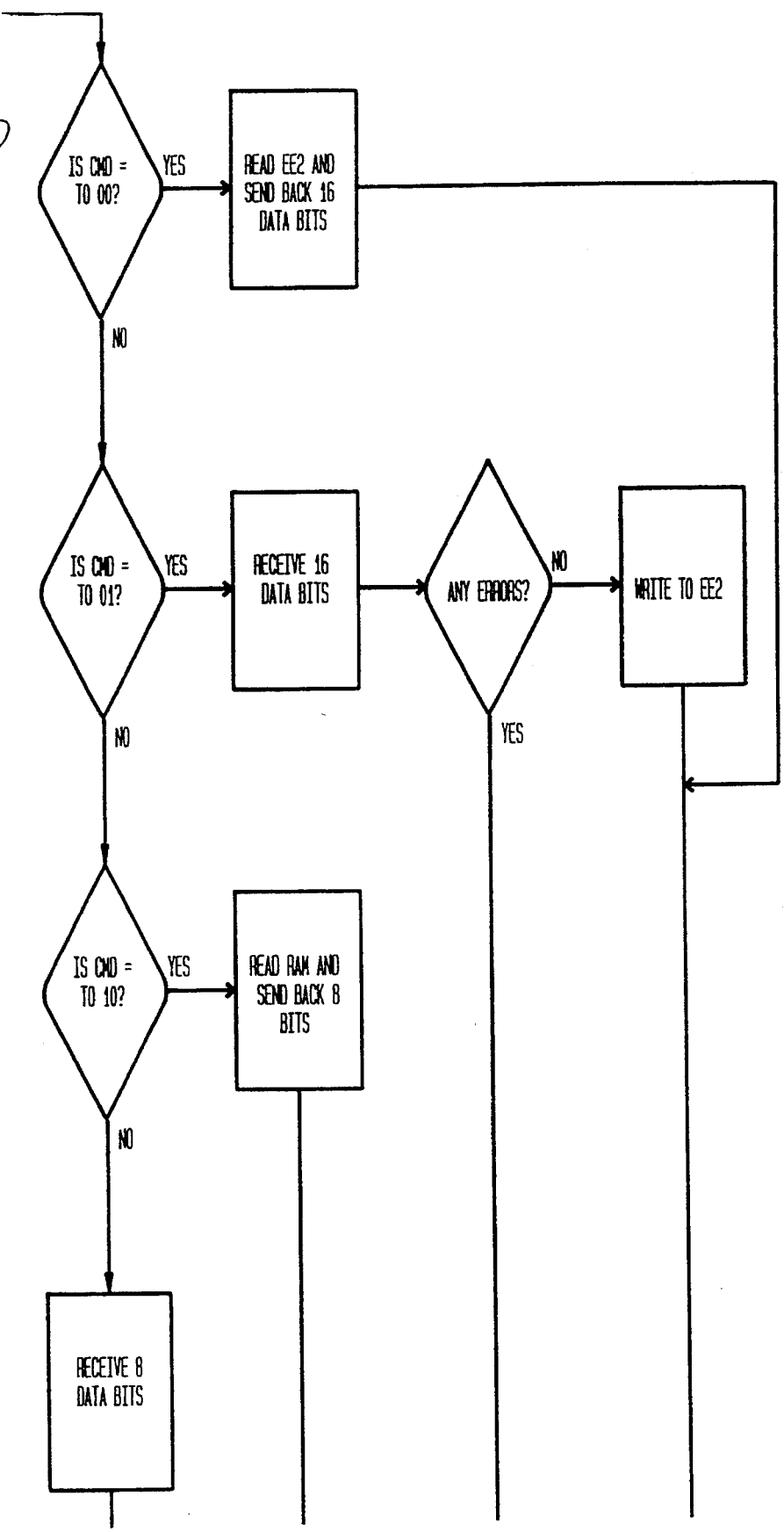

The battery identification (BID) module flowcharts will now be examined. The flow chart of FIG. 25 shows in general terms how the communications from the EXP board is received and processed. The BID module's communications network input port is constantly being polled by the program. When the input reads a "1", the polling stops and the receive section of code starts. The four start bits are received followed by the two CMD bits. Next, 6 address bits are read to specify where data is to be written or read. This routine interprets the CMD register and decides what to do next.

If the CMD is 00, it reads the EEPROM and sends back sixteen bits of data to the EXP board, from the address specified. If the CMD was 01, the routine expects to receive sixteen bits of data from the EXP to be stored in EEPROM. A 02 and 03 hex in the CMD work very similar to CMD's 00 and 01 hex except they only deal with eight data bits because they are writing or reading RAM. If at any point an error is detected reading data from the EXP, the process is aborted.

Flowcharts BIDCOMM (FIG. 15), BIDCOMM1 (FIGS. 16– 19), and BIDCOMM2 (FIGS. 20–24) will give more details on the communications loop and subroutines.

When a communication is started, SPULSE is called four times in a row. Four start bits are sent from the EXP, SPULSE checks each one to see if bit was received properly (each start bit="1"). Each time a bit is received properly a register called check is decremented, this is how the number of bits read correctly is counted. If there were an error at some point, this register (with its remaining counts) is used for resynchronization (each count in check× 1 bits time).

The next eight bits are read by subroutine DPULSE. DPULSE reads and records each bit. The first two bits are the CMD and the next 6 are the address (address is where data from EXP is written to or read from). Each time the code returns from DPULSE the bit read is stored in its proper register CMD or ADDR (if no errors occurred). Now the CMD code is decoded to see what function the module is to do (write or read).

Figure 16A:
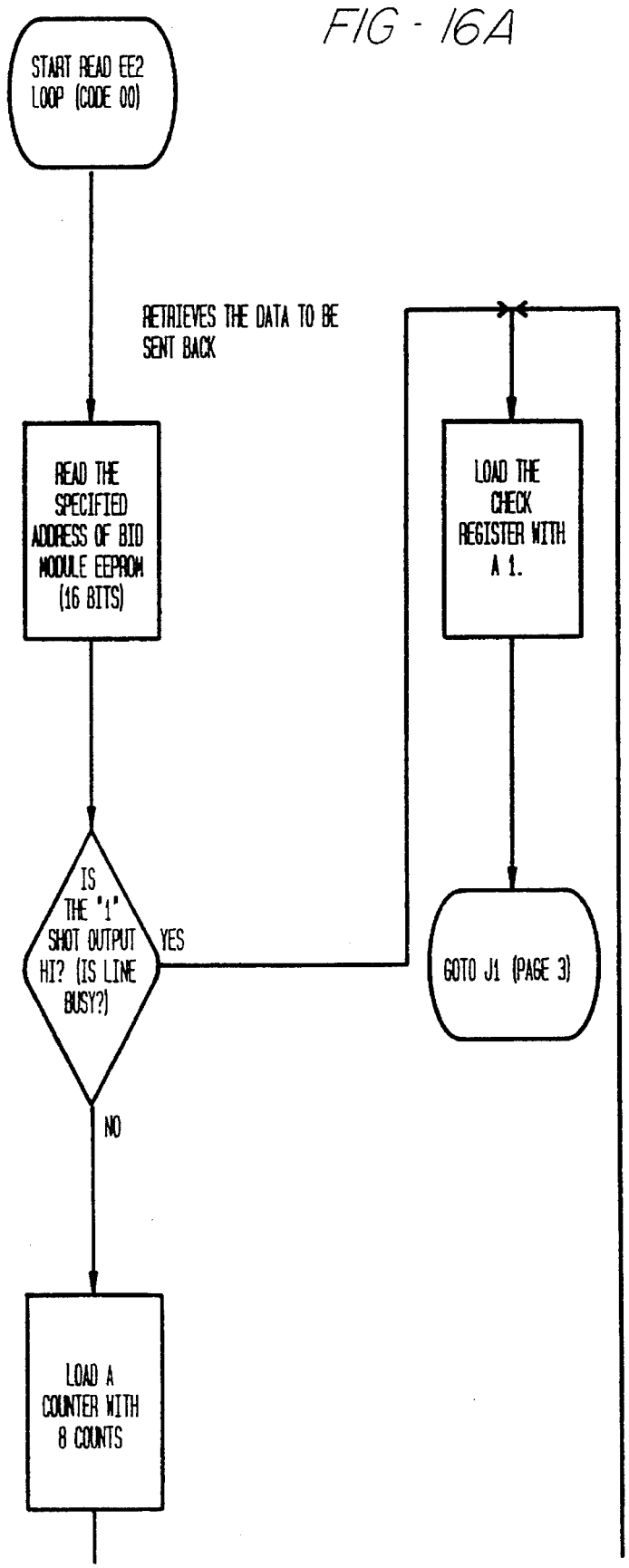
Figure 16B:
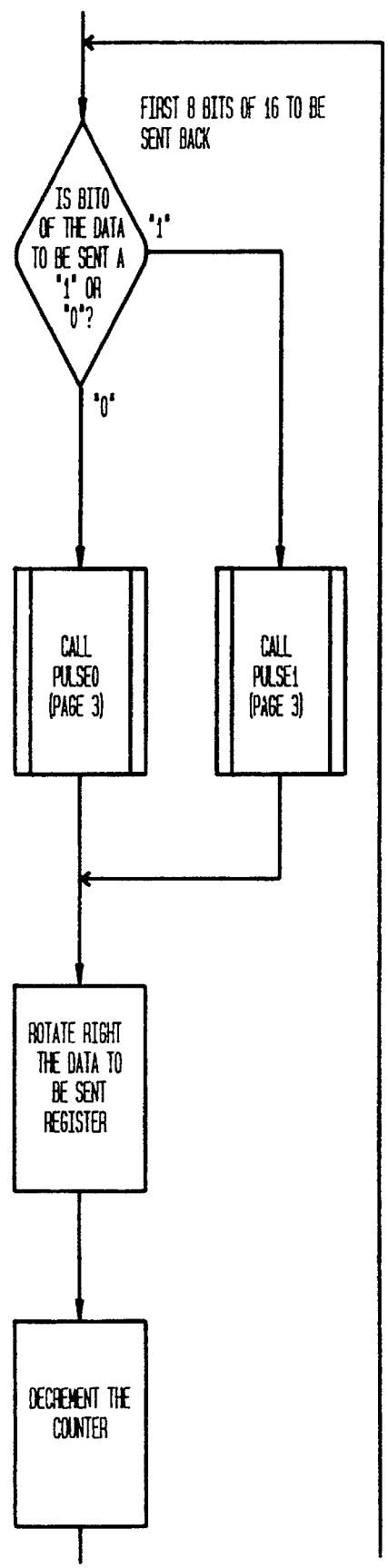
Figure 16C:
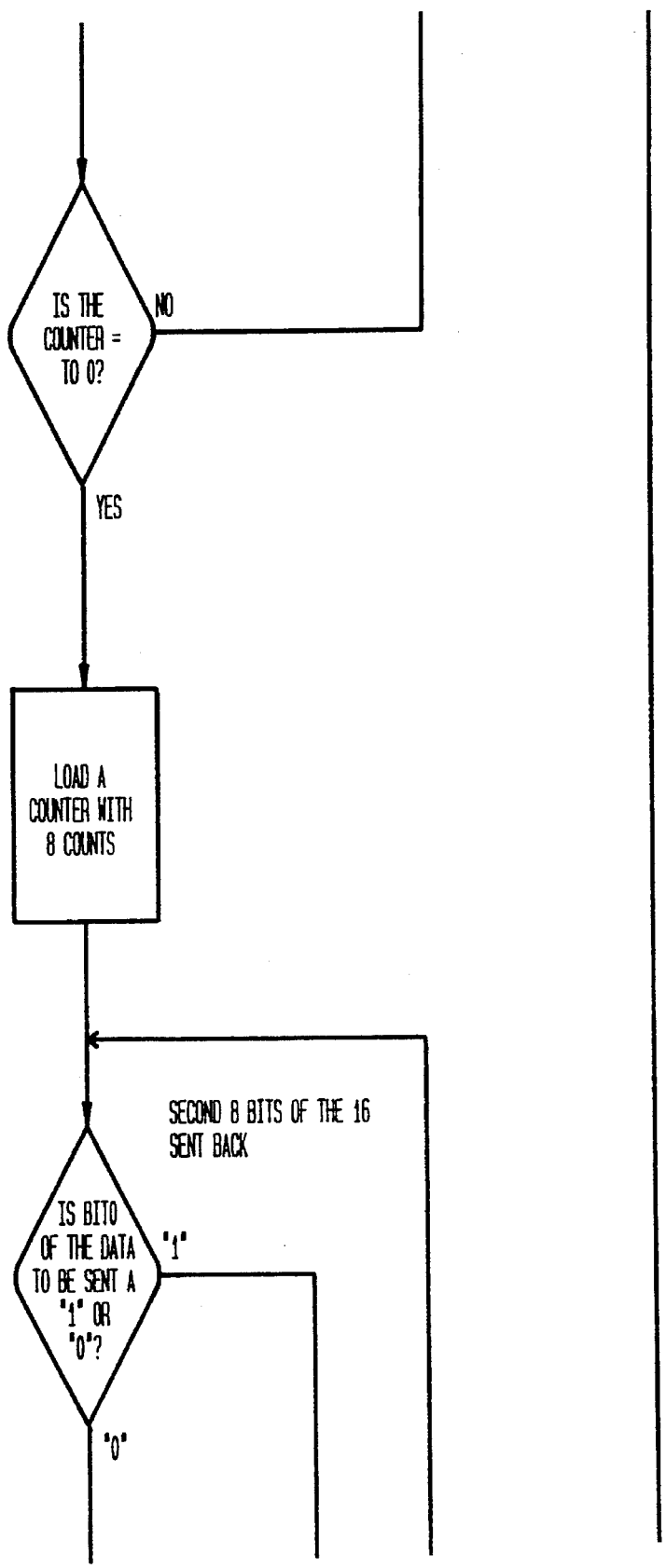

The BIDCOMM1 flowcharts (FIGS. 16–19) describes the action taken on each one of the four possible commands sent. Referring to FIG. 16, if the CMD is 00, then the EEPROM is first read. Then each of the sixteen bits (one EEPROM location is sixteen bits wide) is sent back to the EXP board, one at a time. If the bit to be sent is "0" then subroutine PULSE0 is used, PULSE1 if the bit is a "1".

Figure 17A:
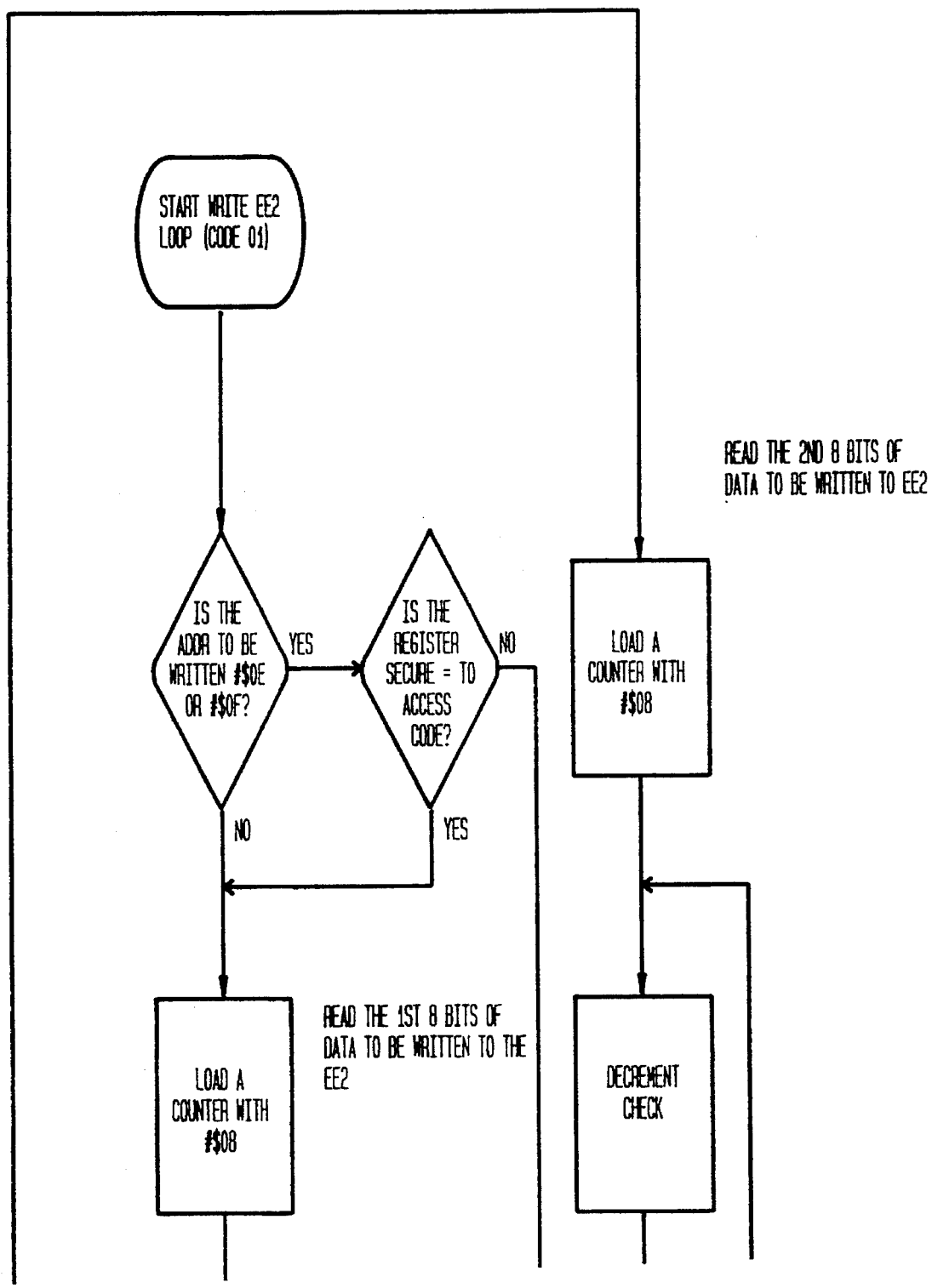
Figure 17B:
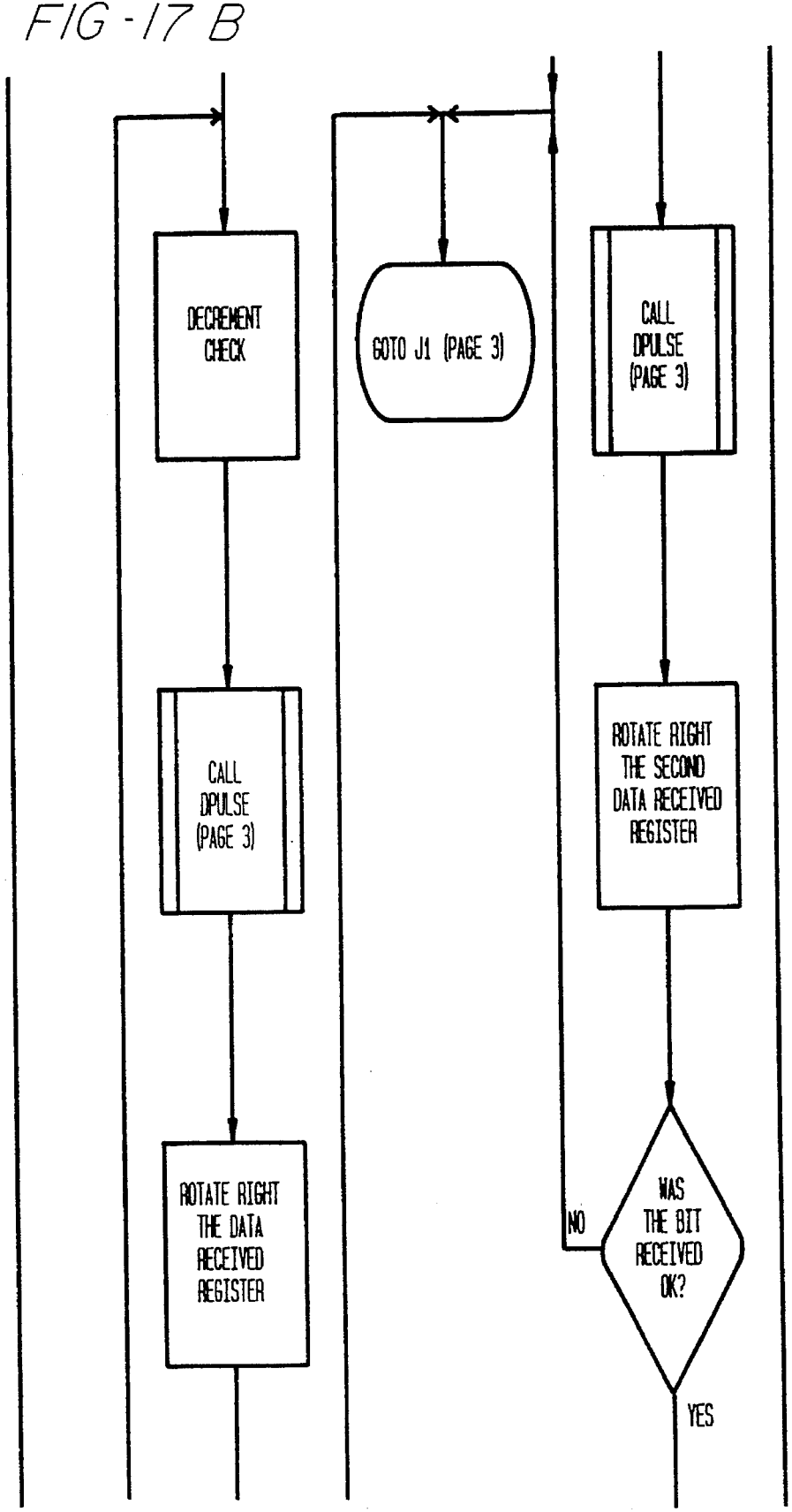
Figure 17C:
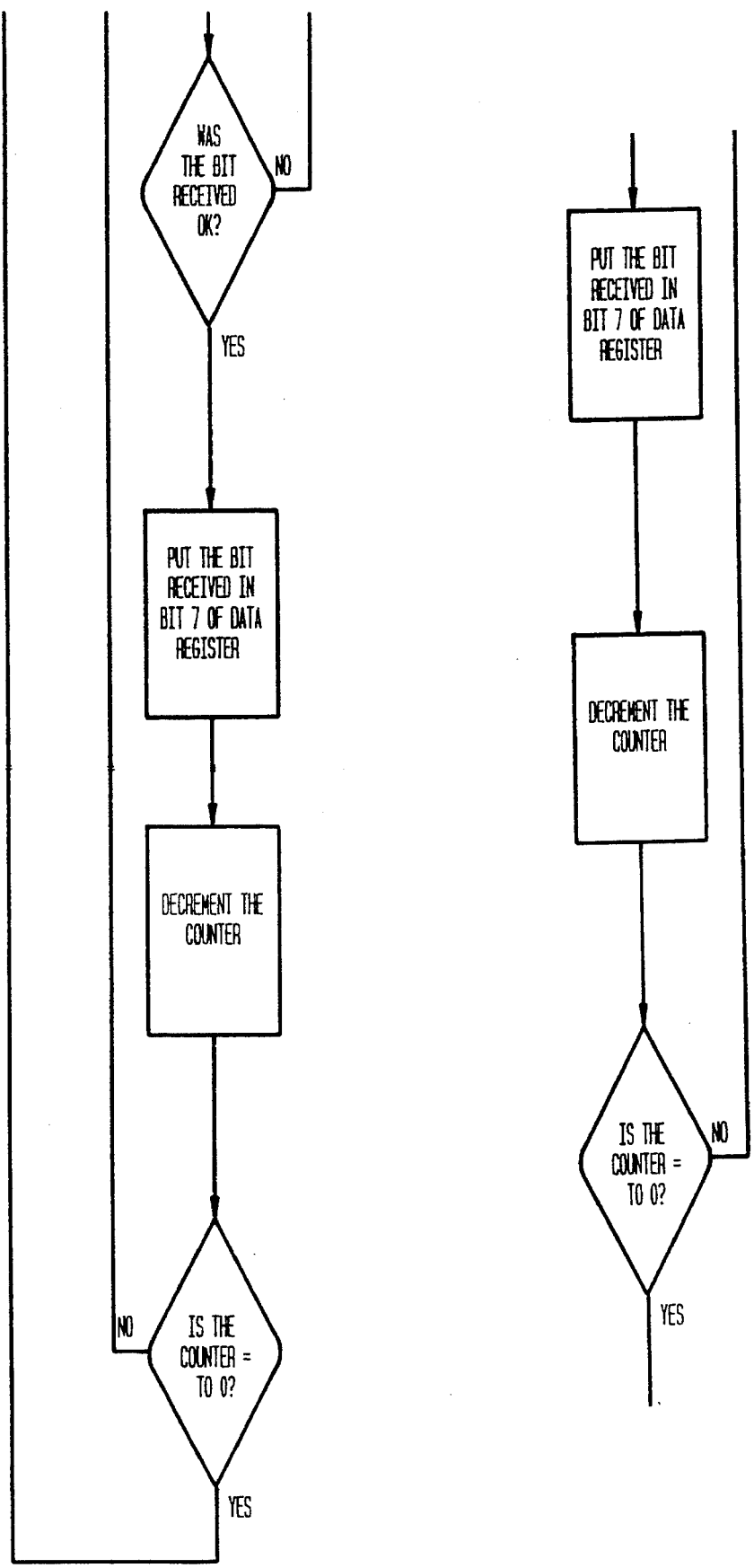
Figure 18A:
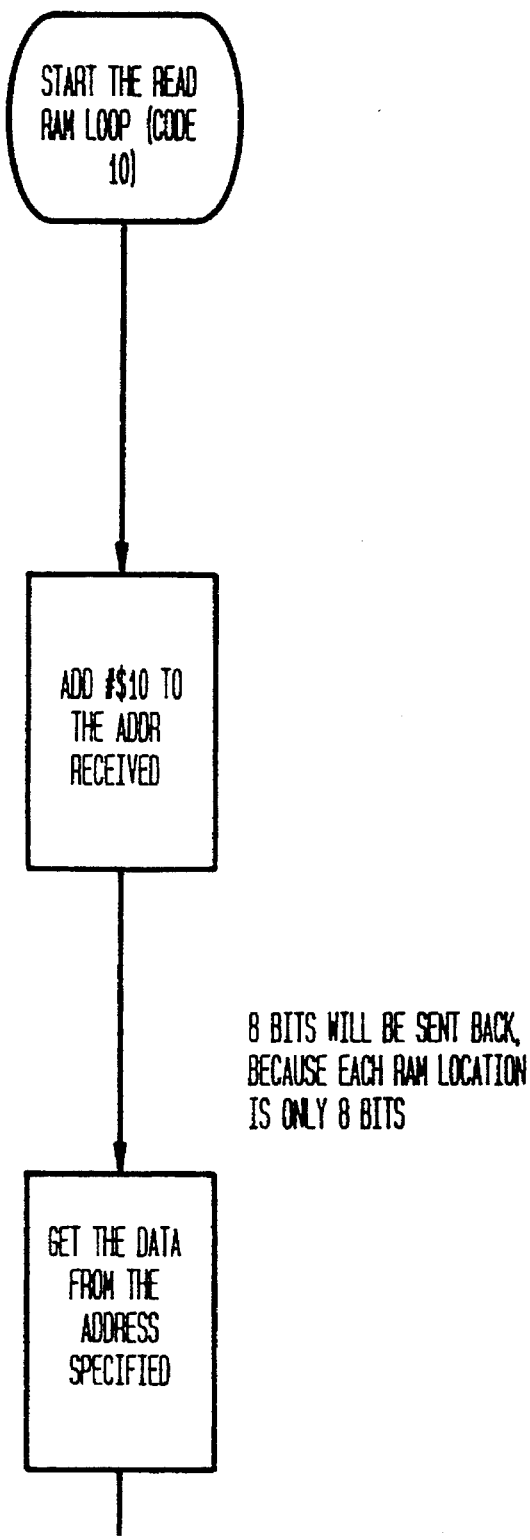
Figure 18B:
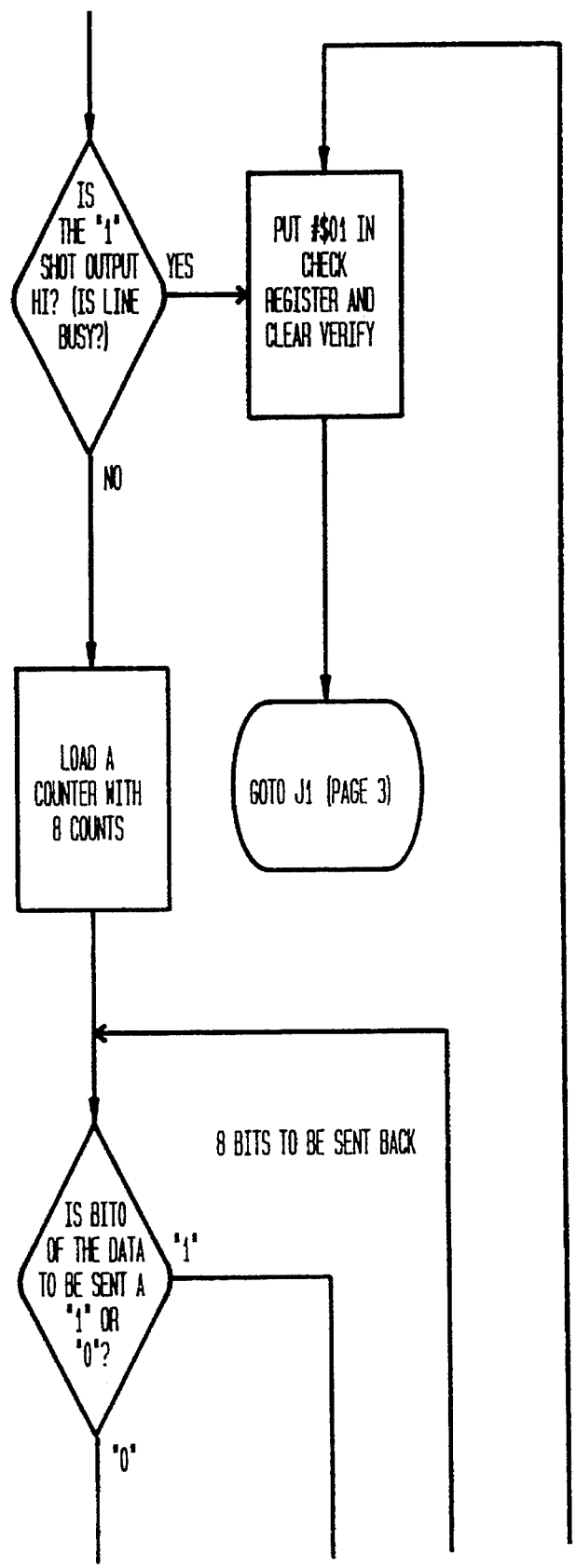
Figure 19A:
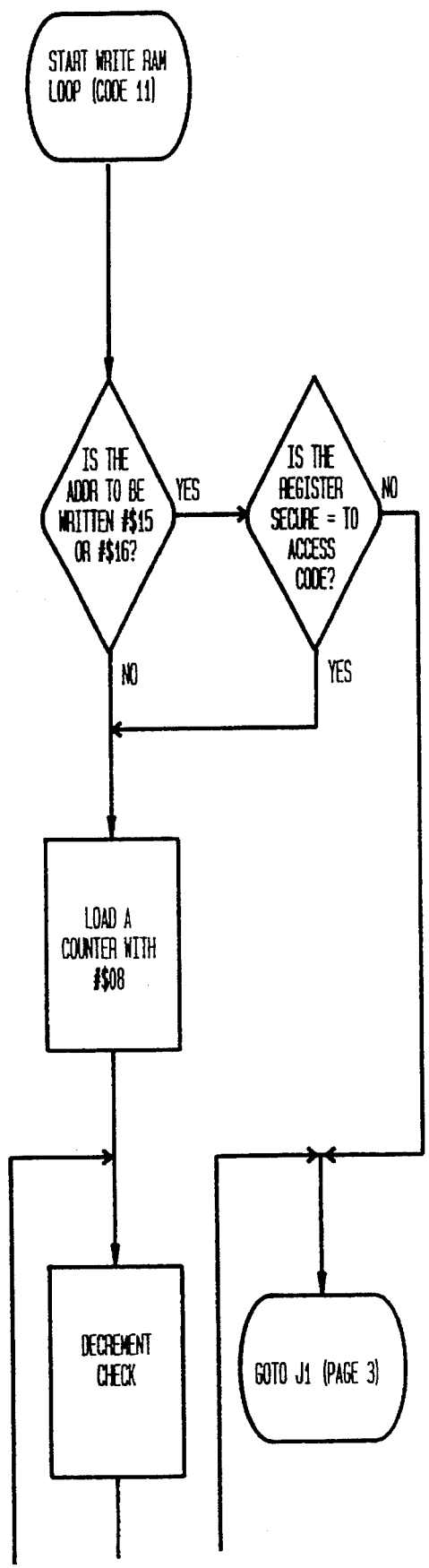
Figure 19B:
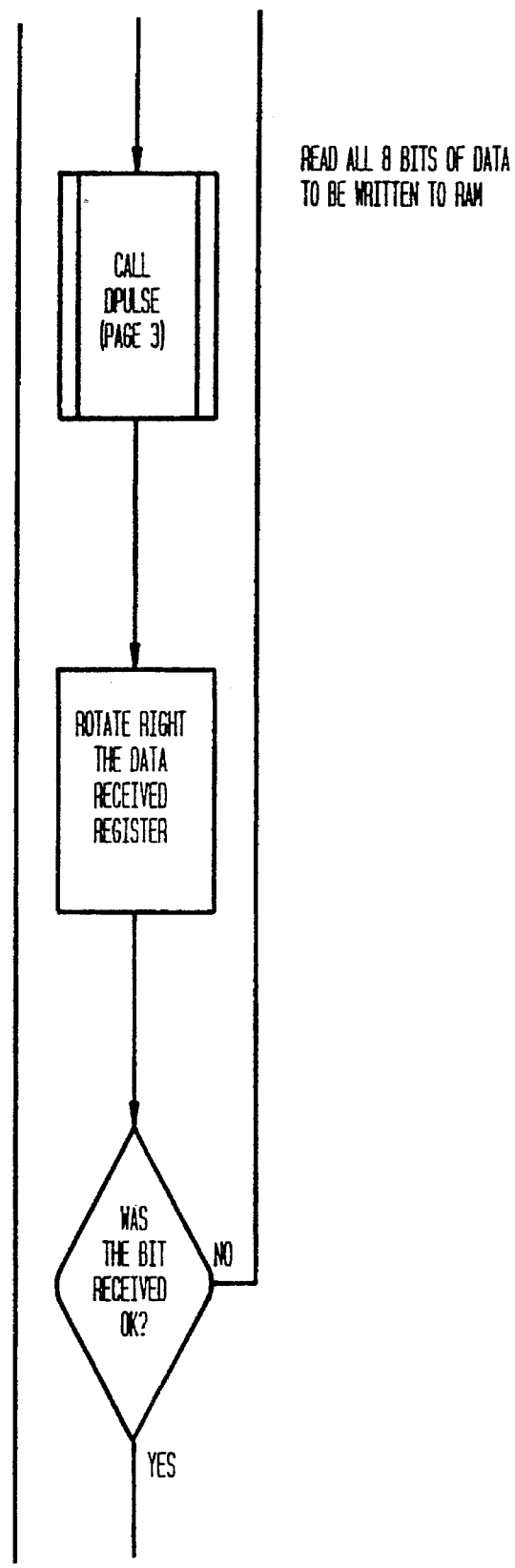
Figure 19C:
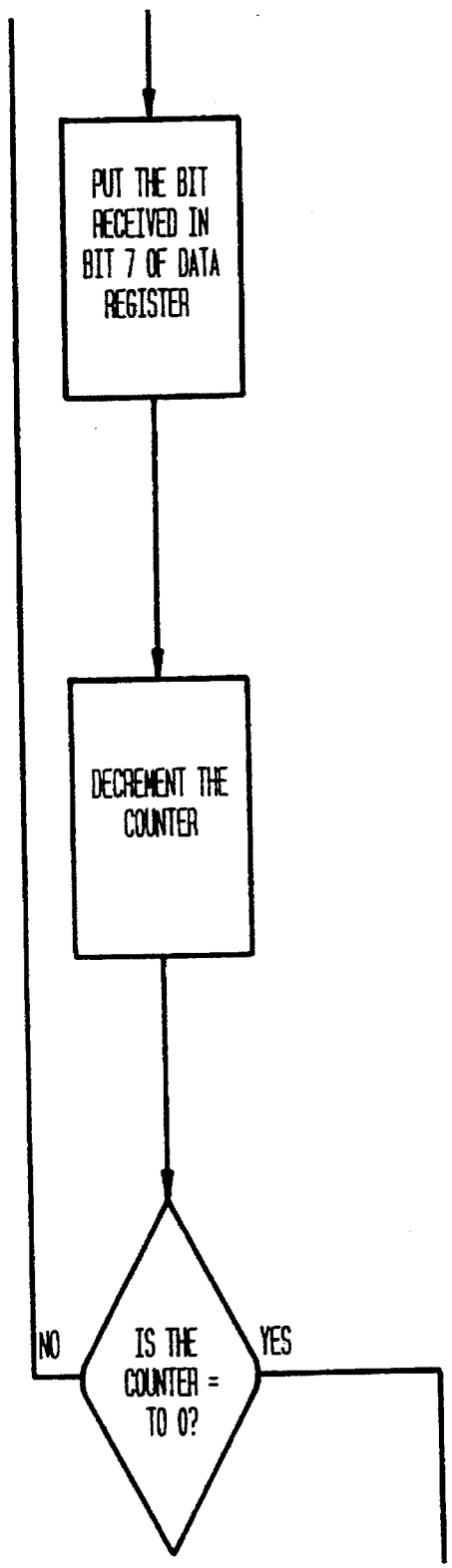
Figure 20A:
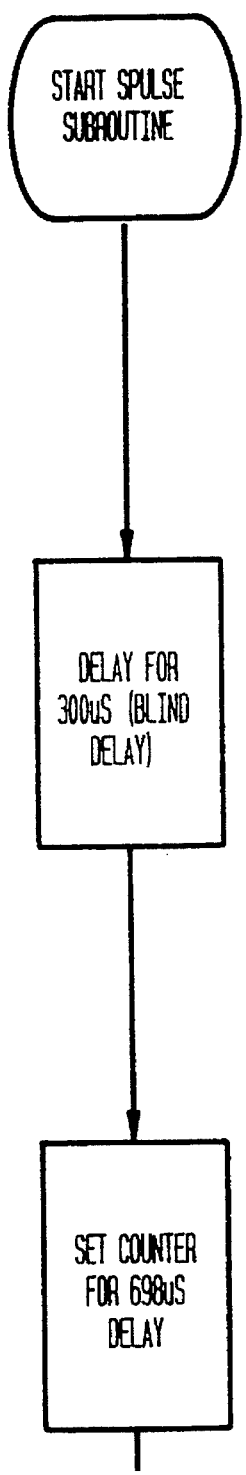
Figure 20B:
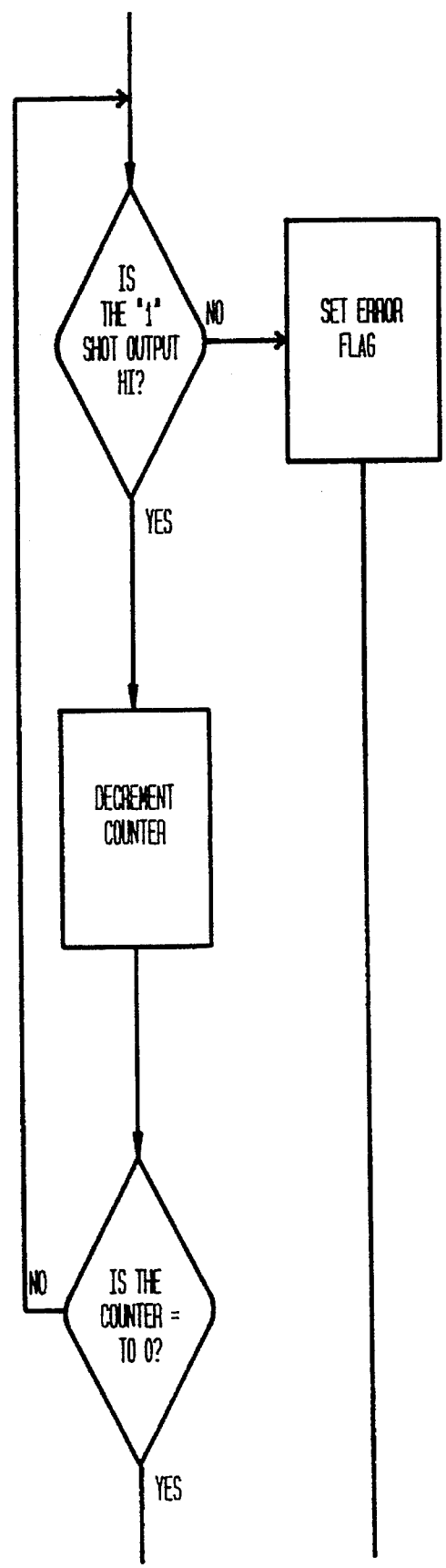
Figure 20C:
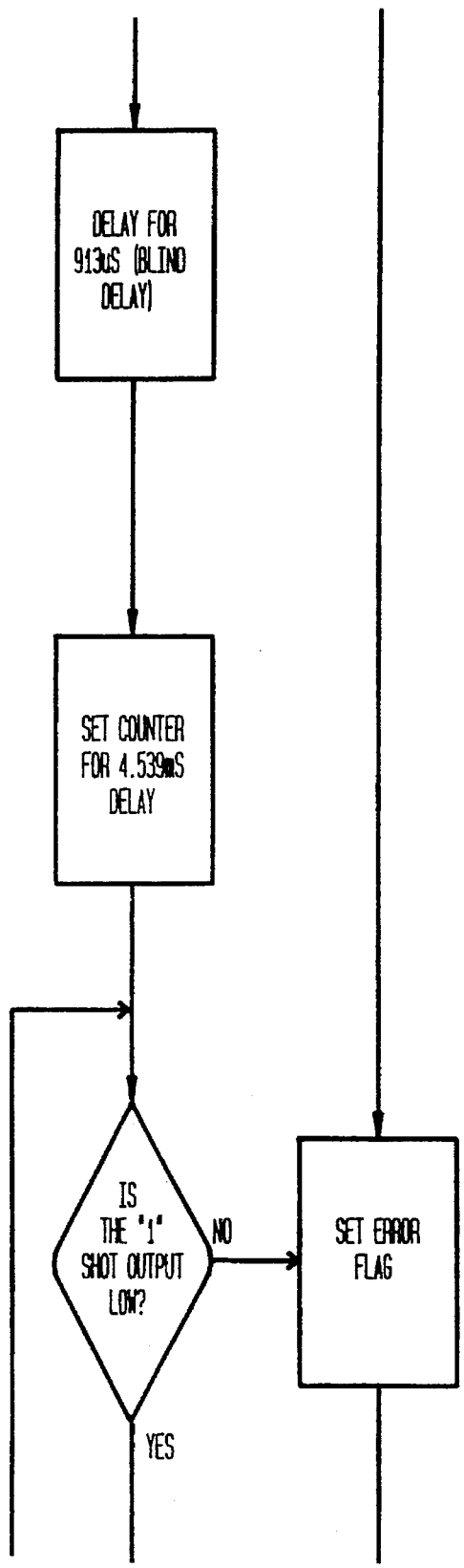
Figure 21A:
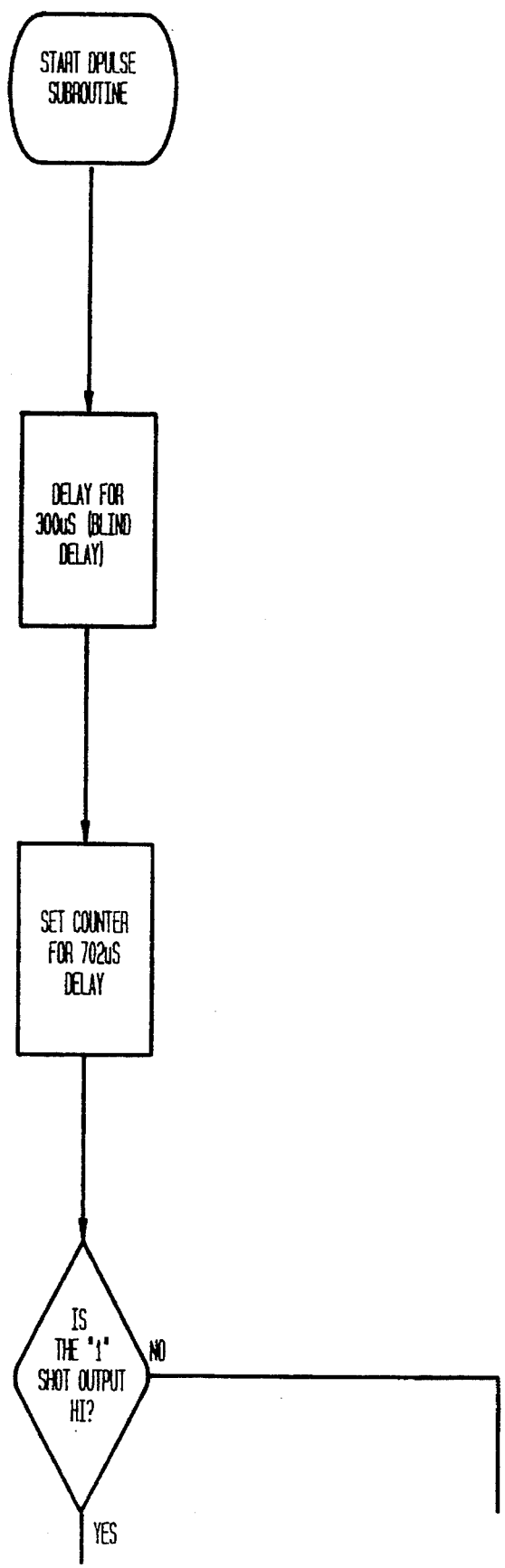
FIGS. 21A–21D together comprise a computer flow chart of a communications routine called DPULSE.
Figure 21B:
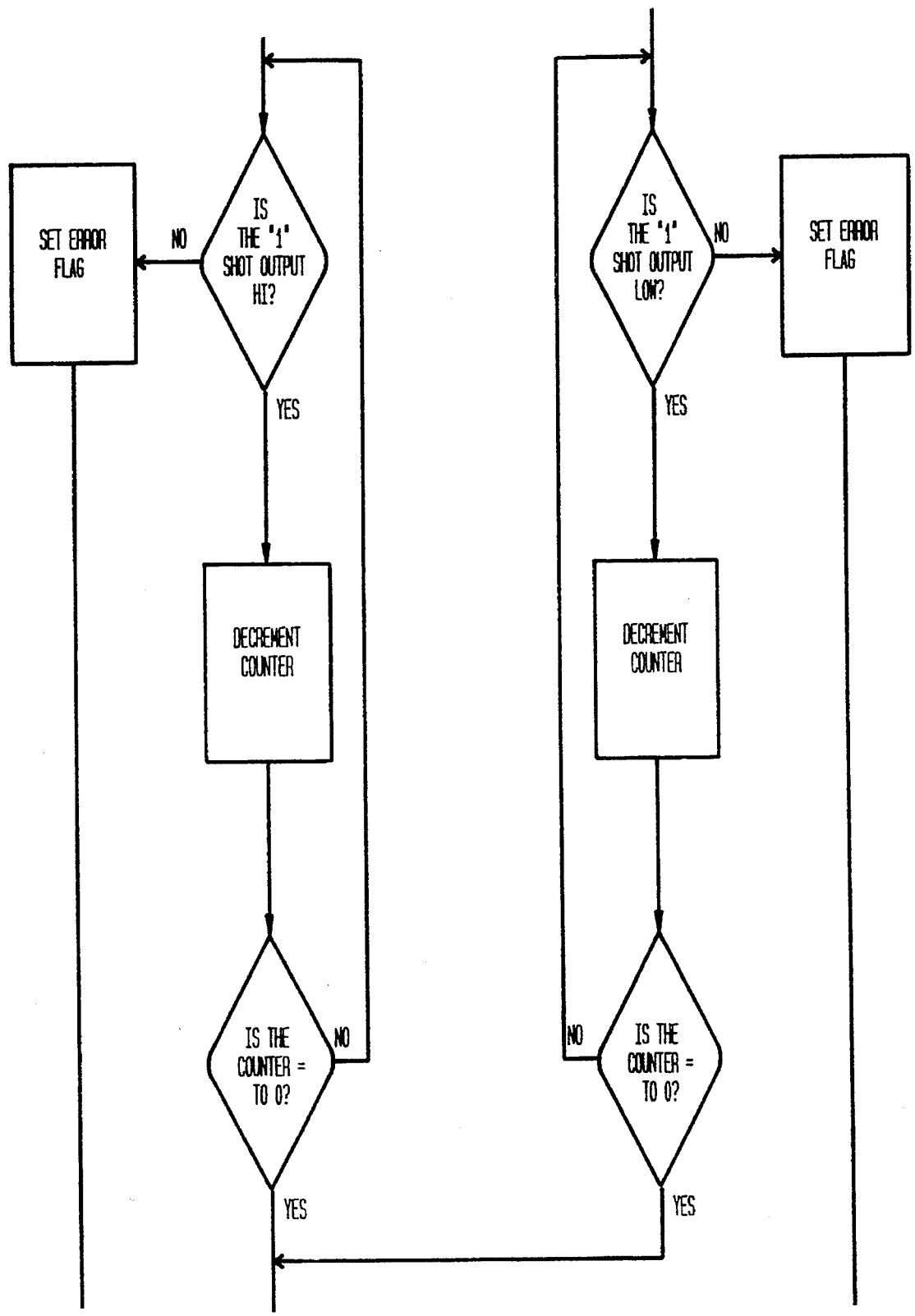
Figure 21C:
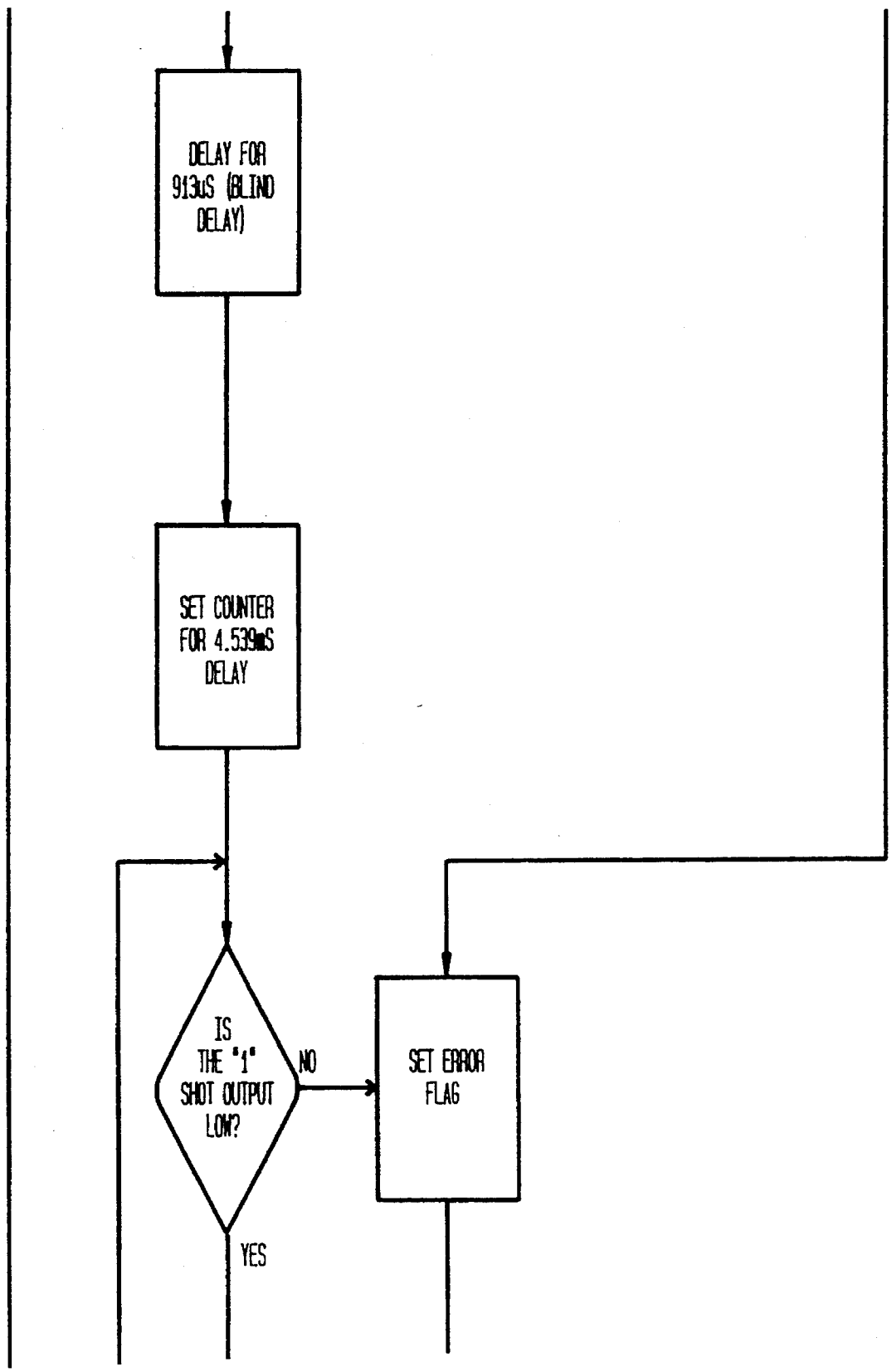
Figure 21D:
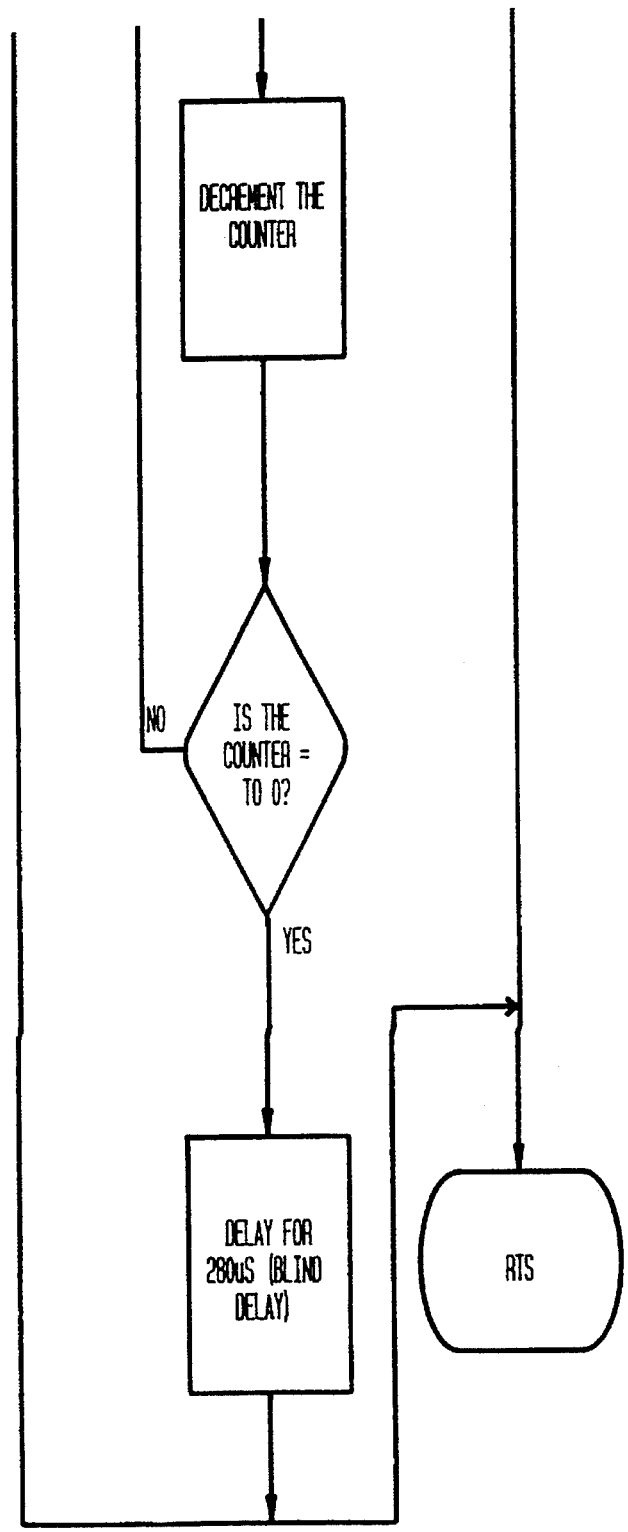
Figure 21E:
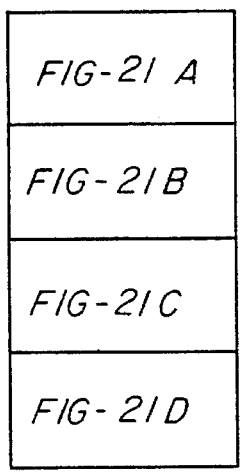
FIG. 21E is diagram showing how the drawings of FIGS. 21A–21D should be arranged.
Figure 22:
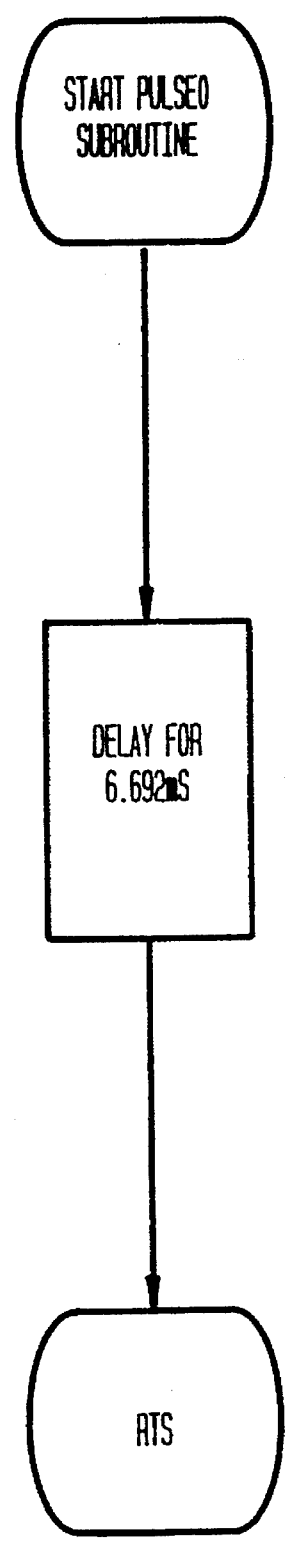
FIG. 22 is computer flow chart of a communications routine called PULSE0.
Figure 23A:
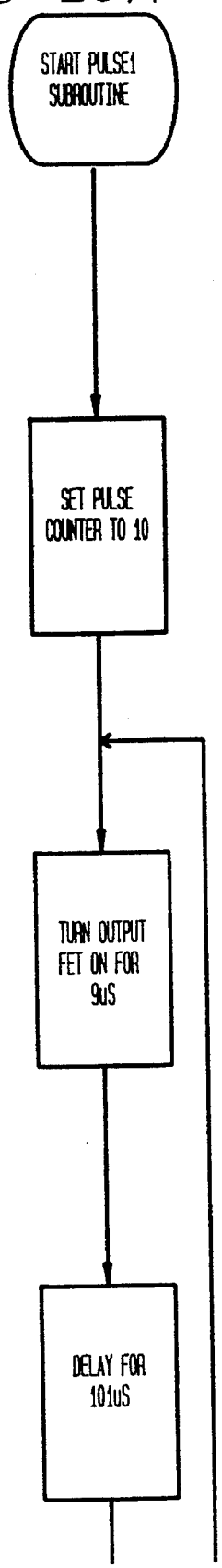
FIGS. 23A and 23B together comprise a computer flow chart of a communications routine called PULSE1.
Figure 23B:
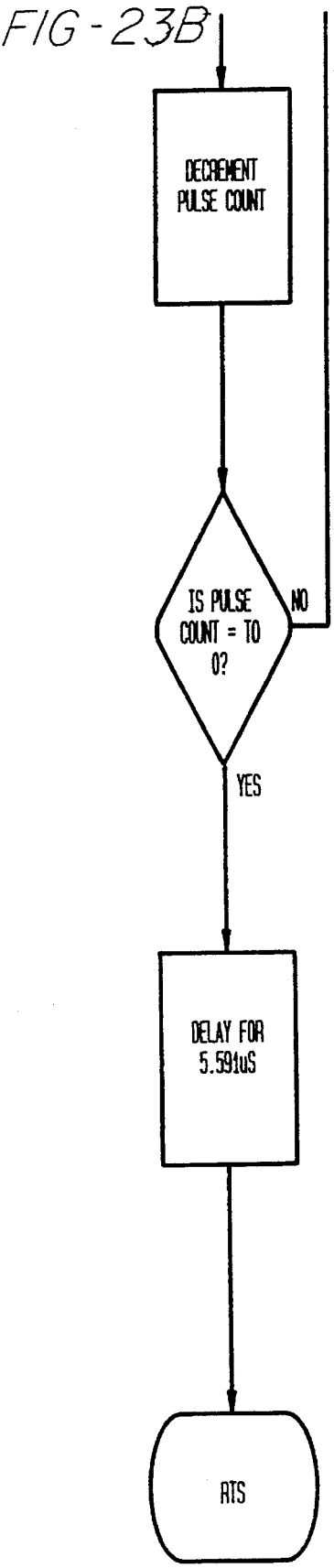

Referring to FIG. 17, if the CMD is 01, then sixteen bits of data are expected from the EXP board. The writing process starts by examining the address specified. If it is 0E or 0F (hex) the RAM register SECURE must contain the proper value; if it does not, the process is aborted. Now all sixteen bits are received from the EXP at one time. The program now beings polling again.

For purposes of verification the very same CMD, address and sixteen bits of data are resent (within 1 second) from the EXP (sent as soon as resynchronizing delays take place). The BID module must read the data exactly the same. If the data is not sent twice or does not agree (1st and 2nd try) the EEPROM will not be written to. The other CMD's (02 hex, FIG. 18, and 03 hex, FIG. 19) work basically the same, only eight bits are read or written from BID RAM.

BIDCOMM2 flowchart describes the SPULSE (FIG. 20), DPULSE (FIG. 21), PULSE0 (FIG. 22), PULSE1 (FIG. 23) and J1 (FIG. 24) loop routines.

SPULSE (FIG. 20) is the routine that is used to receive start pulses from the EXP board. It makes sure that "1" is received and rejects the communication if it sees a "0" for data. DPULSE works the same as SPULSE except that either a "1" or "0" can be read.

The DPULSE routine of FIG. 21 is used when data other than START BYTE data is expected from the EXP. The PULSE0 and PULSE1 routines of FIGS. 22 and 23, respectively are called when data is to be sent back to the EXP. PULSE0 is actually a delay representing A "0" (the EXP input will read a "0"). PULSE1 actually turns on the BID transmit circuit, creating a "1" for data at the EXP input.

Figure 24A:
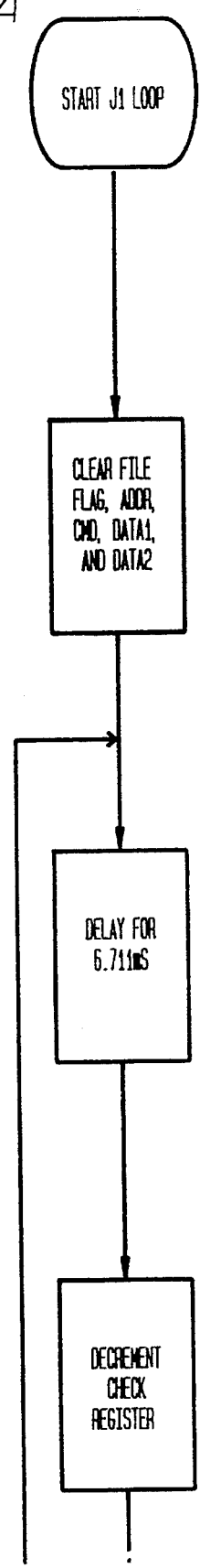
FIGS. 24A and 24B together comprise a computer flow chart of a communications routine called J1.
Figure 24B:
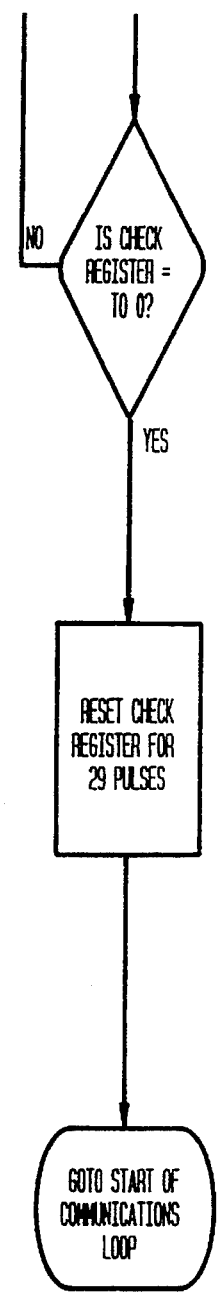

In FIG. 24, the J1 loop's purpose is to reset the code to be ready for another communication. This loop does a delay equal to 1 data pulse for every count left in register check. This causes the two sets of software (EXP and BID module) to be resynchronized. If this were not done, the EXP could try to write to the BID when it was not ready. This is useful when an error occurred in a transmission, the BID code would just ignore the rest of the data bits, while staying in synchronism with the EXP.

Thus, using by using the existing cables between the battery and the charger, information from a module on the battery itself can be transferred to an expansion board in the charger. No additional wires or radio communications equipment are required. The specific information transferred can be related to the battery itself, or to the vehicle on which the battery has been used. That information can then be processed by the computer 50 for management purposes.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A method of transmitting a data pulse representing the logic level "one" over a pair of cables wherein one end of said cables is connected to the terminals of a low impedance battery and the other end thereof is connected to a remote device, said cables otherwise being used either to charge the battery or to supply power to a load, the method including the steps of transmitting a plurality of spaced apart short duration pulses wherein each short duration pulse is created by momentarily imposing a high power, low energy pulse at one end of the cables, sensing a change in voltage at the other end of the cables to detect the occurrence of each short duration pulse, applying each detected short duration pulse to retrigger a resettable multivibrator having an output pulse width slightly greater than the time interval between said short duration pulses, and determining whether the output of the multivibrator is continuous during a predetermined period to indicate the reception of a valid data pulse representing the logic level "one".

2. A method of transmitting a data pulse representing the logic level "one" over a pair of cables connected to a low impedance battery load, the method including the steps of transmitting a plurality of spaced apart short duration pulses wherein each short duration pulse is created by momentarily imposing a high power, low energy pulse at one end of the cables, wherein said high power, low energy pulse is generated by momentarily short-circuiting the cables at one end thereof, sensing a change in voltage at the other end of the cables to detect the occurrence of each short duration pulse, applying each detected short duration pulse to retrigger a resettable multivibrator having an output pulse width slightly greater than the time interval between said short duration pulses, and determining whether the output of the multivibrator is continuous during a predetermined period to indicate the reception of a valid data pulse representing the logic level "one".

3. A method of sending a data pulse over low impedance cables between the terminals of a battery and a remote device, said cables otherwise being used either to charge the battery or to supply power to a load, the method comprising the steps of for each data pulse representing a digital "one", generating a predetermined number of spaced apart short duration pulses, transmitting said short duration pulses at one end of the cables, receiving said short duration pulses at the other end of said cables and applying them to a resettable one-shot multivibrator whose output pulse is slightly greater than the interval between the short duration pulses, analyzing each output pulse from the multivibrator to determine whether it is continuous throughout a predetermined time period before accepting it as a valid digital "one".

4. The method of claim 3 further including the step of establishing a time interval following a data pulse and analyzing said time interval for the absence of an output from the multivibrator.

5. The method of claim 3 further including the steps of requesting data transfer by sending from one end of the cables a plurality of data send pulses, each comprising a digital "one" that includes a predetermined number of spaced apart short pulses followed by a space of predetermined duration, initiating data transfer from the other end if all of the predetermined number of data send pulses are detected and if no pulses are detected in said space of predetermined duration.

6. A method of transmitting a pulse across a pair of cables connected to the terminals of a low impedance battery from one end thereof to the other end thereof, wherein one end of said cables is connected to the battery and the other end is connected to a remote device, said cables otherwise being used either to charge the battery or to supply power to a load, the method including the steps of transmitting a short duration pulse by momentarily imposing a high power, low energy pulse at said one end of said pair of cables, and receiving the short duration pulse at the other end of said pair of cables by sensing a change in voltage as an indication of the occurrence of said short duration pulse.

7. The method of claim 6 further including the step of modifying each change in voltage sensed at said other end of said pair of cables by a pulse shaping circuit to provide a modified short duration pulse of constant magnitude and duration.

8. The method of claim 7 further including the steps of creating at said one end of said cables a plurality of short duration pulses for indicating a data pulse representing a logic "one", and sensing at said other end of said cables whether a predetermined number of consecutive modified short duration pulses were detected within a predetermined time period in order to provide an output indicating the receipt of a logic "one" data pulse.

9. The method of claim 8 further including the step of indicating an error condition if some but not all said predetermined number of said modified pulses is detected within said predetermined time period.

10. The method of claim 8 further including the step of applying said modified short duration pulses to a resettable multivibrator, the reset time of which is slightly greater than the interval between said modified short duration pulses, and determining whether the output of the multivibrator is continuous during a said predetermined time period to indicate the reception of a valid data pulse representing a logic "one".

11. An apparatus for transmitting a pulse across a pair of cables, said apparatus including means for transmitting a short duration pulse by momentarily imposing a high power, low energy pulse at one end of said pair of cables, and means for receiving said pulse at the other end of said pair of cables by sensing a change in voltage as an indication of the occurrence of said short duration pulse, wherein one end of the cables is connected to the terminals of a low impedance battery and the other end is connected to a remote device, said cables otherwise being used either to charge the battery or to supply power to a load.

12. The apparatus of claim 11 further including means for modifying each change in voltage sensed at said other end of said pair of cables by a pulse shaping circuit to provide a modified short duration pulse of constant magnitude and duration.

13. The apparatus of claim 12 further including means for creating at said one end of said cables a plurality of short duration pulses for indicating a data pulse representing a logic "one", and means for sensing at said other end of said cables whether a predetermined number of consecutive modified short duration pulses were detected within a predetermined time period in order to provide an output indicating the receipt of a logic "one" data pulse.

14. The apparatus of claim 13 wherein the output of said pulse shaping circuit is applied to a resettable multivibrator, the reset time of which is slightly greater than the interval between said modified short duration pulses, said apparatus further including circuit means for determining whether the output of the multivibrator is continuous during a said predetermined time period to indicate the reception of a valid data pulse representing a logic "one".

15. The apparatus of claim 11 wherein said means for transmitting a short duration pulse includes means for momentarily short-circuiting said pair of cables.

16. The apparatus of claim 11 wherein said means for transmitting a short duration pulse includes means for applying a voltage pulse across said pair of cables of sufficient magnitude to be detectable at the other end of said pair of cables.

17. A method of transmitting a pulse across a pair of cables, the method including the steps of transmitting a short duration pulse by momentarily imposing a high power, low energy pulse at one end of said pair of cables by momentarily short-circuiting said pair of cables, and receiving the short duration pulse at the other end of said pair of cables by sensing a change in voltage as an indication of the occurrence of said short duration pulse, wherein one end of said cables is connected to the terminals of a low impedance battery and wherein the other end is connected to a remote device, said cables otherwise being used either to charge the battery or to supply power to a load.

18. A method of transmitting a pulse across a pair of cables, the method including the steps of transmitting a short duration pulse by momentarily imposing a high power, low energy pulse at one end of said pair of cables by applying a voltage pulse across said pair of cables of sufficient magnitude to be detectable at the other end of said pair of cables and receiving the short duration pulse at the other end of said pair of cables by sensing a change in voltage as an indication of the occurrence of said short duration pulse, wherein one end of said pair of cables is connected to the terminals of a low impedance battery and the other end is connected to a remote device, said cables otherwise being used either to charge the battery or to supply power to a load.

19. An interface circuit for use in connection with a battery identification device connected across the terminals of a low impedance battery, said circuit comprising a pair of battery cables having one end thereof connected to said terminals of said battery and the other end thereof connected to a remote device, said cables other,vise being used either to charge the battery or to supply power to a load, means for generating a plurality of high power, low energy pulses for each data pulse representing a discrete logic level, and means for converting information stored in said battery identification device into data pulses.

20. The interface circuit of claim 19 wherein said means for generating said high power, low energy pulses includes means for momentarily short circuiting said cables.

21. The interface circuit for claim 19 wherein said means for generating said high power, low energy pulses includes means for applying a voltage pulse to the battery of sufficient magnitude to be detectable at the remote end of the cables.

22. The interface circuit of claim 19 further including a pulse sensing circuit for detecting data signals applied at the remote end of said cables for initiating the transfer of stored data from said battery identification device.

23. The interface circuit of claim 19 wherein said means for generating said high power, low energy pulses includes an FET and an R-C connected in series with said FET.

* * * * *